United States Patent

Kolpek

[15] 3,674,125

[45] July 4, 1972

[54] DATA SYSTEM WITH PRINTING, COMPOSING, COMMUNICATIONS, AND MAGNETIC CARD PROCESSING FACILITIES

[72] Inventor: Robert A. Kolpek, Lexington, Ky.

[73] Assignee: International Business Machines Corporation, Armonk, N.Y.

[22] Filed: Dec. 19, 1969

[21] Appl. No.: 886,798

Related U.S. Application Data

[63] Continuation of Ser. No. 802,700, Sept. 6, 1968, abandoned, which is a continuation of Ser. No. 623,053, March 14, 1967, abandoned.

[52] U.S. Cl. ........................................197/19, 340/174.1 R

[51] Int. Cl. ........................................................B41j 5/30

[58] Field of Search ..............................197/1, 19, 20, 84.1; 340/174.1

[56] References Cited

UNITED STATES PATENTS

| | | | |
|---|---|---|---|
| 2,846,516 | 8/1958 | MacChesney | 179/100.2 |
| 3,298,007 | 1/1967 | MacDonald et al. | 340/147.1 |
| 3,349,369 | 10/1967 | Jensen | 340/146.1 |
| 3,354,557 | 11/1967 | Whitlock | 35/6 |
| 3,434,130 | 3/1969 | Lemelson | 340/174.1 |
| 1,831,359 | 11/1931 | Lasker | 197/1 |
| 2,508,953 | 5/1950 | Knutsen | 197/1 X |
| 2,700,447 | 1/1955 | Blodgett | 197/84 X |
| 2,745,532 | 5/1956 | Crawford | 197/1 |
| 2,788,879 | 4/1957 | Rand | 197/1 |
| 2,791,310 | 5/1957 | Jones | 197/1 |
| 2,806,575 | 9/1957 | Higonnet et al. | 197/84 |
| 2,952,008 | 9/1960 | Mitchell et al. | 235/167 |
| 2,971,626 | 2/1961 | Dirks | 197/84 |
| 2,973,080 | 2/1961 | Higonnet et al. | 197/84 |
| 3,031,647 | 4/1962 | Dirks | 340/172.5 |
| 3,260,340 | 7/1966 | Locklar et al. | 197/19 |
| 3,294,956 | 12/1966 | Jenkins et al. | 197/1 X |
| 3,297,124 | 1/1967 | Sims | 197/19 |
| 3,514,770 | 5/1970 | Parken | 346/74 X |
| 3,145,268 | 8/1964 | Whitney et al. | 179/1 X |

*Primary Examiner*—Edgar S. Burn
*Attorney*—Hanifin and Jancin and D. Kendall Cooper

[57] ABSTRACT

The apparatus incorporates a printing composer interconnected with a magnetic card recording and reproducing unit, and having telecomunication facilities. Provision is made for composing operations, including justification of printed information according to predetermined line lengths, centering, flush left, and flush right. The composing capabilities are in addition to basic recording and playback functions of the apparatus. Several modes of operation are possible. In a Record mode, characters and functional information entered by a keyboard produce data signals that are supplied to the magnetic card unit for recording in individual tracks on a magnetic card record media, each track being associated with a printed line on a document that is concurrently printed. During a Playback mode, data signals previously recorded in the individual tracks on the magnetic record card are sensed and applied to the printer to produce a printed document automatically. Neither the Record nor the Playback modes contemplate justification procedures. In a Justify Record mode, provision is made for recording characters and recognizing spaces as they occur during the printing of a document, compiling justification information to produce lines of predetermined length, and recording the justification data in association with the individual lines. In a Justify Playback mode, the previously recorded justification data is recognized and used during subsequent sensing of data signals to effect proper interword spacing in order to produce justified lines of printed copy.

16 Claims, 72 Drawing Figures

INVENTOR
ROBERT A. KOLPEK

BY D. Kendall Cooper
ATTORNEY

RECORD I

START RECORD SEQUENCE

RECORD II

RECORD II (CONTINUED)

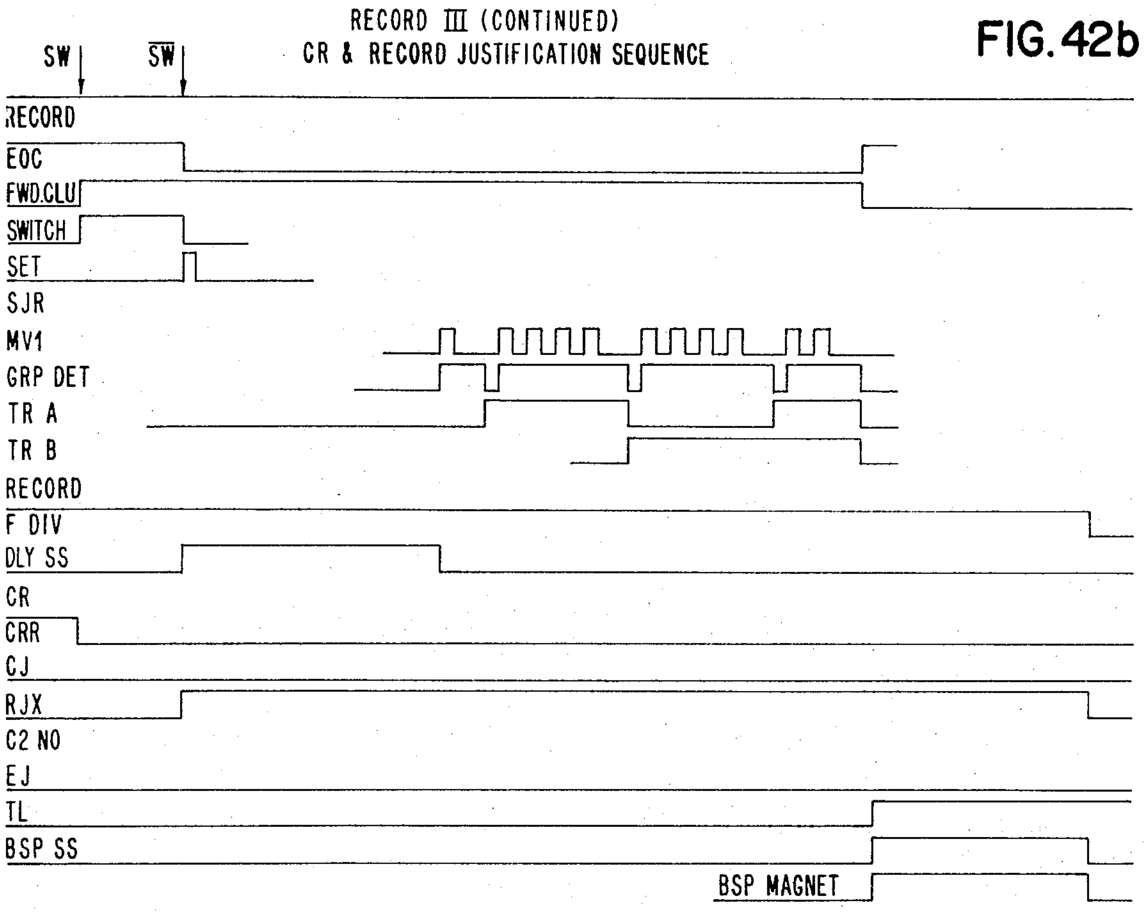
FIG. 42b
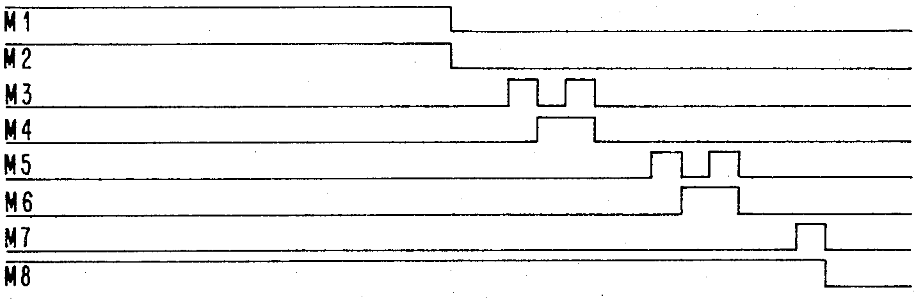
FIG. 43
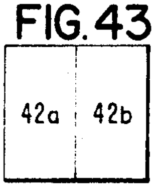

PLAYBACK I
(CONTINUED)

PLAYBACK II

DATA SYSTEM WITH PRINTING, COMPOSING, COMMUNICATIONS, AND MAGNETIC CARD PROCESSING FACILITIES

The present application is a continuation of Ser. No. 802,700 filed Sept. 6, 1968, now abandoned, which was a continuation of Ser. No. 623,053 filed Mar. 14, 1967, and also now abandoned.

In all of the foregoing modes, provision is made for feeding and scanning the magnetic record card media in a rapid and efficient manner. In an alternative embodiment, a portable unit is provided for recording source data on a magnetic record card, as in conjunction with inventory activities, for example.

As another possibility, provision is made for telecommunication facilities for transmitting data signals stored on the magnetic record card to other systems, or various output devices, such as photographic units, perforated tape units, or magnetic storage units.

Provision is made for either Side by Side Column Justification or Single Column Justification, as required by the operator. In Side by Side Column Justification, data signals representative of rough copy are recorded as printing of a left-hand column proceeds, the justification data is determined, and the data is subsequently played back and printed in a right-hand column under control of the justification data to produce justified lines of substantially equal length. In a Single Column Justification procedure, data signals are recorded on the card media along with justification data for the individual lines of information. Normally, all lines representative of a document are recorded with associated justification data and thereafter, the data signals for the entire document are played back to produce a Single Column of justified printed copy

CROSS REFERENCES TO RELATED APPLICATIONS AND PATENTS

The following patents and applications are of interest.

U.S. Pat. No. 2,919,002, L. E. Palmer, inventor; entitled "-Selection Mechanism for a Single Printing Element Typewriter."

U.S. Pat. No. 3,082,854, F. E. Becker, et al., inventors; entitled "Typewriter Input Checking Mechanism."

U.S. Pat. No. 3,222,460, N. J. Albanes, et al., inventors; entitled "Multiple Station Selection Systems."

U.S. Pat. No. 3,260,340, Henry C. Locklar and Donald E. Sims, inventors; entitled "Revision System for Data Recording and Printing Apparatus."

U.S. Pat. No. 3,297,124, Donald I. Sims, inventor; entitled "Data Recording and Printing Apparatus Capable of Responding to Changed Format."

The following applications are all assigned to the same assignee as the present application.

U.S. Pat. No. 3,417,202, issued Dec. 17, 1968, inventor R. A. Kolpek; entitled "Recording Apparatus."

U.S. Pat. application Ser. No. 580,478 filed Sept. 19, 1966, inventors W. O. Cralle, et al.; entitled "Justification Data Calculator and Display Device."

U.S. Pat. No. 3,512,137 J. E. Jones, R. A. Kolpek, and R. A. Rahenkamp, inventors; issued May 12, 1970; entitled "Correlated Recording, Reproducing, Printing, and Composing Apparatus."

U.S. Pat. No. 3,512,132, J. E. Jones and R. A. Rahenkamp, inventors; May 12, 1970; entitled "Composing Apparatus with Table Lookup Mode."

U.S. Pat. No. 3,346,086 issued Oct. 10, 1967, W. O. Cralle, et al., as inventors; entitled "Proportional Escapement Apparatus for a Single Element Typewriter."

U.S. Pat. No. 3,382,963 issued May 14, 1968, G. T. Slaughter and W. O. Cralle, inventors, entitled "Printing Apparatus with No Print Feature."

U.S. Pat. No. 3,404,766 issued Oct. 8, 1968; W. H. Castle, et al., inventors, entitled "Variable Spacebar Mechanism for Automatically Operated Proportional Escapement Printer."

U.S. Pat. No. 3,514,769, issued May 26, 1969, J. W. Woods, inventor; entitled "Random Access Data File."

U.S. Pat. No. 3,471,654 issued Oct. 7, 1964, W. L. Dollenmayer, inventor; entitled "Transducer Driving Arrangement for Recording and Reproducing Apparatus."

OTHER REFERENCES

The following additional references are of interest.

IBM Customer Engineering Instruction Manual for the "-Selectric" Printer, Form Number 241-5032-2, dated Jan. 1966.

IBM Customer Engineering Manual of Instruction for "-Selectric" Input/Output Keyboard Printer, Form Number 241-5159-2, dated 1965.

IBM Customer Engineering Universal Reference Manual for "Selectric" Input/Output Keyboard Printer, Form Number 241-5182-0 dated June 30, 1963.

Certain mechanisms are described in the IBM Customer Engineering Manual "Dictation Equipment" Form Number 241-5071, revised Oct. 5, 1962.

IBM Dictation Equipment Reference Manual, Form Number 241-5132, dated Oct. 22, 1962.

IBM "Selectric" Composer Instruction Manual, Form Number 241-5340-0, Oct. 19, 1966.

BRIEF BACKGROUND OF INVENTION

1. Field

The invention pertains to systems for entering, printing, recording, reproducing, composing, transmitting, and receiving data in conjunction with storage of signals on a record media, such as a magnetic card. Provision is made for operator control of the apparatus under some circumstances, such as during the entry of information into storage as well as initiating automatic Playback, and additional facilities are provided for editing of the data both during Recording and during Playback by suitable merging and category selection techniques. Of special interest, is the provision of means for printing rough copy as it is entered in the system and for automatically printing justified copy in accordance with justification data determined by the system.

The invention pertains to composing systems having facilities for the automatic determination of justification information in order to produce justified individual lines of printed matter.

Beyond the basic modes of operation of the system that include Record, Playback, Justify Record, and Justify Playback, it is contemplated that facilities are included for transmitting and receiving data stored on a record media in order to store the information in another system or to produce printed documents in another system, as desired.

More specifically, the invention pertains to devices having facilities for entering, recording, reproducing, and utilizing data signals in conjunction with the feeding and scanning of a unitary storage media, such as a magnetic record card.

2. Description of the Prior Art

Prior art apparatus has contemplated entering, storing, reproducing, and printing of data both in non-justified and justified form and has usually comprised an entry means for entering data, a storage means incorporating a storage media, such as a magnetic tape, magnetic drum or the like, and means for sensing previously stored signals to utilize the data for printing a document or other purposes. The prior art has also contemplated the reception and transmission of data in conjunction with a storage media.

Also, a variety of arrangements have been made in the prior art for the automatic composition of printed matter. Composing systems have usually comprised some kind of entry device for entering rough copy data into the system and a separate output device for utilizing composed data. Intermediate the entry and output devices, numerous configurations have been proposed for determining composition factors, including those pertaining to the production of justified copy. Many of these have included complicated arithmetic mechanisms and circuits involving a considerable amount of hardware or programming. Some form of storage apparatus has usually been provided for storing rough copy data during composing activities. Output devices in prior art systems have included photographic units for exposing film in accordance with justified data as well as other utilization devices, such as perforated tape devices.

SUMMARY

The present invention contemplates the provision of a system for printing a document in conjunction with the recording and reproducing of related data on a storage media, such as a magnetic card media. Also, the system is provided with composing facilities for the usual composing functions such as justifying, centering, flush right, and flush left. The invention provides for a combined entry and printing device that is interconnected with a magnetic card processing unit and arranged to operate in a number of modes of operation including Record, Playback, Justify Record, and Justify Playback. The system is operative to Record and Playback data signals originating from a keyboard concurrently with the printing of rough copy data. The composing modes include Side by Side Column Justification and Single Column Justification, as desired. The system has a number of control adjuncts that are intended for use by the operator to establish the various modes of operation required.

In a Side by Side Column Justification mode, the operator prepares rough draft copy in a left-hand column on a document and justified copy is automatically printed in a right-hand column on the document. The sequence involves a recording of the rough copy data on the magnetic card media as it is entered by the operator and printed in the left-hand column on the document. The recording sequence is normally followed by a Playback operation during which the line just recorded is sensed, justification factors are derived and a justified line is printed on the document in a right-hand column automatically.

In the Single Column Justification mode, the operator enters rough copy data for recording on the media while printing takes place on the document. A plurality of lines of data are recorded in related tracks on the magnetic card media. The recording sequence is coordinated in such a manner with the printing sequence that each printed line has an associated track assigned to it on the magnetic card. Prior to the recording of data signals representative of functional and informational characters in an individual line, a standard predetermined amount of space is alotted at the beginning of the line to store justification data associated with that line in order that such justification data may be sensed first during subsequent Playback operations to produce justified copy. Normally, when all lines of a particular document have been recorded with their related justification data, a Playback operation is then initiated and then all of the lines are printed automatically in a single column.

The invention contemplates the provision of magnetic card processing means for effecting appropriate scanning action between a transducer and a magnetic card in order to record data in individual parallel tracks by effecting relative movement of the transducer and media in a number of directions together with track-to-track displacement, as required. In another version, a portable unit is provided for recording data on a magnetic card media that is thereafter usable in the primary magnetic card processing unit to effect automatic operations of the composing system, or that may serve as a source document for other computation activities.

In still another mode of operation of the system, provision is made to incorporate the composer and magnetic card processing units in telecommunication facilities. Recording and playback of data in the system normally takes place in a "Local" mode and provision is made for placing the apparatus in a "Receive" mode or a "Transmit" mode to establish the communication operations.

As still another factor in the operation of the system, provision is made for the operator to select desired line lengths to establish the width of justified printed copy. This is in the form of switching means that effect the selection of pitch, as well as line lengths in inches and fractions of inches.

As another aspect of the system operation, a composer printing unit is operated as an input/output entity and provides signals to indicate the escapement values of characters and spaces as they occur, circuitry is provided for translating the signals for use in the arithmetic operations, and provision is made for automatically operating the composer in response to various derived escapement values during a No-Print mode of operation in order to establish the quantity and desired widths of interword spaces during the justification of printed lines.

With more particular reference to the magnetic card processing unit, provision is made for relatively moving a transducer and a magnetic card media in an incremental fashion during the recording of informational and functional characters, including spaces, as well as with relatively continuous and high speed motion during Playback operations and track accessing operations.

With respect to the justification procedures, a number of registers, counters, and comparing units are arranged for operation in a simple and unique fashion to store increment values of characters during recording, to derive justification data, and to supply appropriate controls during playback of data for establishing justified lines, or controlling other composing activities.

Accordingly, an object of the present invention is to provide facilities for recording, storing, and reproducing data in a coordinated manner in conjunction with the printing of a document.

Another object of the invention is to provide entry and printing means associated with a magnetic card recording and reproducing unit wherein an individual printed line on a document is assigned to an associated storage track on the magnetic card media.

A further object of the present invention is to provide a data system that includes a magnetic card processing unit for processing individual magnetic record cards having a plurality of tracks of predetermined capacity with the system being operative to record data representative of individual lines printed on a document, each in a related track on the record media up to the capacity of the individual line.

Also, another object of the invention is to provide for the recording, storing, and reproducing of data in a discrete record media having individual storage tracks associated with individual printed lines on a document and wherein provision is made for expanding the individual lines up to the capacity of the individual storage tracks, when required.

An additional object of the present invention is to provide a composing system that includes a magnetic card processing unit and having a first mode of operation for Side by Side Column Justification and a second mode of operation for Single Column Justification.

An additional object of the present invention is to provide apparatus that includes a magnetic record card processing unit, that is operative to record data representative of individual printed lines on a document in respective tracks on the media and to reproduce the data for automatic preparation of a printed document, and that further includes facilities for recognizing the justification requirements for individual lines, supplying such justification data for arithmetic processing and recording, as required, and for automatically printing justified copy during a subsequent reproduction of the data stored on a media in said processing unit.

Also, another object of the invention is to provide for the recording, storing, and reproducing of data in a magnetic record media, with or without justification, and with local entry and utilization of the data and/or transmission and reception of the data through telecommunication facilities.

It is another object of the invention to provide composing apparatus that is operator-oriented with provision for operator entry of rough copy data and operator control of modes of operation, including the automatic justification of such data and the automatic preparation of justified printed copy.

In conjunction with the foregoing object, it is a further object of the invention to provide automatic entry composing, and telecommunication facilities in conjunction with a magnetic card processing facility that includes a wide range of operations and considerable flexibility with a minimum amount of hardware.

A further object of the present invention is to provide for the entry of rough copy data, the storing of such data on a magnetic card media in a plurality of storage tracks, to further store in association with the individual lines of data and in preassigned areas the justification data required for the recorded lines, and to further provide for the sensing of the justification data and the utilization of the associated data in a rapid manner.

An additional object of the invention is to provide a composing system that is adaptable for numerous composing functions, including justification, centering, and flush right, or flush left-flush right combinations, as required.

A further object of the present invention is to provide facilities for an operator to manually select pitch, and line lengths required during automatic composing activities.

Still another object of the present invention is to provide a data system in conjunction with a magnetic card processing unit and having facilities for effecting incremental or continuous, or high speed relative movement and relative displacement of a transducer and a magnetic record media, as required during operations of the system.

An additional object of the invention is to provide arithmetic registers that are particularly effective in a composing environment, with a number of counting modes of operation that are dependent upon the modes established in the system.

An additional object of the present invention is to provide a data system for entering, recording, and reproducing data in connection with a magnetic card processing unit, and having facilities for operator selection of catagories of information in a forward and a reverse direction of relative movement during scanning of the magnetic record card media to simplify the correction, deletion, and insertion of data as determined by the operator.

Also, an object of the present invention is to provide a composing system that includes an input/output composer unit having facilities for supplying signals representative of escapement values occurring during printing and for effecting printing of characters and the functional operations, including Space operations of desired widths and quantities, automatically in response to signals derived from arithmetic circuitry or in conjunction with a magnetic media processing facility.

Still another object of the present invention is to provide a composing system having provision for interpreting escapement value signals in a concise and unique manner to operate justification circuitry.

In connection with the foregoing object, a further object of the present invention is to effect a plurality of Space operations of an input/output composer unit by operating normally available character selection means having the desired incremental values and to the extent required in an individual line of justified printed matter by taking advantage of a No-Print mode of operation.

Also, another object of the invention is to provide compact and efficient facilities for effecting relative movement between a transducer and magnetic record card media for scanning and accessing during recording and playback of information on said media.

A further object of the invention is to provide a data system having entry, recording, reproducing, printing, transmitting, receiving, and processing facilities that are operative on a character-by-character basis in connection with a magnetic card unit, or on a fairly continuous information block basis, as desired.

DESCRIPTION OF THE DRAWINGS

In the drawings:

FIGS. 37a–38d are additional circuits involved in the derivation of escapement values.

FIGS. 42a and 42b, when arranged as in FIG. 43, indicate wave form and circuit conditions encountered upon recognition of a Carrier Return code and the subsequent recording of a justification character during a Justify Record operation.

DETAILED BACKGROUND FOR INVENTION

Introduction

Figures 1, 2A, 2B:
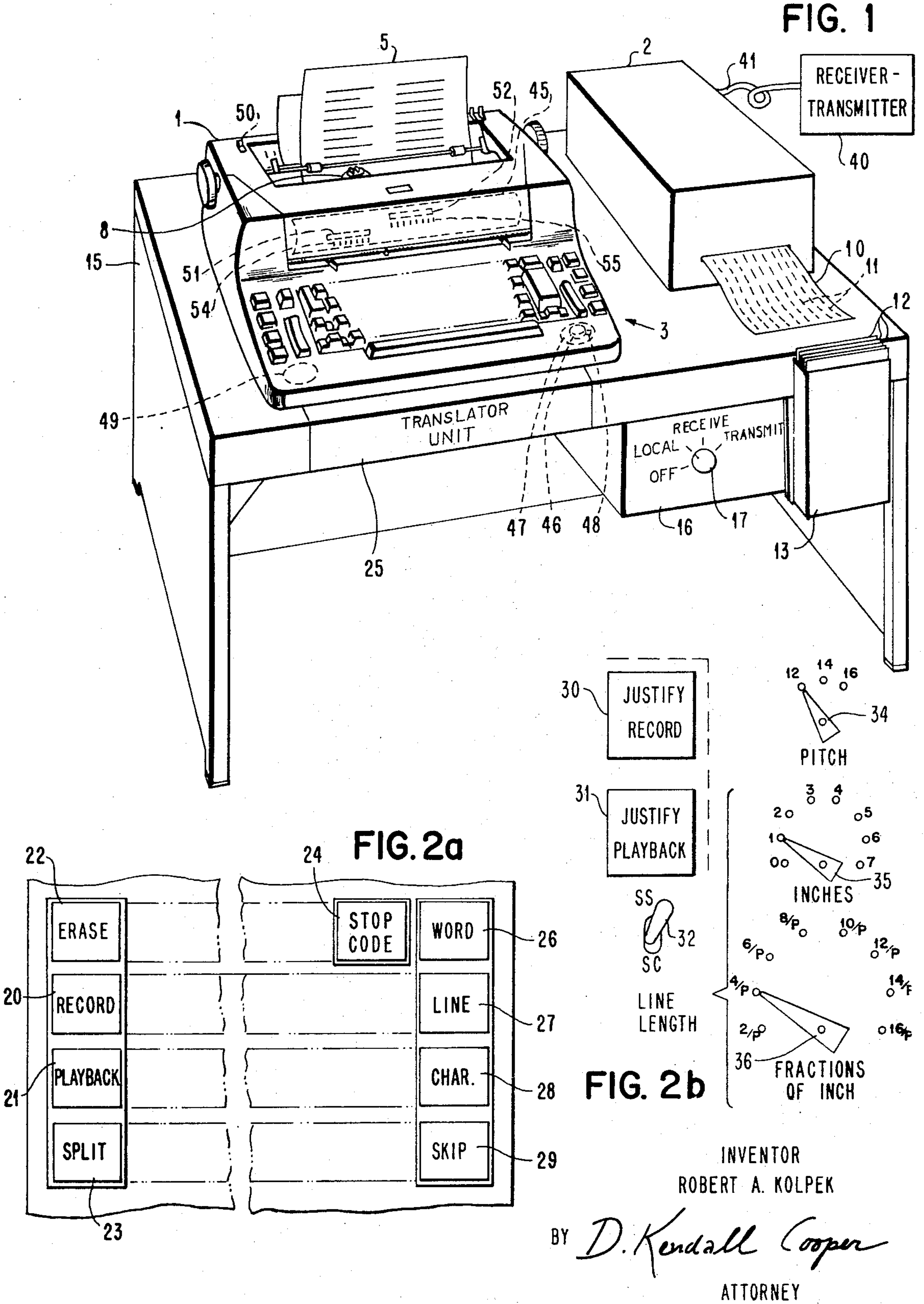
FIG. 1 illustrates a data system that includes a composing unit for entering data, for printing documents in association with a magnetic card processing unit and a receiver-transmitter unit, together with a number of control adjuncts for establishing Local and Telecommunication modes of operation as well as recording and playing back of information with and without justification.
FIG. 2*a* illustrates a suggested arrangement of keybuttons for controlling operation of the data system of FIG. 1, particularly with respect to basic Record and Playback modes of operation, and editing functions.
FIG. 2*b* illustrates additional operator controls that are provided in the system of FIG. 1 for selecting desired line lengths and establishing Justify Record and Justify Playback modes of operation.

FIG. 1 illustrates a data processing system that includes a composer unit 1 interconnected with a magnetic card processing unit 2. Composer unit 1 has a keyboard 3 with informational and functional character keys and additional control keys as further illustrated in FIGS. 2a and 2b. A document 5 is considered to have a left-hand column of rough copy information and a right-hand column of justified information prepared during a Side by Side Column Justification operation. Card processing unit 2 has provision for feeding and scanning a magnetic record card, such as a magnetic card 10 to record and reproduce signals. Card 10 has a plurality of data tracks, only a few of which are indicated at 11. Additional magnetic record cards 12 are contained in a supply hopper 13. The various units just mentioned are supported by a desk structure 15 that also accommodates a control unit 16 having a control dial 17 for establishing Off, Local, Receive, and Transmit modes for the equipment.

When in a Local mode, the apparatus is responsive to signals derived from depression of keybuttons on keyboard 3 to record data signals on magnetic media 10 when the Record button 20, FIG. 2a, is depressed, and is further operative to scan record media 10 to derive signals and to operate composer unit 1 automatically to produce printed copy when the Playback button 21 is depressed. A Justify Record operation is established upon depression of button 30 and a Justify Playback operation is established upon depression of button 31, FIG. 2b.

When the apparatus of FIG. 1 is placed in a Receive or Transmit mode by operation of dial 17, a receiver-transmitter unit 40 is interconnected with the apparatus for the reception and transmission of data as by telecommunication lines 41. For operation as an input/output composer unit, the system of FIG. 1 is provided with a translator unit 25 that is operative to supply signals representative of characters selected by operation of keyboard 3 and that is further operable to actuate character selection mechanisms and no-print mechanisms automatically during Playback operations.

Considering FIG. 2b, a mode switch 32 selects a Side by Side Column (SS) mode of justification or a Single Column (SC) mode of justification, as desired by the operator. A number of selector knobs are provided for the operator during justification procedures. These include a Pitch switch 34 that selects a Pitch of 12, 14, or 16; an Inches switch 35 that selects a desired justified line length up to 7 inches; and a Fractions of Inch switch 36 that selects fractions of a line length in connection with the Inches switch 35.

The basic keyboard 3, FIG. 2a, includes additional control buttons that are similar to those described in 1965 Kolpek application noted in the Cross Reference section above. These include an Erase button 22, a Split button 23, a Stop code button 24, and Word, Line, Character, and Skip buttons designated 26–29, respectively.

Composer Unit

Only a brief summary of the structural configuration and operation of composer unit 1, FIG. 1, is presented here since the details of the unit are available in certain of the various references previously given, particularly in the Composer Instruction Manual, Form Number 241-5340, the 1963 and 1966 Cralle applications, and the 1966 Slaughter and Castle applications. The composer unit has a single element print head 8 that is operated by rotating and tilting selection principles disclosed in the Palmer and Becker patents and in the various manuals directed to the "Selectric" basic printer and the "Selectric" Input/Output printer. Generally, print head 8 has all characters of a type font arranged on the periphery of the head. The head is rotated and tilted to select characters under control of linkages that are operated in response to depression of character keys on keyboard 3. Following selection, print head 8 is operated against a document, such as document 5, to effect printing of the selected character. A document positioned in composer unit 1 are maintained in a relatively stable lateral condition, left to right, and print head 8 is escaped during printing and spacing adjacent the document.

Composer unit 1 makes use of a pin wheel memory for storing escapement values mechanically as typing proceeds for later use in manual justification entry and printing procedures, as more particularly described in the 1963 Cralle application.

Figure 5:
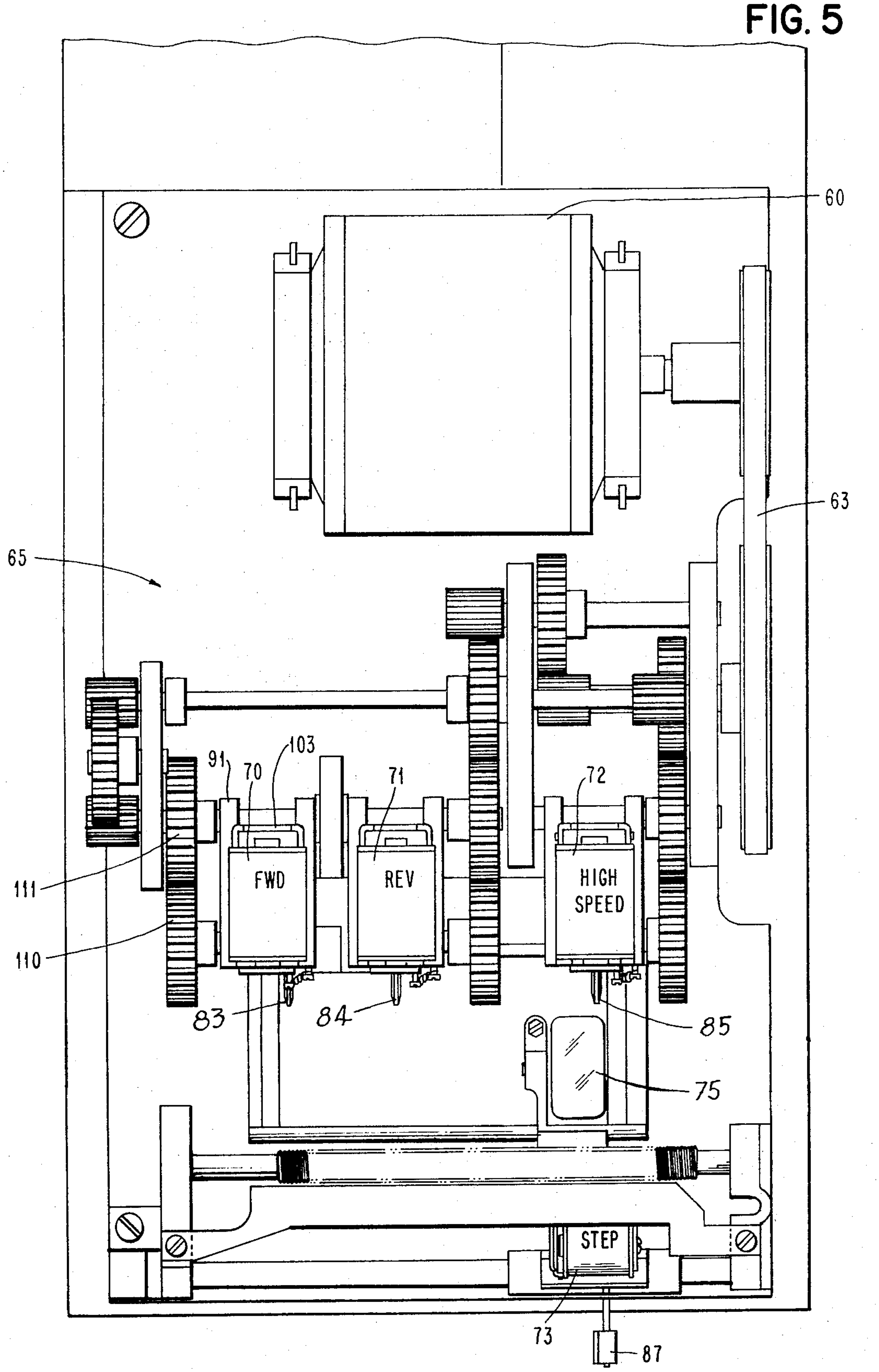
Figure 6:
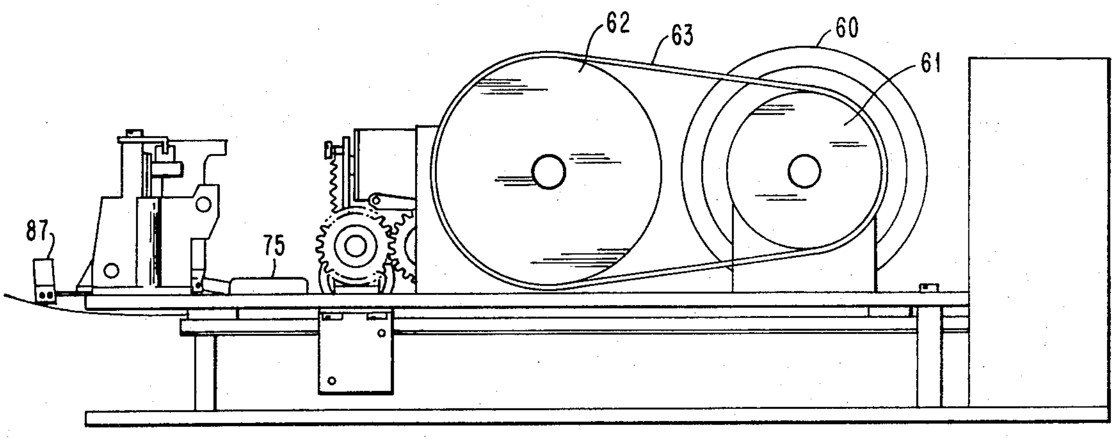
Figure 7:
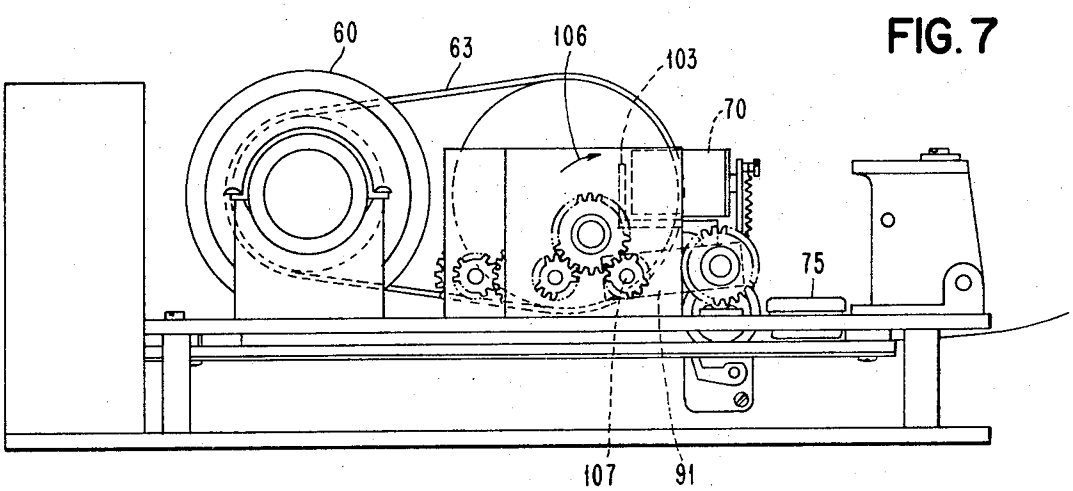

Composer unit 1 is preferably modified to serve as an input/output device in conjunction with the recording and playback of signals on media 10 during processing in unit 2. Composer unit 1 is also preferably modified to incorporate transmitting contacts, such as those shown in FIG. 5 of the Locklar, et al., and Sims patents in the Cross Reference section and in the "Selectric" Input/Output Manuals. Such contacts develop signals during printing operations of composer unit 1 that are provided to the card unit 2 for recording in tracks 11 and concurrently with the development of justification information with respect to the data as it is recorded.

Composer unit 1 is also preferably provided with a translaor unit 25 that, as an example, may be of the form taken in the Castle, et al., application for effecting automatic escapement operation of composer unit 1 during playback of the signals in tracks 11 on media 10 in order to automatically produce justified printed copy as indicated in the right-hand column on document 5.

The translator unit operation makes use of a character selection, escapement, and no-print mechanism described in the Slaughter, et al., application. In the Castle, et al., system, a composer unit is automatically operated to provide variable spacing increments between words and/or characters in response to received signals that are recognized to effect simultaneous selection and actuation of character keylevers and a no-print mechanism. The character keylever assembly is selected in accordance with the escapement width desired for individual spaces while simultaneous selection and actuation of the no-print assembly prevents printing. To obtain spacing movements of various extents, a different one of the various keylever assemblies normally used for printing characters of different widths is selected and actuated simultaneously with the no-print assembly. More particularly, a data source supplies six signals to the translator that define characters or functions to be performed and an additional no-print signal to operate the no-print mechanism. In a typical situation, from three to nine units are selected under control of the character selection lines. The translator has seven code slides, including six character selecting slides, and a no-print slide. The translator also includes seven selector magnets that control the relative positions of the code slides.

When incorporated in a system such as that in FIG. 1, composer unit 1 may be provided with facilities for manual and visual justification procedures. In this case, composer unit 1 includes an indicator tube assembly 45, a spacebar value dial 46, a spacebar quantity dial 47, a justification lever 48, for establishing a Read mode and a Write mode of operation and may also incorporate a dial 49 for selecting automatically degrees of print impression or for manually establishing degrees of impression as desired by the operator. Under such conditions, composer unit 1 may have a separate pitch selector lever 50 that is used to select the pitch corresponding to the type font as indicated by a color coding on print head 8. Tube assembly 45 has corresponding tube positions that are color coded. The operator matches the colors by rotating tube assembly 45 to the same color selected by lever 50. This positions one of a number of windows 51 or 52 for use by the operator in visually determining the justification data for each line during the printing operations. Each window opening has an associated indicator scale, such as scales 54 and 55. Mounted for rotation within the tube assembly 45 is an internal tube having a plurality of color bars up to 20 in number, each color bar corresponding to a specific number of spacebar operations that may occur within any printed line, that is, up to 20 spacebar operations.

As the operator types rough copy, each time a spacebar operation occurs the inner tube in indicator assembly 45 is indexed one step of rotation. When this happens, a different color appears at the extreme left of the selected window, such as window 51. As print head 8 enters a Justify zone for the line in progress, it picks up the outside of the indicator assembly 45 and slides the tube laterally across the color bar that has been placed in the window. Also, a bell ringing advises the operator that she is approaching the right-hand margin. When printing has been terminated for the line in progress, the operator visually takes two readings from the indicator window, such as window 51. These are a color in the window and a number on the scale 54. The number on scale 54 is determined by the position at which the color finally selected terminates or extends along scale 54. The color indicates the spacebar unit value that is to be used during subsequent typing of the line to produce a justified line while the position along the indicator scale 54 indicates the quantity of long spaces to be selected in the line during printing. The operator adjusts the spacebar value dial 46 and quantity dial 47 accordingly.

The two Jones, et al., cases, Serial Numbers (Docket LE 9-67-031 and Docket 11,214) describe mechanisms and circuitry for operating dials 46 and 47 automatically in response to signals read from a magnetic belt media, or the like.

Magnetic Card Processing Unit

The magnetic card processing unit, FIGS. 3–7, is designed to receive an individual magnetic record card 10, to move the card into position for recording of data in an initially selected track on the card, to incrementally move the card forward as recording of individual characters proceeds, and upon recognition of the end of the data for a particular line on a document, such as document 5, FIG. 1, to restore the card to the beginning of the next track by a high speed reversing action with concurrent stepping from the present data track to the next data track.

Figure 3:
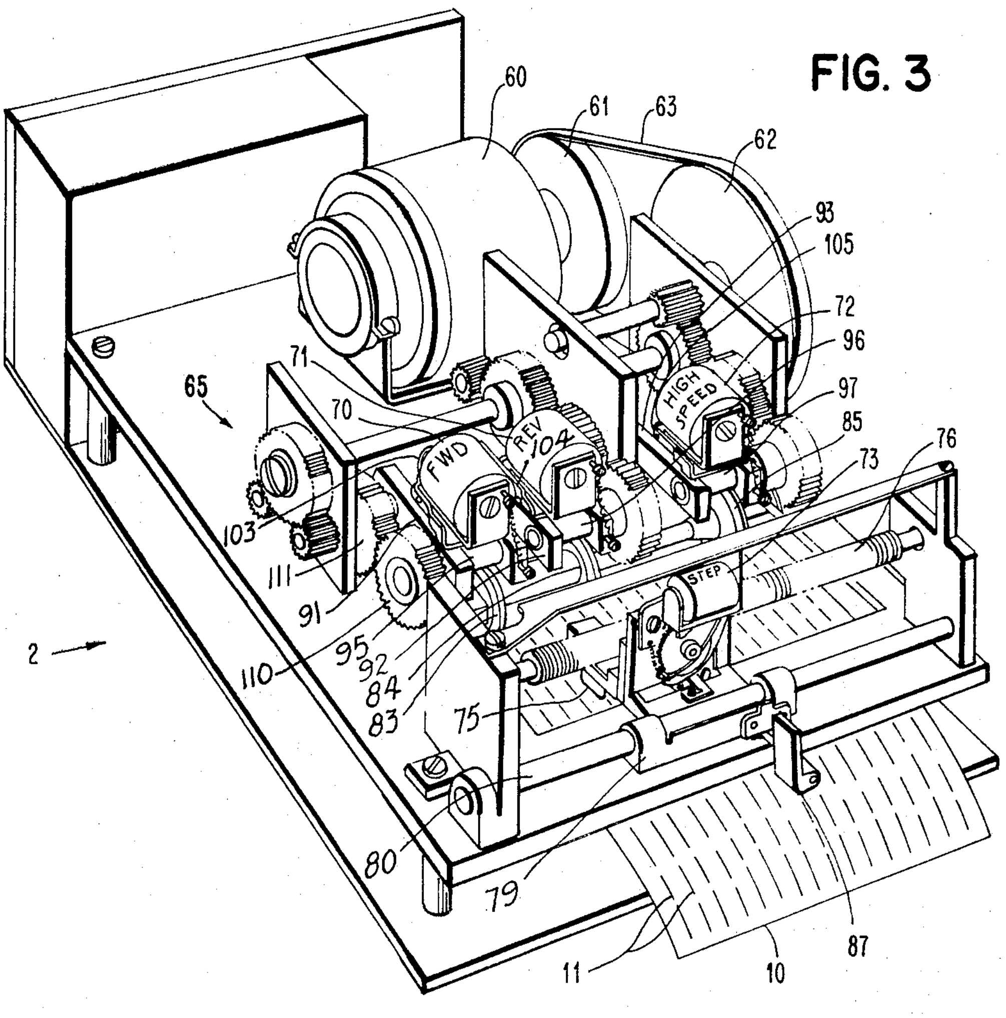
FIG. 3 is a front perspective view of a magnetic record card processing unit suggested for use in the system of FIG. 1.

In FIG. 3, card unit 2 has a drive motor 60 with associated drive pulleys 61 and 62 and a drive belt 63, for imparting relatively continuous rotary motion to a number of gear trains 65 while in operation. Unit 2 has Forward, Reverse, High Speed, and Step Magnets, respectively designated 70–73 for effecting relative movement of card 10 past a transducer head 75 for Recording and Playback scanning of data tracks 11 and for effecting relative displacement of card 10 to position transducer 75 from track-to-track, as by action of step magnet 73.

Figure 4:
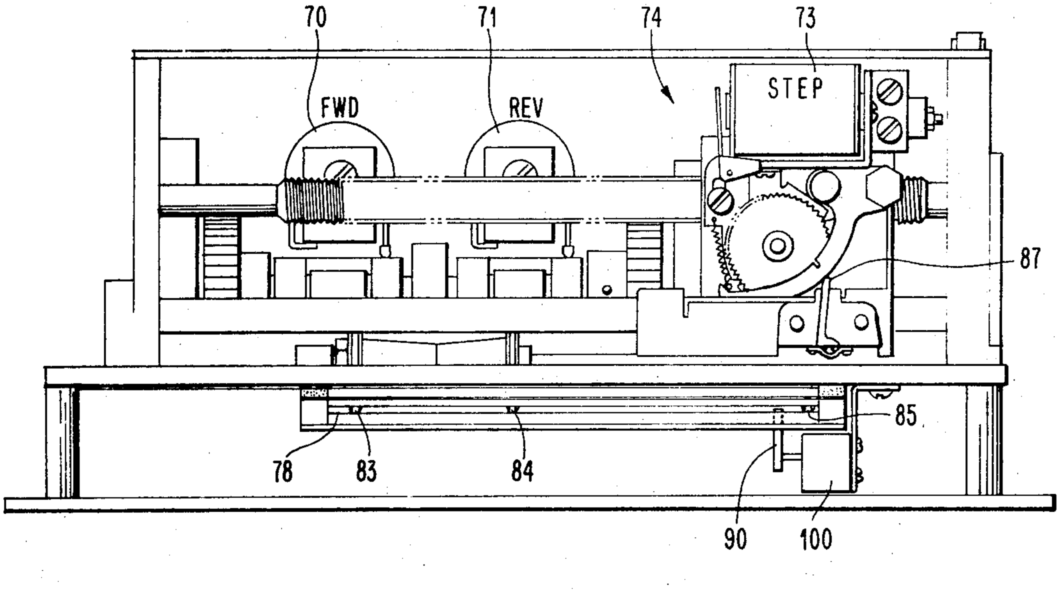
FIGS. 4, 5, 6, and 7 are front, top, right side, and left side elevations, respectively, of the magnetic record card processing unit of FIG. 3.

Initially, the selected card 10 is placed in a slot 78, FIG. 4. Step magnet 73 and transducer 75 are mounted on a carrier 79 that is part of a stepping assembly 74 and that slides on a supporting rod 80. Carrier 79 is normally positioned to the left in FIGS. 3 and 4 to Scan the first data track 11 on card 10. Usually, depression of one of the mode buttons, such as the Record or Playback buttons 20 and 21, FIG. *2a*, effects energization of Forward magnet 70. Associated with Forward magnet 70 is a roller 83 that is brought into engagement with an inserted record card. (Reverse magnet 71 and High Speed magnet 72 have associated rollers 84 and 85.) Card 10 is thereby transferred to an initial position determined by its contact with and transfer of a card switch lever 90 that operates a card switch 100. Operation of card switch 100 de-energizes Forward Clutch magnet 70 and card 10 is then in position for recording of an initial character. During a Playback mode, card 10 is fed in a sufficient distance to read the first character in the data track.

Each of the Forward, Reverse, and High Speed magnets 70, 71, and 72 have respectively associated bracket clutch members 91, 92, and 93 that are pivotally mounted at their rearmost extremities and adapted at the front extremities to support roller elements 95, 96, and 97, respectively. Roller elements 95, 96, and 97 are continuously driven through the gear trains 65 when motor 60 is operating. Each of the Forward, Reverse, and High Speed magnets 70, 71, and 72 also have associated armature assembly elements designated 103, 104, and 105. To illustrate the operation of the drive trains and clutch elements in producing relative movement of card 10, it is assumed that Forward magnet 70 is energized. This effects pivotal movement of armature 103 in a clockwise direction as indicated by arrow 106, FIG. 7. Movement of armature 103 in a clock-wise direction effects pivotal movement of bracket 91 about the gear center 107 and rolls the center of gear 110 in a clockwise direction with respect to gear 111, while maintaining engagement therewith. Bearing element 95 is actually mounted with gear 110 and the foregoing clockwise pivoting action of bracket 91 brings roller 95 against roller 83 thereby imparting the desired rotary movement of roller 83.

A similar driving and clutching action takes place with respect to the other armature, bracket, gear, and roller assemblies associated with the Reverse magnet 71 and the High Speed magnet 72. Reverse magnet 71 is normally energized to effect a relative movement of media 10 in relation to transducer 75 in the Reverse direction. High Speed magnet 72 is energized, on the other hand, to effect a High Speed movement of media 10 in relation to transducer 75.

In the foregoing manner, relative movement is effected between media 10 and transducer 75 in order to scan one of the data tracks 11 either during Recording or Playback. The scanning action is generally of an incremental nature, especially during a Recording operation. That is, only a sufficient relative movement of media 10 and transducer 75 is effected to accommodate an individual character as each functional and informational character is entered by keyboard 3. The end of information in a data track 11 is indicated by occurrence of a Carrier Return signal.

Media 10 ordinarily carries a number of tracks sufficient to accommodate the entire quantity of printed lines that may be expected during the preparation of a document, such as a letter. As an example, media 10 may carry up to 140 tracks or more, as desired. With the present scanning arrangements, each individual printed lines on a document, such as document 5, FIG. 1, has an associated storage track 11 on media 10. An inherent advantage exists with the coordinated line-by-line and track-by-track arrangement disclosed herein, since it is possible to expand or contract the information contained in a particular line without affecting the data stored in the other tracks on media 10. Each data track 11 is capable of storing a large number of characters that is greater than the maximum to be expected in individual lines of printed copy on document 5. Usually, the printed line is terminated prior to reaching the maximum capacity of the data track on media 10. Since this is the case, it is possible to later change individual lines, as for example, by incorporating additional words up to the maximum capacity of the related track on media 10, and/or deleting characters or words, or otherwise revising the stored data.

A correlated data recording and reproducing, arrangement of interest in this connection is the one disclosed in the Jones, et al., application Serial Number (Docket LE 9-67-031) wherein a line-for-line and track-for-track correlation of a printed document on a storage media is maintained. The present inventive arrangements are intended to process magnetic cards in a rapid and efficient manner and provide novel mechanisms and circuits for effecting such processing as well as taking advantage of the correlated arrangement disclosed in the aforesaid Jones, et al., application. Upon termination of scanning of an individual track 11 on media 10, it is usually required that transducer 75 and media 10 be relatively displaced to position transducer 75 adjacent another data track 11 to effect scanning operations of that track. This is effected by energization of the step magnet 73.

Reference is made to the Albanes Pat. No. 3,222,460 and to the various dictation manuals noted for stepping mechanisms having a comparable configuration to that associated with step magnet 73. Step magnet 73 is part of a stepping assembly 74 that is associated with a lead screw 76. Stepping assembly 74 has a number of pawl elements for effecting a track-by-track stepping of carrier 79 in relation to lead screw 76. Lead screw 76 has a helical configuration with the pitch of teeth corresponding to the desired incremental spacing between successive data tracks 11 on media 10. To provide for rectilinear scanning of individual data tracks 11 as proposed in the present application, lead screw 75 may be provided with one tooth and/or groove associated with each data track 11 and be of a non-helical nature. That is, the teeth would then not be arranged in a continuous spiral helix along the length of the lead screw. However, any convenient arrangement can be used for track-to-track stepping of head 75 in relation to media 10.

A scanning lever 87 may be provided that is operative as described more particularly in the Albanes and the dictating references to disconnect the entire stepping assembly 74 from lead screw 76 and permit a manual positioning of transducer 75 in relation to media 10, and more particularly in relation to a specific data track 11 on media 10.

Automatic Card Processing File

It may be desirable in some circumstances, to provide for an automatic feeding and scanning of individual record cards, such as card 10. In that event, an apparatus of the nature described in the Woods application, noted in the Cross Reference section above may be used. The Woods apparatus has provision for retaining a multitude of individual record cards or chips in a rotary drum configuration. Means is provided for positioning a particular bank of cards in relation to a transducing station, for thereafter accessing a particular card for scanning, and for subsequently effecting a recording or reproducing operation during scanning of individual lines of data on the media.

Portable Card Unit

Figure 8:
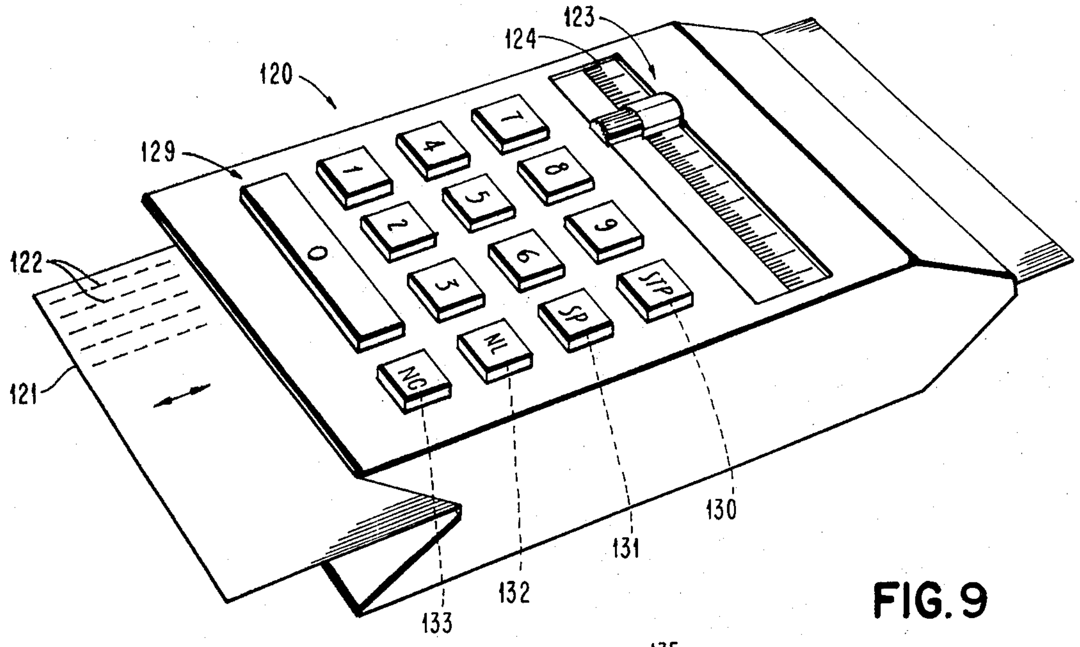
FIGS. 8, 9, and 10 are perspective, left side, and top views, respectively, of a portable magnetic card recording unit that is operable according to certain principles that are comparable to those encountered in the card processing unit of FIGS. 3–7.
Figures 9, 10:
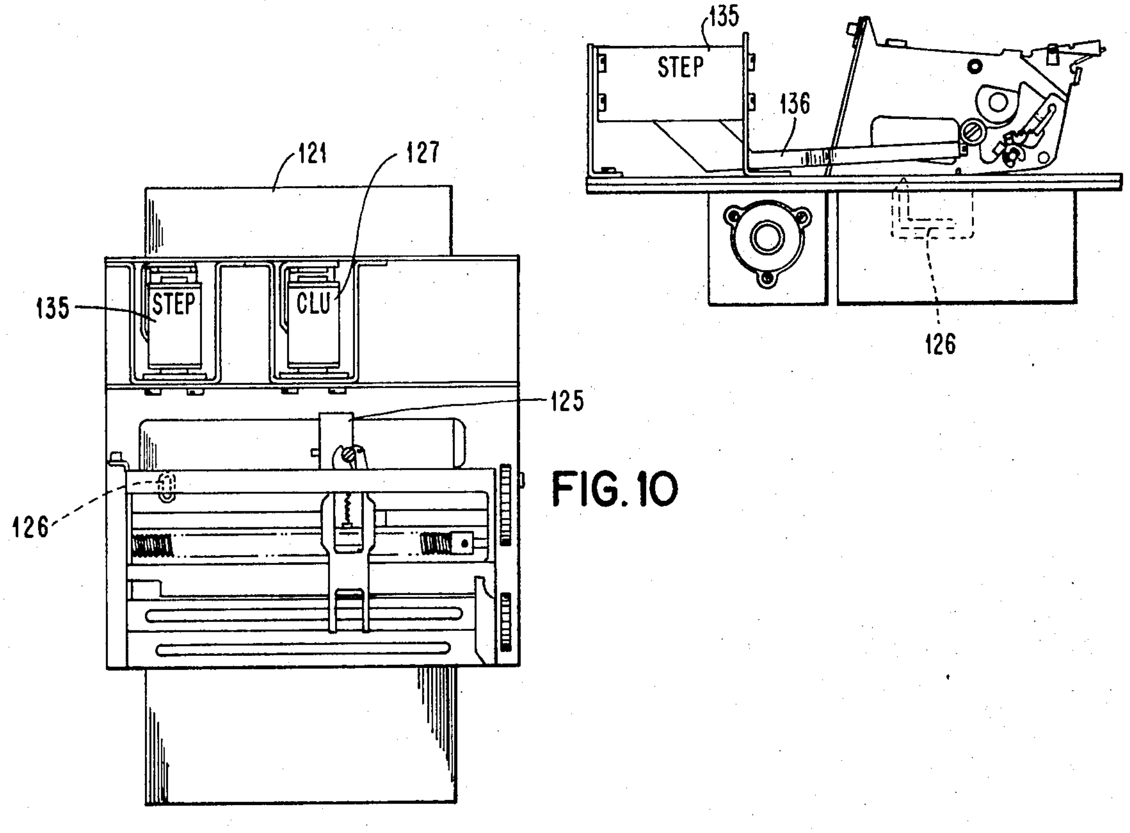

FIGS. 8, 9, and 10 illustrate a suggested portable card unit 120 for recording data on a card media 121 in data tracks 122. Not all of the details of the portable unit are shown, but the unit includes an index assembly 123 associated with an index scale 124. Index assembly 123 carries a transducer 125 and is slidably mounted for positioning to individual tracks as indicated by scale 124. Principles of operation are similar to the card processing unit of FIGS. 3–7. The contrast with the card processing unit of FIGS. 3–7, wherein the driving wheels press an inserted card against a stationary surface to effect driving, the portable unit is provided with an idler wheel positioned adjacent one side of the card that presses the card against a driving wheel positioned adjacent the other side of the card. The unit includes a card switch assembly 126 for detecting the presence of an individual card.

A clutch magnet 127 is operative to move card 121 past transducer 125 to effect scanning of an individual data track 122. The unit has particular utility in connection with inventory operations, or the like, where it is desired to record numeric information on a card 121. This is effected by operator manipulation of the digital keys 0–9 that are included on the keyboard 129. Depression of a Stop (STP) button 130 effects recording of a Stop code on card 121. Similarly, depression of a Space (SP) button 131 effects recording of a Space code on card 121. Depression of a New LIne (NL) button 132 effects recording of a Carrier Return code in an individual data track 122 and operates a Step magnet 135 which through a linkage 136 moves transducer 125 to the next track on media 121. Depression of a New Card (NC) button 133 operates Clutch 127 to eject card 121 in readiness for recording operations in connection with a new card.

ABBREVIATIONS

The following abbreviations are used in the present case:

| | |
|---|---|
| AMP | Amplifier |
| AOI | And-Or-Invert |
| AOPI | And-Or-Power-Invert |
| AOX | And-Or-Extend |
| AX | And-Extend |
| BSP | Backspace |
| C Set | Character (or Space) Set |
| C1, C2, etc. | Circuit breaker No. 1, No. 2, etc. |
| C1 No, C2 No | Circuit breaker No. 1, No. 2 Open |
| C1 NC, C2 NC | Circuit breaker No. 1, No. 2 Closed |
| C1 TR, C2 TR | Circuit breaker No. 1 Trigger, etc. |
| CC | Converter Circuit |
| CHAR | Character |
| CJ | Can Justify |
| Clock MV | Clock Multivibrator |
| CLU | Clutch |
| CR | Carrier Return contact |
| CRR | Carrier Return trigger output |
| Cu 1, CU2, etc. | Escapement Length triggers |
| D STEP | Don't Step |
| DCI | Direct Coupled Inverter |
| DLY | Delay |
| DLY SS | Delay Single Shot |
| EJ | Encode Justify |
| EOC | End of Character Trigger |
| FCLU | Forward Clutch |
| F DIV | Finish Division |
| FJ | Finish Justification |
| FWD | Forward |
| GJ | Gate Justification Character |
| Group DET | Group Detector |
| Group SS | Group Single Shot |
| I | Inverter |
| II | Isolating Inverter |
| IN 1, IN 2, etc. | Inches First Binary Digit Count, Second Digit, etc. |
| INT | Interlock |
| IS | Initial Set |
| J Set or Set J | Set Justification Character (Record) |
| J | Justification |
| JL | Justify Line |
| L or LA | Latch |
| LC | Lower Case |
| LCC | Lower Case Contact |
| M 1, M 2, etc. | Synonymous with TR 1, TR 2, etc. |
| MD | Magnet Driver |
| MV | Multivibrator |
| NC | New Card |
| NL | New Line |
| OX | Or-extend |
| PCWL | Playback Character, Word, Line |
| P Set | Playback Set |
| PBK | Playback relay or Playback mode |
| R | Record relay or Record mode |
| R Set | Record Set |
| R-1, R-2, etc. | Record relay contacts 1, 2, etc. |
| RCWL | Reset Character, Word, Line |
| RMR | Reset Main Register |
| REC TR | Record Trigger |
| RST or Reset 1 | General Reset |
| RES OR Reset 2 | Printer originated Reset-Record mode |
| REV | Reverse |
| RJX | Record Justification |
| SJ | Start Justification |

| | |
|---|---|
| SJR | Start Justification Register |
| SP | Space |
| SS | Single Short |
| STP | Stop |
| SW | Switch |
| T-1, T-2, etc. | Transistor 1, 2, etc. |
| TAB | Tabulate |
| TL | Type Line |
| TR | Trigger |
| TR A, TR B | Trigger A, Trigger B |
| U 2, U 3, U 4 | Three fractional settings-binary equivalent |
| UC | Upper Case |
| UC 1, UC 2, etc. | Unit Count 1, 2, etc. |
| UCC | Upper Case Contact |
| UCR | Unit Count Registered |
| WS 1, WS 2, etc. | Word Space 1, 2, etc. |

BASIC CIRCUITS

The circuits of FIGS. 11*a*–38*d* are developed by the use of solid logic technology (SLT) blocks that are designated as indicated in the abbreviations section above.

In addition to fairly well known circuit blocks such as single shot (SS) trigger (TR) and latches (L), the circuitry includes logical blocks that are discussed in greater detail below.

And-Or Inverter (AOI) This is a basic circuit that supplies a 0 output with all inputs at a 1 level for the And function. If any of the inputs is at a 0 level, the output is a logical 1, thereby serving as an Or function. When only a single input and single output are utilized, the output will always be the inverse of the input, thereby serving as an Inverter.

And-Or Extender (AOX) The AOX block simply provides additional diode inputs to increase the logical capabilities of a driven logic block.

And-Or Power Inverter (AOPI) The AOPI block is comparable to the AOI block previously discussed but includes a transistor for powering purposes and increased current flow capabilities.

And-Extend (AX) The AX block performs an extending function similar to the AOX block.

Direct Coupled Inverter (DCI) The DCI blocks are inverters that are used in connection with an AOI block. The DCI block has one input. With a logical 1 input, the output will be at a 0 level. Or-Extend (OX) The OX block performs an extending function similar to the AOX block.

Isolating Inverter (I) The isolating inverter is used to invert signals from another block such as an AOI block so that the output will be at the same logical level as the input to the AOI block.

Converter Circuit (CC) The converter circuit is used to convert +48 volt levels to SLT levels. A +48 volt input provides a 0 level output. A ground level at the input provides a logical 1(+12 volts) output.

Magnet Driver (MD) The magnet driver circuit includes a number of transistors for driving a relay coil to +48 volts. A number of magnet driver blocks are shown in FIGS. 11*a*, 11*b*, and 11*c* for energizing the various magnets in the printer.

Figure 11A:
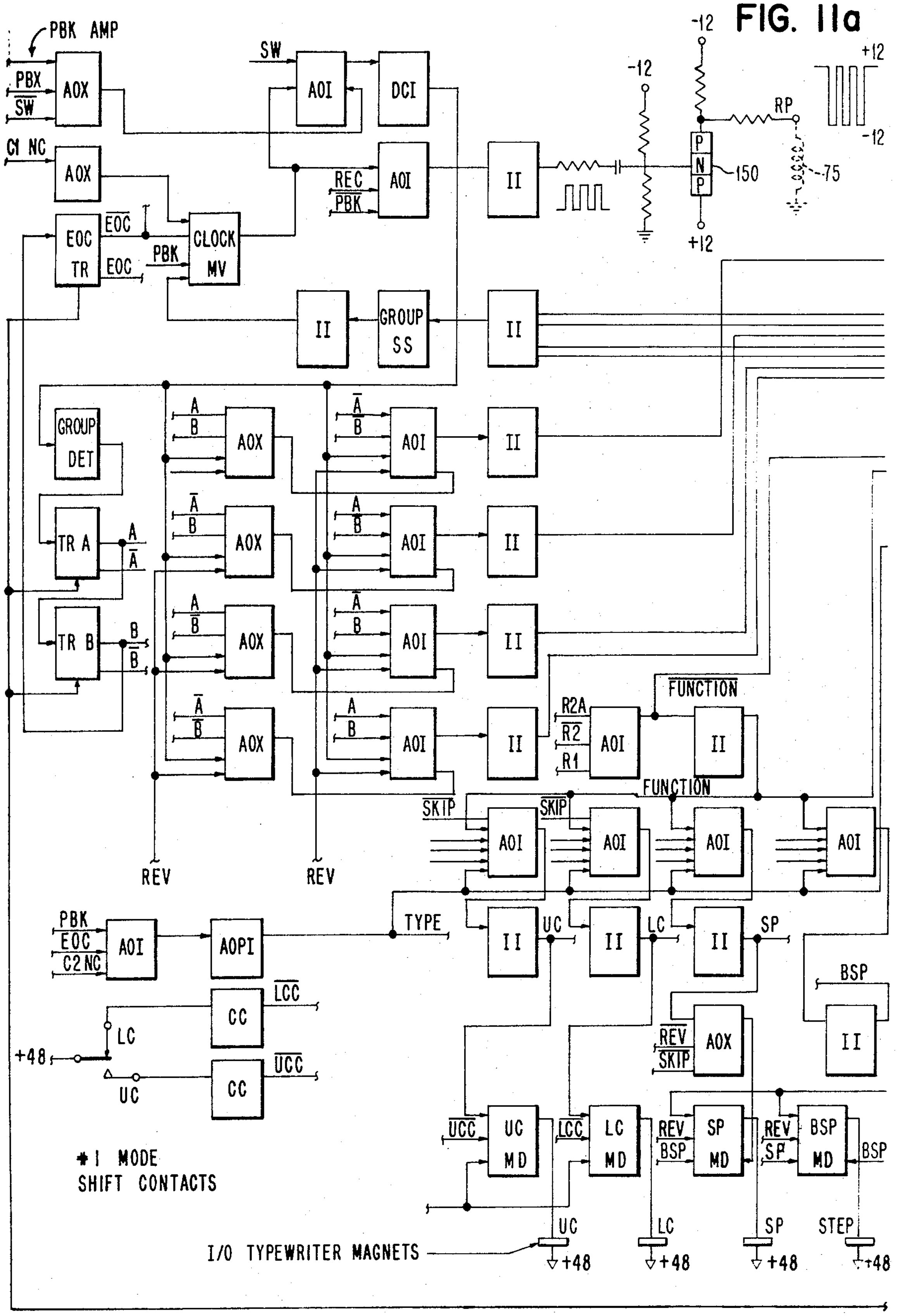
FIGS. 11*a*–11*d* when arranged as shown in FIG. 12, illustrate various circuits involved in a basic Record and a basic Playback operation of the system of FIG. 1.
Figure 11B:
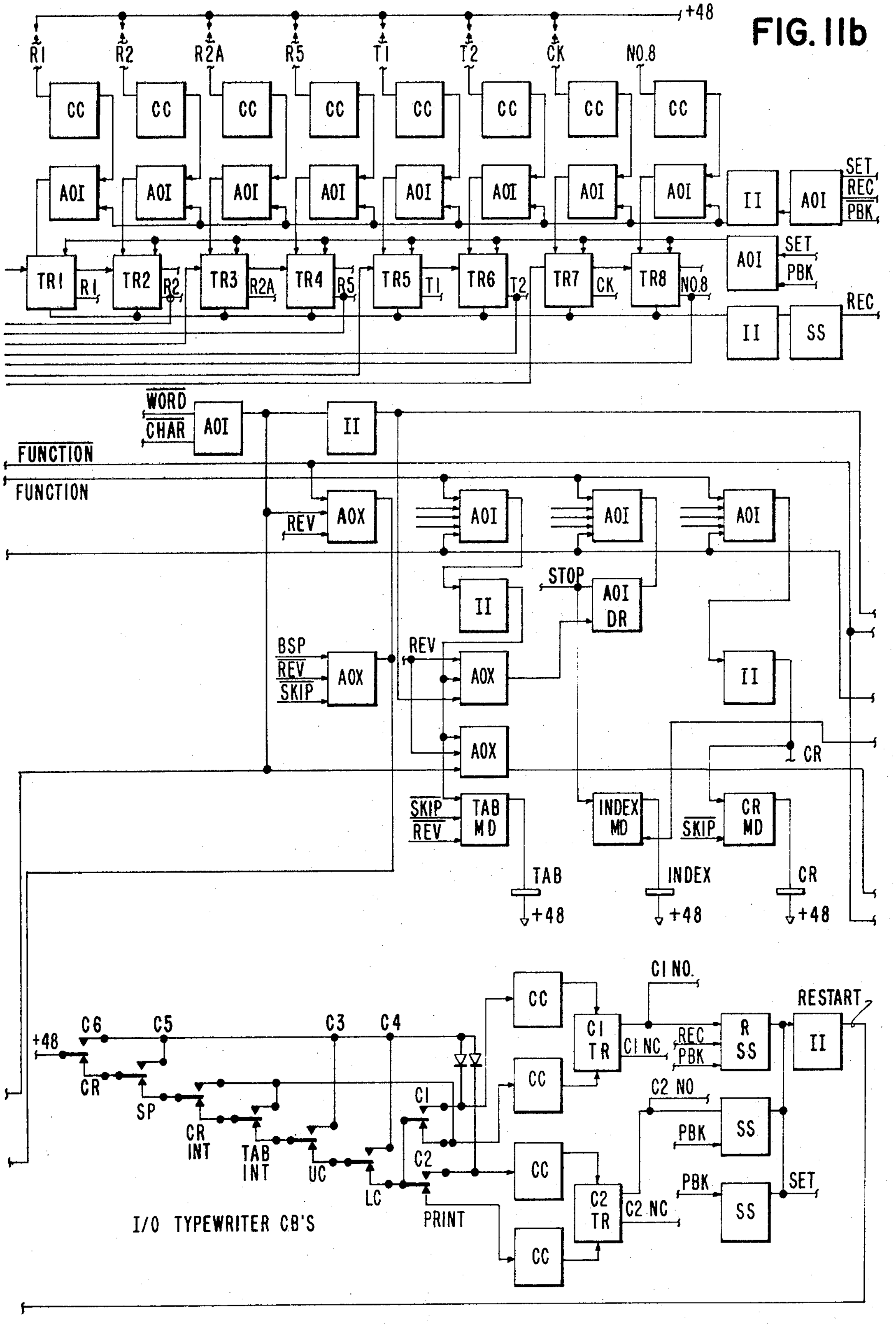
Figure 11C:
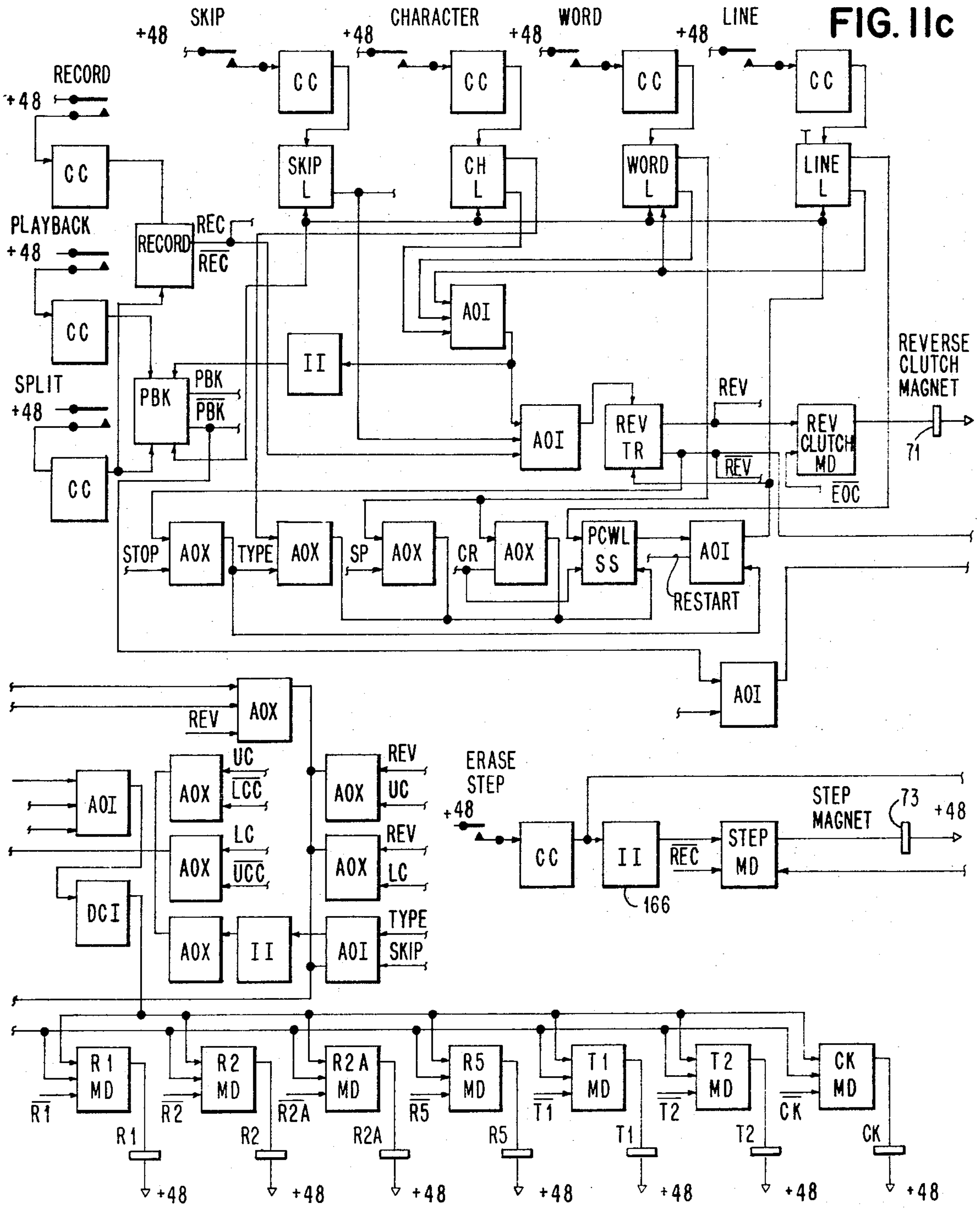
Figure 12:
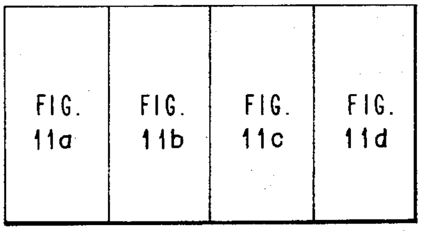

In addition to the foregoing logic blocks, FIG. 11*a* includes a Clock multivibrator for supplying clock pulses to drive the various circuits in a timed sequence. A wide range of clock rates can be accommodated in the circuits shown, but in a typical case, the Clock multivibrator provides pulses at a 1-kilocycle (kc) per second rate.

For additional information concerning solid logic technology (SLT) with logical applications, reference is made to the IBM SLT Manual, Form No. R23-2916, dated 1965.

Besides the foregoing blocks, a group detector, FIG. 11*a*, serves to supply an output to indicate the termination of a series of pulses representing digital data during Recording and Playback operations in the apparatus. The circuit has a number of transistors and a capacitor timing network that remains charged so long as impulses are applied to the input, but which times out at the end of a predetermined interval when pulses are no longer received at the input to supply a logical output to indicate the termination of the series of pulses.

RECORDING AND REPRODUCING PRINCIPLES

The 1965 Kolpek application describes certain principles of recording and reproducing data signals that are also used in the present apparatus. Reference is made to the Kolpek application for a detailed description of the recording and reproducing operations. However, a brief summary of typical operations in the Kolpek apparatus is believed in order at this time.

A Record mode is established by depression of the Record button, such as Record button 20, FIG. 2*a*. The Kolpek apparatus is then in a Standby mode awaiting signals from the printer resulting from the depression of keys on the keyboard. During both a Record mode and a Playback mode, characters are entered into a Register comprising eight triggers designated TR1–TR8. These correspond to the triggers shown in FIG. 11*b* for the basic Record-Playback embodiment, in FIG. 13*b* for the Justify Record-Justify Playback embodiment and in FIG. 15*a* which represents data flow during Justify operations. For convenience, the more generalized designation M1–M8 is used in FIGS. 15*a*–46*b* indicative of the fact that the triggers serve as a Main Register during Justify operations. Accordingly, the designations TR1–TR8 and M1–M8 are synonymous.

Returning to the Record operation in the 1965 Kolpek application, triggers TR1–TR8 are reset to their zero condition and subsequently set to states representing the code combination of a first character supplied in response to depression of a key on the keyboard. This involves closure of contacts designated R1, R2, R2*a*, R5, T1, T2, Check (CK) and No. 8. The Check contact may also be referred to as a Shift (SH) contact, as indicated in FIG. 13*b*. The printer includes a number of circuit breaker contacts as follows:

| | |
|---|---|
| C1 | Print Transmitting Contact |
| C2 | Print Feedback Contact |
| C3 | Upper Case Contact |
| C4 | Lower Case Contact |
| C5 | Tab, Space and Backspace |
| C6 | Carrier Return |

At C1 time, triggers TR1–TR8 are set according to the code configuration representative of the character or function selected in the printer. A Not End of Character ($\overline{EOC}$) level from the End of Character trigger (FIGS. 11*a* and 13*a*) actuates the Forward Clutch mechanism. The C1 contacts transferring initiate operation of the Clock Multivibrator. The printer code configuration entered into triggers TR1–TR8 is represented by four groups of impulses, each group of which may vary from one to four pulses of digital significance. In order to develop the four groups of pulses, triggers TR1–TR8 are divided into four trigger sets, each set comprising two triggers arranged as follows:

| | |
|---|---|
| Pulse Group 1 | TR1 and TR2 |
| Pulse Group 2 | TR3 and TR4 |
| Pulse Group 3 | TR5 and TR6 |
| Pulse Group 4 | TR7 and TR8 |

The four groups of triggers are gated under control of triggers TR A and TR B. Each pulse group whether it comprises one, two, three, or four pulses is separated from the preceding or succeeding pulse group by an interval of approximately 2 miliseconds that is derived under control of the Group Single Shot. With the foregoing arrangement, the characters are of variable length and therefore occupy a variable amount of space on the record media depending upon the code combination and the number of impulses developed for each character.

As an example, the shortest character has only four pulses, that is, 1 1 1 1, each pulse separated by approximately two milliseconds, and will occupy an interval on the media that requires approximately 12 milliseconds movement of the media. The longest character will have the following configuration:

1111 1111 1111 1111

In this case, the four groups of pulses are also separated by intervals of approximately 2 milliseconds and the total character interval is approximately 24 milliseconds. Some extra space exists in connection with each character set which is not occupied by pulses. In a typical situation, approximately 20 milliseconds would exist between individual character pulse sets.

Playback of information from the media in the Kolpek apparatus is initiated by depression of a Playback button, such as Playback button 21, FIG. 2*a*, in the present application. The Forward magnet and Clutch are energized and as the media moves past the transducer head, previously recorded digital impulses are developed in the head. Initially, the Playback latch output sets all triggers TR1–TR8 to their one state. The sets of pulses derived from the transducer head are applied to the appropriate trigger groups and establish the complement configuration of the character sensed. The final states of triggers TR1–TR8 are in turned complemented to derive the original code configuration. The status of triggers TR1–TR8 are then supplied to the printer to effect printing of a character or performance of a printer function under control of Magnet Drivers in the printer.

The recording and reproducing technique described in the 1965 Kolpek application and used in the present case is only one of many recording and reproducing techniques that may be applied in connection with the storage of digital signals on the magnetic card media 10. As an example, it is not necessary that the individual characters be of variable length as just described. It may be desirable, under some conditions, to record the actual code configuration of the character or some other code derivative configuration than converting the code to a variable number of digital impulses. In this connection, it may be desirable to record the character code combinations as taught in the Locklar, et al., and Sims patents noted in the Cross Reference section wherein each character occupies a uniform amount of space regardless of the combinations of "0" and "1" bits in the character.

TABLE LOOKUP

In the present apparatus, electronic arithmetic circuitry is used to derive justification information and to control the recording and reproduction of digital signals. Under some circumstances, it may be desirable to use factors that are permanently stored and that are accessed in dependence upon the number of interword spaces encountered in a line of rough copy and also dependent upon the line remainder encountered in a manner similar to that taught in the Jones, et al., application Serial Number (Docket 11,214). Reference is made to the Jones, et al., application for justification procedures involving Table Lookup.

CORRELATION OF LINES ON DOCUMENT WITH TRACKS ON STORAGE MEDIA

A basic correlation arrangement for storing digital signals representative of printed lines of information in individually associated tracks on a storage media is taught in the Jones, et al., application Serial Number (LE 9-67-031). The Jones, et al., application emphasizes a magnetic belt embodiment and the present apparatus adapts the correlation technique to a magnetic card record media with unique card processing facilities.

RECORD

Summary of Record Operation

Reference is again made to the section above concerning the magnetic card processing unit of FIGS. 3–7 for the details of the mechanical structures in the unit. The drive and gear trains provide for forward movement of a magnetic card media at approximately 2 inches per second. Reverse movement is also at a rate of 2 inches per second. The High Speed reverse movement effected by High Speed magnet 72, FIG. 3, occurs at a rate of approximately 15 to 16 Inches per second. Normally, this occurs during the time that print head 8, FIG. 1, is returning to the left margin on document 5. Card switch 100 with associated lever 90, FIG. 4, indicates the presence of a card in position for Recording or Playback operations.

When Record button 20, FIG. 2*a*, is depressed, Forward magnet 70 is energized to engage the Forward clutch and drive. A card is then inserted into the unit through slot 78, FIG. 4, and the Forward drive moves the card until card switch 100 transfers indicating that the card is in position for recording. From this point, each time a character is typed at keyboard 3, FIG. 1, the magnetic card unit, FIG. 3, increments the card, such as card 10, by means of the Forward clutch a sufficient distance to record the digital impulses representative of the key depressed.

Reverse magnet 71 is energized to activate the Reverse clutch and drive in order to scan a character, a word, or a line in the reverse direction to permit editing of the recorded information. When the printing of a line of information on document 5 is completed, the operator depresses the Carrier Return key on keyboard 3 effecting return of print head 8 to the left margin. When this occurs, a Carrier Return code is recorded on the record media at the end of the track of data that was just completed. Shortly after this, the High Speed Reverse magnet 72, FIG. 3, is energized to engage the High Speed cClutch and drive assembly to return the card in the opposite direction. Step magnet 73 is also energized to step transducer 75 to the next track on card 10. As the reverse assembly drives the card out of the unit 2, card switch 100 transfers releasing step magnet 73 and de-energizing High Speed Reverse magnet 72 to effect disengagement of the High Speed Reverse clutch. Concurrently, Forward magnet 70 is energized to return card 10 in the forward direction in relation to transducer 75 in readiness for the recording of data in the succeeding track. The operations just summarized continue until the printing of document 5 is finished, with each printed line being recorded in an associated storage track on media 10.

Detailed Sequence of Record Operation

The following tabulation indicates the detailed sequencing of mechanical and electrical circuit actions involved in the Record mode of operation:

RECORD

| STEP | ACTION | REFERENCE |
|---|---|---|
| R-1 | On-Off switch | FIG. 1 |
| R-2 | Split mode | FIG. 11*c* |
| R-3 | Record button | FIGS. 2*a*, 11*c* |
| R-4 | Record lamp | FIG. 2*a* |
| R-5 | Forward clutch starts | FIGS. 3, 11*c* and 11*d* |
| R-6 | Reset registers | FIG. 11*b* |
| R-7 | EOC condition | FIG. 11*a* |
| R-8 | Insert card | FIGS. 3, 4 |
| R-9 | Card feeds | FIGS. 3, 4 |
| R-10 | Card Switch closes and clutch drops | FIG. 4 11*d* |
| R-11 | Type | FIG. 1 |
| R-12 | Setup TR1–TR8 when CB's transfer | FIG. 11*b* |
| R-13 | EOC to $\overline{EOC}$ | FIG. 11*a* |
| R-14 | Forward clutch starts | FIGS. 3, 11*d* |
| R-15 | CB's open and start Clock Multivibrator | FIGS. 11*a*, 11*b* |
| R- 16 | Record bits on card | FIGS. 3, 11*a*, 11*b*, 11*d* |
| R-17 | $\overline{EOC}$ to EOC | FIG. 11*a* |
| R-18 | Clutch drops | FIG. 3, 11*d* |
| R-19 | Carrier Return | FIGS. 3 |
| R-20 | I/O performs CR | FIG. 11*d* |
| | Close CR contacts | |
| R-21 | Set CR Trigger - does nothing until CR Code recorded | FIG. 11*d* |
| R-22 | EOC to $\overline{EOC}$ | FIG. 11*a* |
| R-23 | Forward clutch | FIGS. 3, 11*d*, |
| R-24 | Record CR | FIGS. 3, 11*a*, 11*b* |

| | | |
|---|---|---|
| R-25 | $\overline{EOC}$ to EOC | FIG. 11*a* |
| R-26 | End of Record and CR Operate High Speed Reverse Magnet Driver and Magnet. Degate Head | FIGS. 3, 11*d* |
| R-27 | Card return until Card Switch opens | FIGS. 4, 11*d* |
| R-28 | Impulse Step Magnet | FIGS. 3, 4, 11*c* |
| R-29 | Reset CR | FIG. 11*d* |
| R-30 | Drop High Speed Magnet | FIG. 11*d* |
| R-31 | Drop Step Magnet | FIG. 11*c* |
| R-32 | Card Switch Opens Starts Forward Clutch | FIGS. 4, 11*d* |
| R-33 | Card Switch Closes and Clutch Drops (Card in position-new line) | FIGS. 4, 11*d* |
| R-34 | Record Stop Codes | FIG. 2*a* |

Turn On and Split Mode, Steps R-1 and R-2

Depression of an On-Off switch on keyboard 3, FIG. 1, establishes a Split mode that is comparable to the closure of the Split contacts, FIG. 11*c*.

Initial Record Conditions, Steps R-3 through R-7

Depression of Record button 20, FIG. 2*a*, closes contacts in FIG. 11*c* to set the Record latch. A Record lamp under Record button 20 is energized. Forward magnet 70 is energized to actuate the Forward clutch shown in detail in FIG. 11d. The Forward clutch magnet 70 is energized through a Forward Clutch Magnet Driver, FIG. 11*d*. In the basic apparatus, the Register TR1–TR8 is reset, FIG. 11*b*. In FIG. 11*a*, the End of Character trigger supplys an EOC signal.

Card Insertion, Steps R-8 through R-10

The operator of the equipment inserts a card in slot 78, FIG. 4, such as card 10. Card 10 feeds until the card switch 100 also shown in FIG. 11d, closes. This degates the Forward Clutch Magnet Driver to de-energize the Forward clutch, FIG. 11*d*.

Typing and Recording Characters, Steps R-11 through R-18

The recording of digital impulses in response to depression of a character key on keyboard 3, FIG. 1, or a functional key, is comparable to the recording action previously described in connection with the 1965 Kolpek application. The composer unit contacts R1, R2, etc. through No. 8, FIG. 11*b*, transfer and set up a coded character configuration in triggers TR1–TR8. The EOC trigger changes state and provides a Not EOC signal, FIG. 11*a*. The Not EOC signal is applied through the Forward Clutch Magnet Driver, FIG. 11*d*, to energize the Forward Clutch Magnet 70, FIG. 3, and to thereby engage the clutch to feed the card forward. Various circuit breakers in the composer unit transfer, the circuit breakers being shown in detail in the lower portion of FIG. 11*b*. This starts the Clock Multivibrator, FIG. 11*a*, the groups of bits in triggers TR1–TR8 are read out through transistor 150 to transducer 75, FIG. 11*a*. The EOC trigger changes state to supply an EOC output, Not EOC drops, and the Forward clutch is de-energized, FIG. 11*d*.

The action described in steps R-11 through R-18 continues for successive characters as they are entered through keyboard 3 and recorded in the related track 11 on magnetic card 10, FIG. 3.

Recognition of Carrier Return Operation and Termination of Recording, Steps R-19 through R-33

Figure 11D:
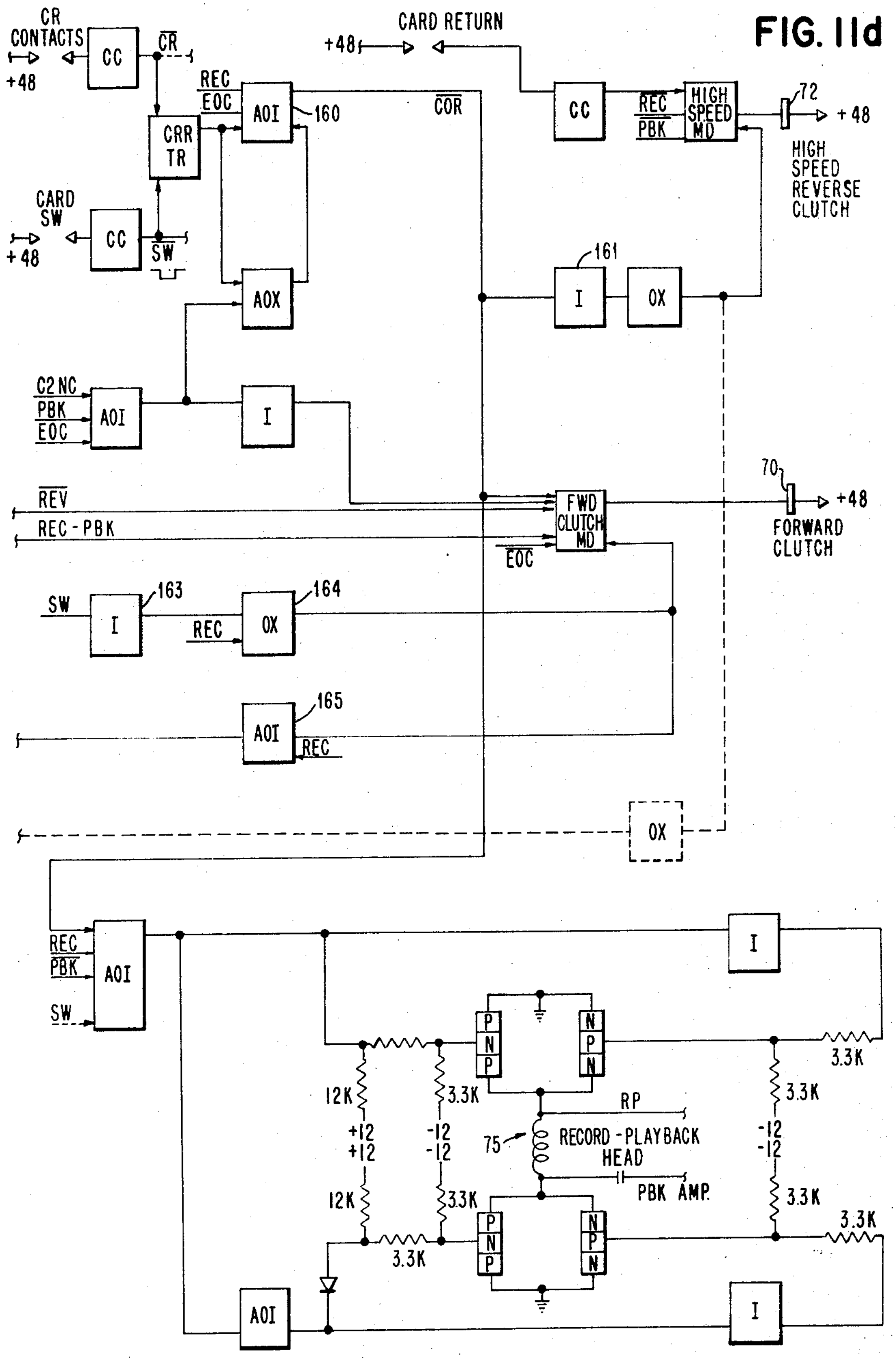

Depression of the Carrier Return button on keyboard 3, FIG. 1, transfers the Carrier Return contacts, FIG. 11*d*, to set the Carrier Register (CRR) trigger, which is inactive at this time until a Carrier Return code is recorded. The End of Character trigger, FIG. 11*a*, changes state to provide a Not EOC output. This energizes the Forward magnet 70 and actuates the Forward clutch to feed magnetic card 10. The Carrier Return code configuration is entered into triggers TR1–TR8 and is recorded as any other character. When the Carrier Return character has been recorded in the data track 11, the EOC trigger changes state to supply an EOC output which degates the Forward Clutch Magnet Driver, FIG. 11d. The Record mode signal together with EOC activates the AOI block 160, FIG. 11*d*, and through the Inverter 161 energizes the High Speed Reverse magnet 72 through the High Speed Magnet Driver associated with it. Transducer 75 is degated by circuits in FIG. 11*a* at this time.

Physically, the card returns toward an ejected position until card switch 100, FIGS. 3 and 11*d*, transfers. The switch transfer is reflected through an Inverter block 163, an OX block 164, an AOI block 165, FIG. 11*d*, and an II block 166, FIG. 11*c*, to energize the Step magnet 73 through the Step Magnet Driver. In FIG. 11*d*, the Carrier Return Register (CRR) trigger is reset by closure of the card switch. This drops the High Speed magnet 72, FIG. 11*d*, and also drops the Step magnet 73, FIG. 11*c*.

Due to inertia, card 10 feeds past the card switch slightly and it is necessary to return card 10 in the forward direction. This is done by recognizing the fact that the card switch 100 has transferred when card 10 moves out of engagement with lever, FIG. 4, and by energizing clutch magnet 70, FIG. 11*d*, to again start the card forward. Card switch 100 again transfers and Forward clutch magnet 70 is de-energized thereby positioning card 10 with transducer 75 in the proper position for the start of recording operations in a new data track 11, FIG. 3.

Recording of Stop Codes, Step R-34

During subsequent Playback procedures, it is desirable to have Stop codes at times, and these are recorded by depression of the Stop code button 24, FIG. 2*a*, which sets up an appropriate code configuration in Register TR1–TR8, FIG. 11*b* for the recording of the Stop code.

Reverse Clutch Operation

Provision is made for correcting previously recorded information in convenient categories of lines, words, or characters by depression of the associated buttons 26–28, FIG. 2*a*, which closes related contacts shown in FIG. 11*c*. The Reverse trigger, FIG. 11*c*, is set upon depression of the Skip button 29 and closure of the Skip contacts, FIG. 11*c*, to operate the Reverse Clutch magnet 71 in order to Scan a desired amount of information in the reverse direction for subsequent entry of corrected data from keyboard 3, FIG. 1.

PLAYBACK

Summary

A Playback operation is initiated by depression of Playback button 21, FIG. 2*a*. The Forward drive is activated and an inserted card is driven into position in the card processing unit 2, FIG. 3, for reading of the first character in the data track initially selected, which is normally the first track of data on card 10. Code combinations representative of characters are sensed by transducer 75, entered in Register TR1–TR8, FIG. 11*b*, and applied through magnet drivers shown near the bottom of FIGS. 11*b* and 11*c* to operate the composer unit 1, FIG. 1. Recognition of a Carrier Return code returns print head 8 to the left margin and operates Step magnet 73 to step transducer 75 to the next data track on card 10 as well as operating High Speed Reverse magnet 72 to return card 10 to the beginning of the next track in relation to transducer 75. The card is driven out of the recorder until card switch 100 FIG. 4, transfers. Thereupon, Reverse magnet 72 and Step magnet 73 are de-energized and Forward magnet 70 energized to drive card 10 forward for recognition of the first character in the succeeding line. Successive lines are read in a similar manner for operation of composer unit 1.

Detailed Sequence of Playback Mode of Operation

The following tabulation presents a detailed sequence of the Playback operation with steps designated P-1 through P-31.

PLAYBACK

| Step | Action | Reference |
|---|---|---|
| P-1 | On-Off switch | FIG. 1 |
| P-2 | Split mode | FIG. 11c |
| P-3 | Playback button | FIGS. 2a, 11c |
| P-4 | Playback lamp | FIG. 2a |
| P-5 | Set Register TR1–TR8 11 11 11 11 | FIG. 11b |
| P-6 | EOC | FIG. 11a |
| P-7 | Forward Magnet energized | FIGS. 3, 11d |
| P-8 | Forward clutch engages | FIG. 3 |
| P-9 | Insert card | FIGS. 3, 4 |
| P-10 (Repeat) | Card feeds | FIGS. 3,4 |
| P-11 (Repeat) | Read first character | FIG. 11d |
| P-12 (Repeat) | EOC to EOC | FIG. 11a |
| P-13 (Repeat) | Energize I/O Magnets per character Code | FIG. 11c |
| P-14 (Repeat) | CB's transfer | FIG. 11 b |
| P-15 (Repeat) | Reset TR1–TR8 11 11 11 11 | FIG. 11b |
| P-16 (Repeat) | Forward clutch starts | FIGS. 3, 11d |
| P-17 | Recognize CR Code | FIG. 11b |
| P-18 | EOC stop forward clutch | FIGS. 11a, 11d |
| P-19 | Perform CR<br>Close CR contacts | FIGS. 1, 11b, 11d |
| P-20 | Set CR Trigger | FIG. 11d |
| P-21 | Energize High Speed Reverse Magnet | FIG. 11d |
| P-22 | Energize Step Magnet | FIG. 11c |
| P-23 | Card Swtich transfers | FIGS. 4, 11d |
| P-24 | Reset CR Trigger | FIG. 11d |
| P-25 | Drop High Speed Magnet | FIG. 11d |
| P-26 | Drop Step Magnet | FIG. 11c |
| P-27 | Energize Forward clutch | FIGS. 3, 11d |
| P-28 | Feed card | FIG. 3 |
| P-29 | Read first character etc. | FIG. 11b |
| P-30 | Read Stop Code or C-W-L | FIG. 11c |
| P-31 | Stop | |

Turn On and Split Mode, Steps P-1 and P-2

Actuation of the On-Off switch to its On position on keyboard 3, FIG. 1, establishes a Split mode, FIG. 11c.

Initial Playback Conditions, Steps P-3 through P-7

To initiate Playback of a record card 10, Playback button 21, FIG. 2a is depressed. This closes Playback contacts shown in FIG. 11c and sets the Playback (PBK) latch, FIG. 11c. This also energizes a lamp under button 21 to indicate that the equipment is in a Playback mode. The register TR1–TR8 is reset with all trigger positions containing a "1". A Not EOC condition from FIG. 11a gates the Forward Clutch Magnet Driver to energize Forward Clutch magnet 70, FIG. 11d.

Insertion of Card and Reading of Characters, Steps P-9 through P-16

Card 10 is inserted in slot 78, FIG. 4, in the usual manner and is fed in relation to transducer 75, FIG. 3, to read the first data character in the selected data track, which is normally the first track on card 10. The Not EOC signal from FIG. 11a changes to EOC and drops Forward Clutch magnet 70, FIG. 11d. Meanwhile, the data signals sensed have been entered in trigger positions TR1–TR8 and applied through the magnet drivers in the lower portion of FIGS. 11b and 11c to operate composer unit 1. The circuit breakers in composer unit 1, shown in detail in FIG. 11b, transfer. Trigger positions TR1–TR8 are again set to the all "1's" condition. Not EOC again becomes active and energizes Forward Clutch magnet 70, FIG. 11d.

The foregoing action continues until the recognition of a Carrier Return code.

Recognition of Carrier Return Code, Carrier Return Operation, and Stepping to Next Data Track, Steps P-17 through P-29

Sensing of the Carrier Return code in the data track and entry of the code configuration in triggers TR1–TR8, FIG. 11b is accompanied by a change of state of the EOC trigger and an EOC output to degate the Forward Clutch Magnet Driver and de-energize Forward Clutch magnet 70, FIG. 11d.

Performance of the Carrier Return operation during which print head 8 is returned to the left margin of document 5, FIG. 1, closes the CR contacts and sets the CRR trigger, FIG. 11d. The High Speed Reverse clutch is actuated when magnet 72, FIG. 11d, is energized. Also, Step magnet 73, FIG. 11c, is energized to relatively displace transducer 75 and magnetic card 10 for scanning of the next data track. When card 10 is ejected far enough, card switch 100 transfers to reset the CRR trigger and drop High Speed magnet 72, FIG. 11d, as well as de-energize Step magnet 73, FIG. 11c. Transfer of card switch 100 energizes Forward Clutch magnet 70, FIGS. 3 and 11d, to feed card 10 forward, whereupon the first character of the succeeding track is read and Playback operations continue.

Recognition of Stop Code or Character, Word, and Line Categories, Steps P-30 and P-31

Reference is made to the 1965 Kolpek application for a description of the recognition of Stop codes and the categories of information including Characters, Words, and Lines. In any of the foregoing kinds of category recognition, Playback latch, FIG. 11c, is reset and the apparatus returns to a Split mode.

The foregoing category recognition operations permit the operator of the equipment to playback predetermined quantities of data under control of previously recorded Stop codes, where desired, or to playback the indicated categories of Characters, Words, and Lines. If the Skip button 29 is depressed in association with a Character, Word, or Line button, a corresponding amount of information is skipped rather than played back for operating the printer.

JUSTIFY RECORD summary

The basic recording technique described for Record above is also used during Justify Record. That is, the data signals are in the form of variable length code combinations. The composer unit-magnetic card unit combine to produce justified copy on a document. The justification procedures will be described in conjunction with a Single Column justification mode.

Figure 15A:
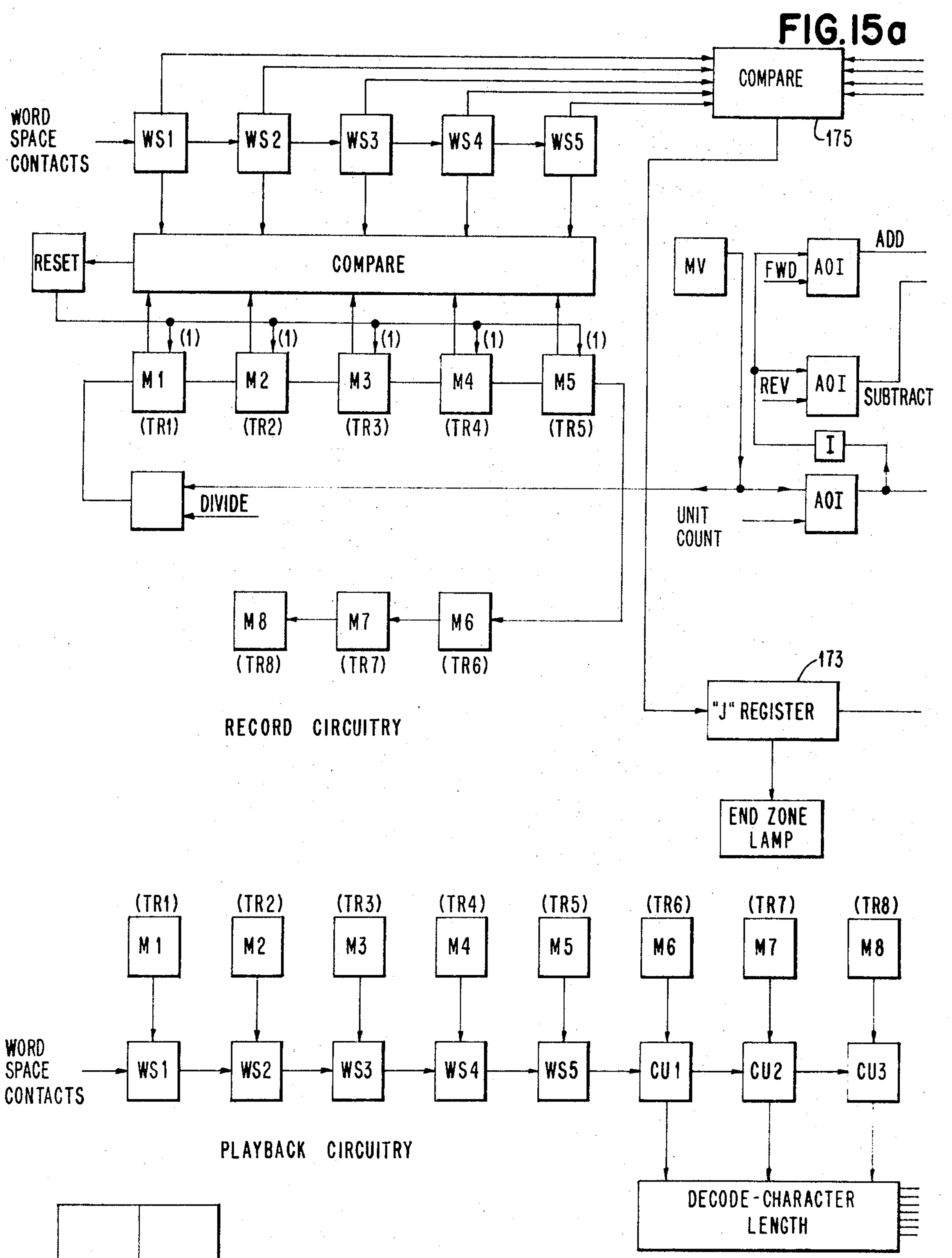
FIGS. 15*a* and 15*b*, when arranged as shown in FIG. 16, represent a data flow diagram for Justify Record and Justify Playback in connection with the operator controls of FIG. 2*b* and as illustrated in greater detail in FIGS. 17–38*d*.
Figure 16:
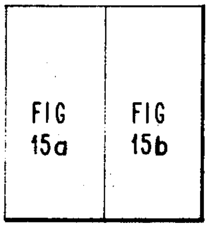
Figure 15B:
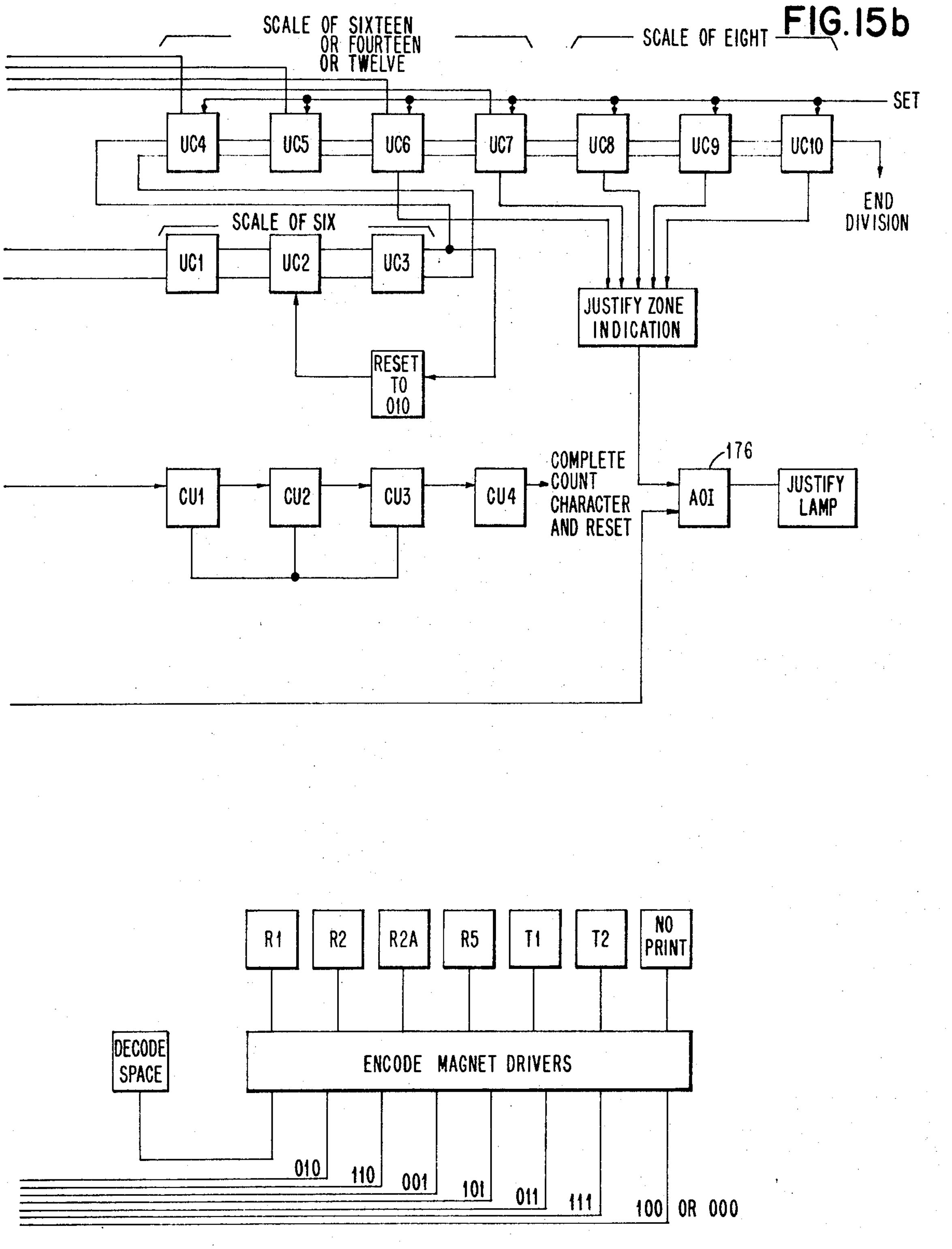
Figure 32:
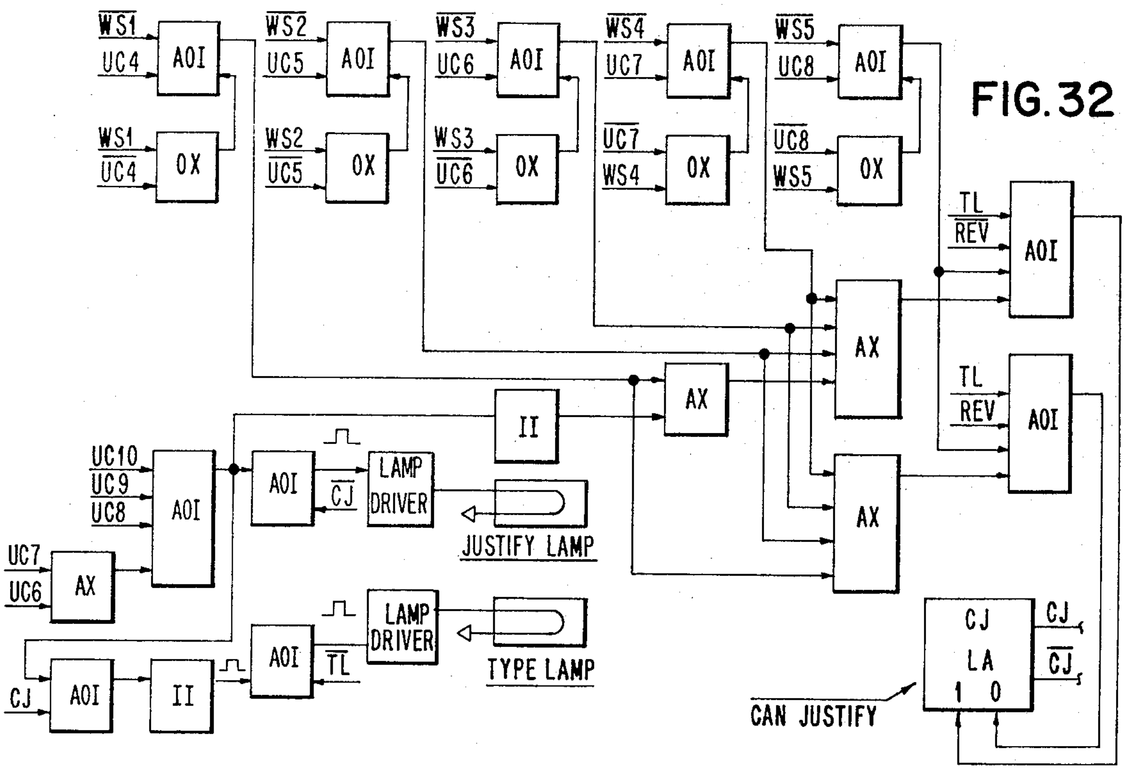
FIG. 32 contains circuits for setting and resetting a Can Justify (CJ) latch together with circuits for energizing a Justify lamp and a Type lamp.

The operator first types a rough copy, stopping at a convenient place when the Justify lamp, FIGS. 15b and 32, advises that the line may be justified. While the copy is being typed, the document information, as well as the justification information, is being recorded on card 10.

The operator selects a desired type font pitch (12, 14, or 16) and a desired justified line length (inches and fractions) by setting dials in FIG. 2b (switches shown in FIGS. 20–22c).

FIGS. 15a and 15b aid in the explanation of the operation. The Main Register, designated M1–M8 (synonymous with TR1–TR8) is shown along with a number of supplementary registers. The operator places the device in the Justify Record mode which activates the Forward clutch, FIGS. 3 and 11d. When card 10 is inserted, it is moved until card switch 100 transfers, FIG. 4. Initially, card 10 is again moved a distance sufficient to accommodate the maximum character length, but without actually recording. This establishes space at the beginning of the tack to accommodate the Justification Character associated with the track of data. The Main Register is reset to "0".

The operator now types a line of text. As the first character is typed, the Main Register receives the coded information and causes it to be decoded to indicate the number of escapements units required for this character by an increment translator.

The complement of this is registered in the escapement length registers CU1–CU3, after which the multivibrator MV steps the CU1–CU3 register to 0, thereby developing a pulse for each escapement increment to be introduced into the Unit Count or Increment register UC1–UC10. These registers are divided into a Scale of 6 counter, a Scale of 16 counter and a Scale of 8 counter. This allows for a line 8 inches long using either a 12, 14, or 16 pitch. The line length and unit count registers are set when the operator sets the switches, FIG. 2*b*, one indicating the number of even inches in the line and the second indicating the number of picas or sixths of an inch over the number of even inches in the line. The complement of the number of inches registered on the dial is set into the Scale of 8 counter. Also, the complement of the number of picas is set into the Scale of 16 counter, depending on the pitch selected by the operator. For example, if the operator has a pitch of 12 and wants to type a line 34 picas long the inch dial is set to 5 (30 picas) and the Fractions dial to 8/P = 8/12 or 4/6 or 4 pica (total 34). A conversion table may be provided to show the inches and fractions of an inch for a given pica and a given pitch. The switch settings cause a 3 to be set into the Scale of 8 counter indicating that 5 inches remain, and an 8 into the Scale of 16 counter indicating that 8 ' 6 increments, or 4 pica (4/6 72=48) remain in the register. The Scale of 16 counter is reset to 4, with the composer set to 12 pitch. If it is set to 14 pitch, this counter is reset to 2, and for 16 pitch it is reset to 0. At the beginning of each line, however, the device resets to 8 because of the dial setting for this example.

Each character is typed and decoded and causes the unit count of the line to be advanced. When a space is typed by the operator the count is advanced by 3 units. However, each space typed is also counted and registered in the Word Space counter WS1–WS5.

When the number of word spaces is equal to the complement of the count in the Scale of 16 counter with the complement of count in Scale of 8 (or Inches register at 0), the space comparator registers this fact in the J register, indicating the line may now be justified. When the line may be justified and a count of 4 remains in the Scale of 16 counter, the Justify lamp, FIG. 15*b* will be lighted indicating that 24 increments, approximately four characters, remain in the line. If the word can be finished in four characters, the operator does so, and then Carrier Returns, completing the line. If the line cannot be completed and a word has just been started, backspacing can be done. If the Justify lamp remains lighted after backspacing, the line may be completed at this point by performing a Carrier Return. If the word is too long, the word may be hyphenated in the next three characters and again a Carrier Return completes the line.

The Carrier Return code actuates the High Speed Reverse clutch. The card is returned to the Justify Character area previously set aside in the data track. Simultaneously, multivibrator MV causes both the Main Register to count and the Increment Register to count. The Main register (TR1–TR8) is now arranged as a scale of 256 binary counter. It is initially set to 1111 1111 (all ones). If there is any increment remaining in the Increment register the Main register will receive at least one impulse causing it to go to 0000 000 (all zeros). When a comparison occurs between the Word Space register and the first five positions of the Main register, the first five positions of the Main register are reset to 11111. In all cases, the next impulse from MV will be counted by the remaining three unit registers. In this way the increments left in the line are divided by the number of word spaces and the quotient is registered in the last three units of the Main register. When the increment register is empty (0000000000) (all zeros) the multivibrator stops, and the first five positions of the Main register contain the count of the remainder.

The Forward magnet is now operated and the information located in the Main register is recorded as the first character of the line. Following this, the Step magnet is operated and transducer 75 is stepped one track over in position to record the first character of the next line. In this manner, the entire document is typed line by line with a justification character preceding each line.

After the document is completed, the operator positions the transducer back to the first line and places the machine in the Justify Playback mode, to be described in a later section.

Selection of Pitch and Line Length

Provision is made in the form of manually settable switches, FIG. 2*b*, for the operator to select the pitch of the type font on print head 8 as well as a desired justified line length. The switches operate contacts shown in greater detail in FIGS. 20, 21*a*–21, and 22*a*–22*c*. the operator selects pitch by manipulating the knob 34, FIG. 2*b*. This conditions one of the CC circuits, FIG. 20, to provide an output for setting the Scale of 16 counter comprising trigger positions UC4–UC7, FIGS. 15*b* and 18. Reference is made to the "Summary" section for typical settings of the switches, including the pitch switch.

Figures 21A, 21B:
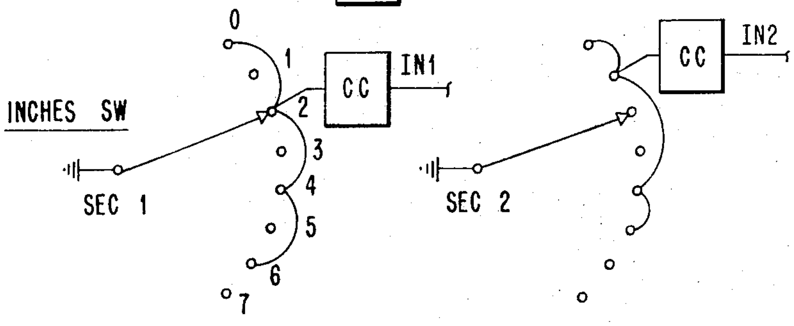
FIGS. 21*a*, 21*b*, and 21*c* show various sections of an "Inches" switch, also shown in FIG. 2*b*.
Figure 21C:
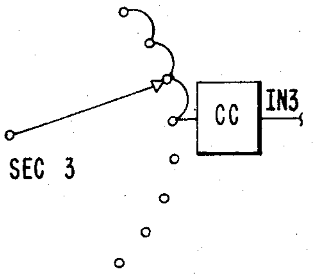

Trigger positions UC8–UC 10 serve as a Scale of 8 counter for storing a number representative of the number of inches remaining in a line to be justified and are set under control of the Inches switch section in FIGS. 21*a*–21*c*.

Figures 22A, 22B, 22C:
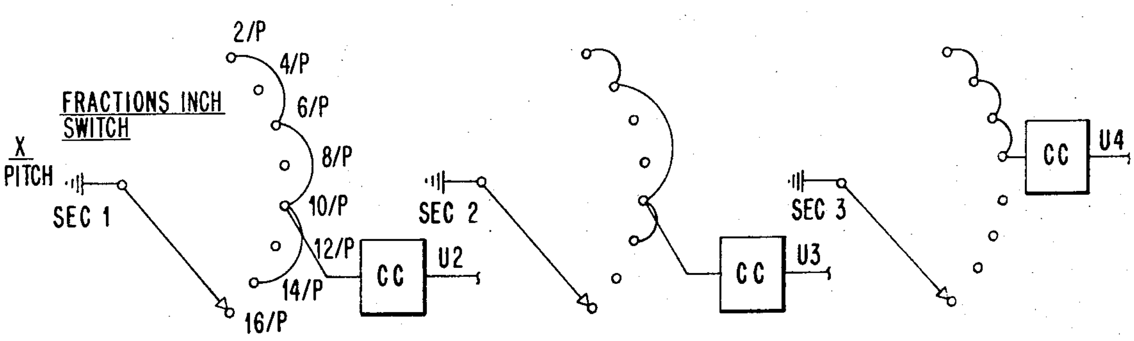
FIGS. 22*a*, 22*b*, and 22*c* illustrate a number of sections of a "Fractions of an Inch" switch, also shown in FIG. 2*b*.

Actually, the setting of the Pitch switch and the Fractions of an Inch switch sections in FIGS. 22*a*–22*c* determine the setup of triggers UC4–UC7 to indicate the number of increments of line length that remain.

Detailed Sequence of Justify Record Operation

The tabulation given below shows the detailed sequence of a Justify Record operation, including steps designated JR-1 through JR-71.

JUSTIFY RECORD

Figures 23, 24, 25, 26, 27:
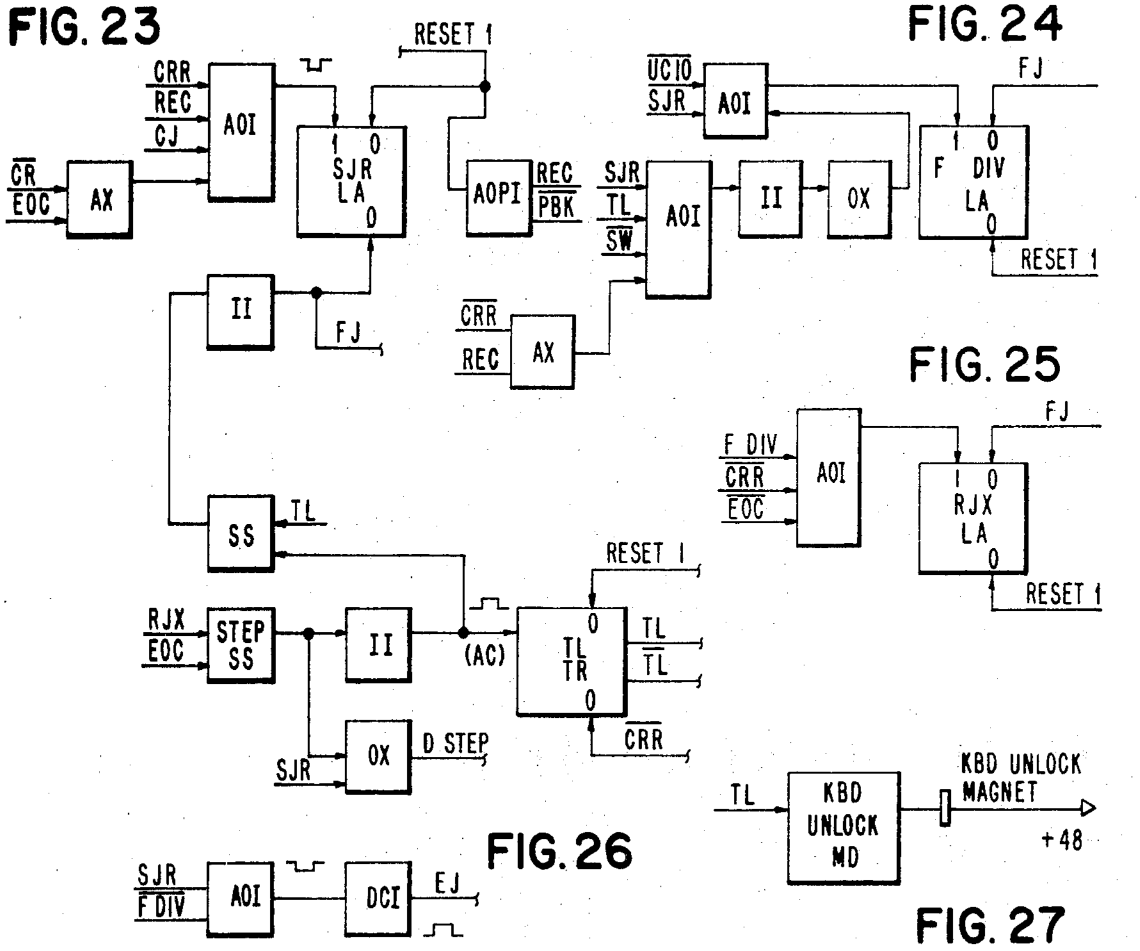
FIG. 23 shows a Start Justify (SJR) latch and a Type Line (TL) latch.
FIG. 24 shows a Finish Division (F DIV) latch and associated circuits.
FIG. 25 shows a Record Justification (RJX) latch.
FIG. 26 is a circuit for supplying an Encode Justify (EJ) character signal.
FIG. 27 illustrates a keyboard unlocking circuit.

| Step | Action | | Reference |
|---|---|---|---|
| JR-1 | On-Off switch | | FIG. 1 |
| JR-2 | Split mode | | FIG. 11*c* |
| JR-3 | Justify Record button | | FIGS. 2*b*, 39 |
| JR-4 | Justify Record lamp | | FIG. 2*b* |
| JR-5 | Feed Clutch starts | | FIGS. 3, 11*d* |
| JR-6 | Reset Registers | | FIGS. 13*b*, 15*a*, 15*b* |
| JR-7 | EOC condition | | FIG. 11*a* |
| JR-8 | Insert Card | | FIG. 4 |
| JR-9 | Card feeds | | FIGS. 3, 4 |
| JR-10 | Card Switch closes | | FIGS. 4, 11*d*, 39 |
| JR-11 | F DIV Signal Sets RJX | | FIGS. 24, 25 |
| JR-12 | Set J | | FIG. 13*a* |
| JR-13 | Operate DLY SS | | FIG. 13*a* |
| JR-14 | $\overline{EOC}$ | | FIG. 13*a* |
| JR-15 | Start Clock MV | | FIGS. 13*a*, 39 |
| JR-16 | Main Register Functions as if it were recording 4 groups of pulses. Leaves space for Justify character. | | FIGS. 13*b*, 39 |
| JR-17 | Operate Step SS (50ms). But inhibit step magnet | | FIGS. 23, 39 |
| JR-18 | Operate Type Line (TL) Stays up until get CR, Entire Line | | FIGS. 23,39 |
| JR-19 | Keyboard Unlocks | | FIGS. 27, 39 |
| JR-20 | Type Character "a" I/O Unit Count 5 | | FIGS. 1, 40*a* |
| JR-21 | $\overline{5X} \rightarrow 5X$ $\overline{X} \rightarrow X$ $\overline{5} \rightarrow 5$ X X X | Set up Char in TR-1-TR-8 | FIG. 36 |
| JR-22 | Drop EOC ($\overline{EOC}$) Start Clutch | Record char. "a" as in basic record sequence | FIGS. 13*a*, 13*b*, |
| JR-23 | C Set Set UCR | When C1 CB tfrs. in | FIGS. 13*b*, 33, 34 |

Figure 36:
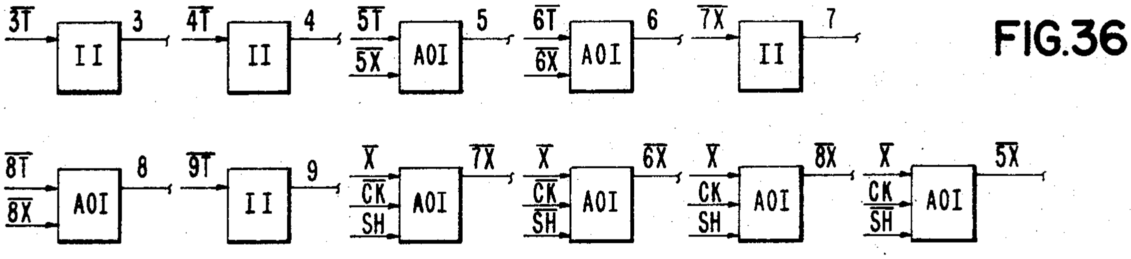
FIG. 36 illustrates circuits for deriving escapement values from contacts in the composer unit of FIG. 1 during the entry of rough copy data in the system.

| | | | |
|---|---|---|---|
| | | I/O, Set C1 trigger | |
| JR-24 | CU1, CU2, CU3, CU4 Set to 5 from - contacts in FIG. 13b to FIG. 37 decode to FIG. 36. | Sets them up depending on code of char. In this case 5 units - Set complement in so will later take 5 pulses to go to "0". | FIG. 33<br>FIG. 36<br>FIGS. 13b, 37 36. |
| JR-25 | Start MV2. Count 5 into CU1, CU2, CU3 - on 5th pulse, get pulse out of CU4. Also pulse UC1, UC2, UC3. (Scale of 6 Counter UCR) Unit Count UC1-UC2-UC3<br>0 1 0<br>UC1 UC2 UC3<br>1 1 1 | | FIG. 33 |
| JR-26 | Reset UCR -when have count of 6. UC1 UC2 UC3<br>0 ● 0 | Need 1st pulse from next character in this case. | FIG. 34 |
| JR-27 | Type character "t" Unit Count 4 | | FIGS. 1, 40g |
| JR-28 | I/O Contacts | | FIG. 13b |
| JR-29 | {4T → 4T<br>{$\overline{4}$ → 4<br>(Decode FIGS. 37 & 38) | | FIGS. 37a, 36 |
| JR-30 | C Set C1 Trigger | Contacts transfer in I/O. | FIG. 13b |
| JR-31<br>JR-32 | Set UCR<br>Set CU1, CU2, CU3, CU4. Set to 4. | EOC to $\overline{EOC}$ According to character "t" - See timing chart FIG. 40b. | FIG. 34 |
| JR-33 | Start MV2. Count CU1, 2, 3, 4 out to 0 0 0 0. Also add into UC1 etc. First pulse causes UC1-UC2-UC3 to go to 0 0 0. That pulses UC4. | | |

Also resets UC2 to "1" state, so state is:

| | UC1 | UC2 | UC3 | UC4 |
|---|---|---|---|---|
| | 0 | 1 | 0 | 1 |
| Second pulse | 1 | 1 | 0 | 1 |
| Third pulse | 0 | 0 | 1 | 1 |
| Fourth pulse | 1 | 0 | 1 | 1 |

So UC1, etc. has a total of "9"(5 & 4).

Figure 40A:
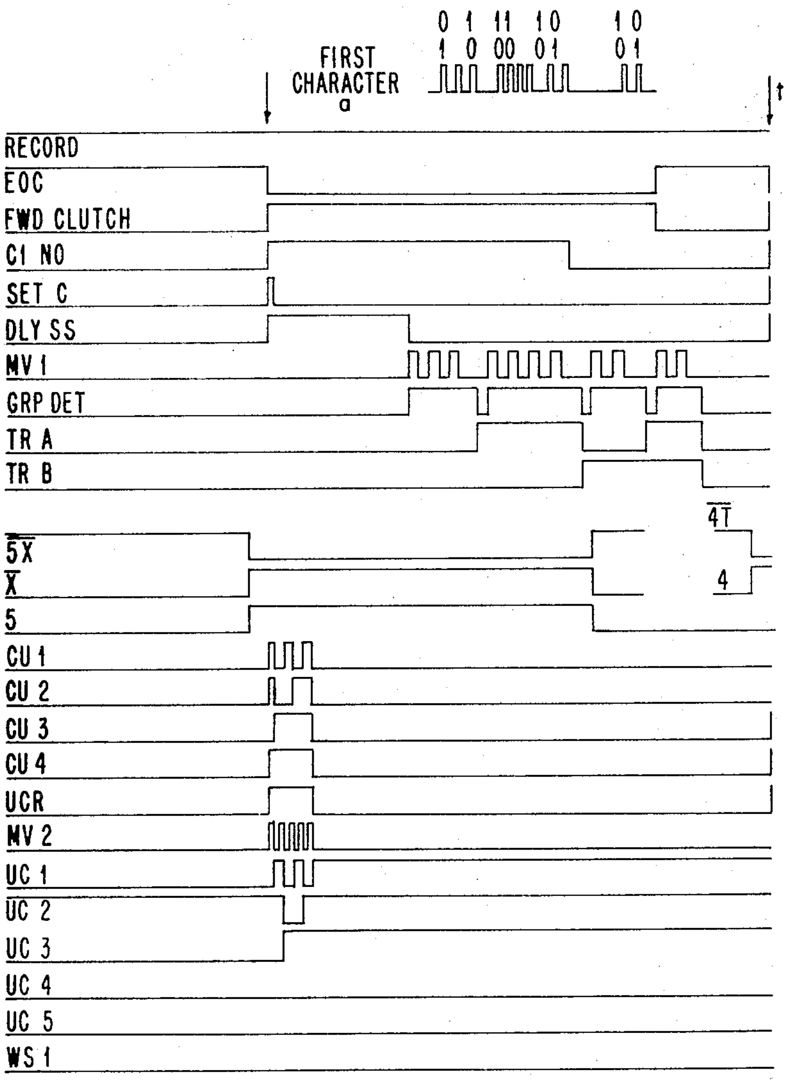
FIGS. 40a and 40b, when arranged as shown in FIG. 41, illustrate wave form and circuit conditions during the entry of a character a, a character t, and a "space" character.
Figure 41:
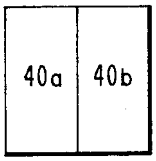
Figure 40B:
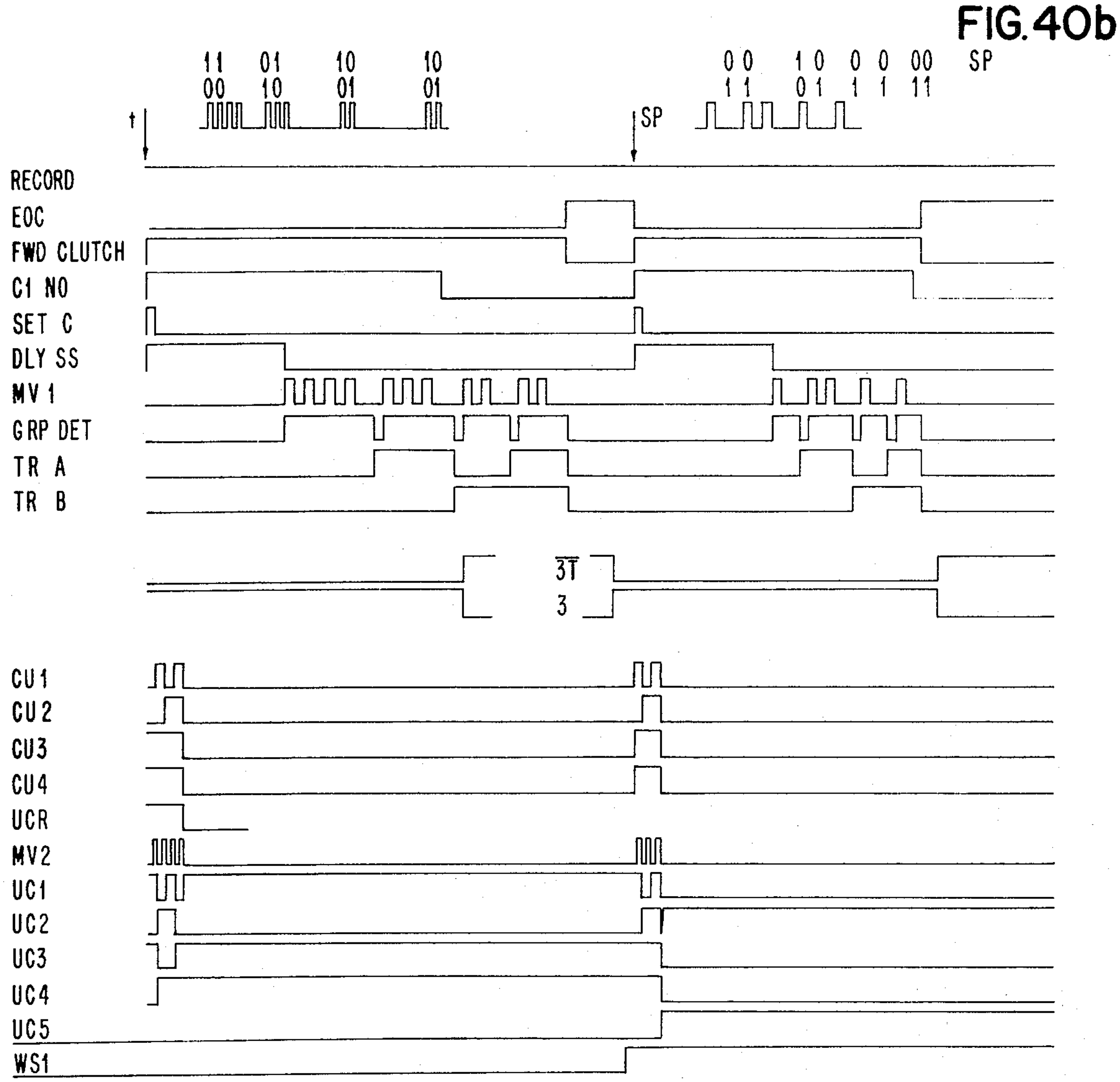

| | | | |
|---|---|---|---|
| JR-34 | Space | | FIGS. 1, 40b |
| JR-35 | Space I/O | | FIG. 1 |
| JR-36 | Space I/O Contacts close C4 contacts. C2 Contacts A11 Playback & Record Functions. | | FIG. 13b |
| JR-37 | $\overline{3T}$<br>3 | FIG. 37- Operate WS1 - FIG. 30. Will count up to 32 spaces. | FIGS. 37, 38 |
| JR-38 | C Set EOC to $\overline{EOC}$ C 4 (space) recording of spaces. | Normal | FIGS. 13b, 13a |
| JR-39 | Set UCR | | FIG. 34 |
| JR-40 | Set CU1, 2, 3, 4 | | FIG. 33 |
| JR-41 | Start MV2 | Count: C1-C2-C3-C4 - 0 0 0 0. Set 3 more pulses in UC1, 2, 3 9 + 3 = "12" 0 1 0 0 1 | FIG. 33 |
| JR-42 | Carrier Return Key | | FIGS. 1, 42a |
| JR-43 | I/O performs Carrier Return | EOC to $\overline{EOC}$ Record CR | FIGS. 13a, 13b |

| | | | |
|---|---|---|---|
| JR-44 | CR trigger | As in basic Record operation. | FIG. 11d |
| JR-45 | CRR | | FIG. 11d |
| JR-46 | Drop Type Line (TL) | EOC | FIG. 23 |
| JR-47 | Start Justify Register (SJR) | When CR is recorded. | FIG. 23 |
| JR-48 | Encode Justify (EJ) | | FIG. 26 |
| JR-49 | Rearranges Main Register (TR1-TR8) | Splits up into 5 one set of 5 triggers and another set of 3 triggers. Scale of the counter depends on the number of word spaces in the line. Assume "5" word spaces. | FIGS. 13a, 13b, 15a |
| JR-49 | "1"+"4" | So will be a scale of 5 counter. | |
| | End Zone & Justify Zone | Assume are "24" units from right margin. | |
| JR-50 | Start MV2. Reset all Registers TR1-TR8 to 1. First pulse takes them to all "0"'s. | | FIG. 33 |
| | Pulse UC1 etc. register will pulse it 24 times. | | FIG. 19 |
| JR-51 | Assume 5 counts, Nos. 2, 3, 4, 5, 6. Reset TR1-TR5 all to "1" | | FIGS. 13b 15a |
| JR-52 | Refer to FIG. 31. Will get RMR output. | | FIG. 31 |
| JR-53 | Reset Main TR1 - TR5 Register to: 0 0 0 0 0 | | FIGS. 13b, 15a |
| JR-53 | 6th pulse set to "0"& carry over sets TR7. | | |
| JR-54 | Same time will set TR6 to "1" with pulse No. 6. Work as binary counter. | TR6 - 7 - 8<br>1 0 0 | FIG. 13b |
| | Pulse with pulses Nos. 7, 8, 9, 10, 11<br>11111 A11 zeros | TR6 - 7 - 8<br>0 1 0 | |
| | Nos. 12, 13, 14, 15, 16 | 1 1 0 | |
| | Nos. 17, 18, 19, 20, 21 | 0 0 1 | |
| JR-55 | 24 Units<br>5 spaces<br>+ 4 last space only<br>+ 1 on each of first four spaces | No. of Long Spaces | FIG. 13b<br>Represents "5" Units<br>+ 4 Units |

5 Units

| | TR1 | TR2 | TR3 | TR4 | TR5 | TR6 | TR7 | TR8 |
|---|---|---|---|---|---|---|---|---|
| 22, 23, 24 | 1 | 1 | 0 | 0 | 0 | 0 | 0 | 1 |

FIG. 19

| | | | |
|---|---|---|---|
| JR-56 | When UC10 goes to $\overline{1}$, that is, 0, when count all 24 pulses Goes from all 1's to 0's | | |
| JR-57 | F. DIV | Now have Line Remainder + Long Space count | FIG. 24 |
| JR-58 | Note - See Space length code in Playback<br>$\overline{CU1}$ $\overline{CU2}$ CU3 SP = 8 Unit Output (3 + 5)<br>then<br>CU1 CU2 $\overline{CU3}$ SP = 7 Unit Output (3 + 4) | | |
| JR-59 | Card Switch transfers | | FIGS. 11d, 42b |
| JR-60 | High Speed Reverse Magnet Drops | | FIG. 11d |
| JR-61 | Forward clutch | | FIGS. 11d, 42b |

Figures 33, 34, 35:
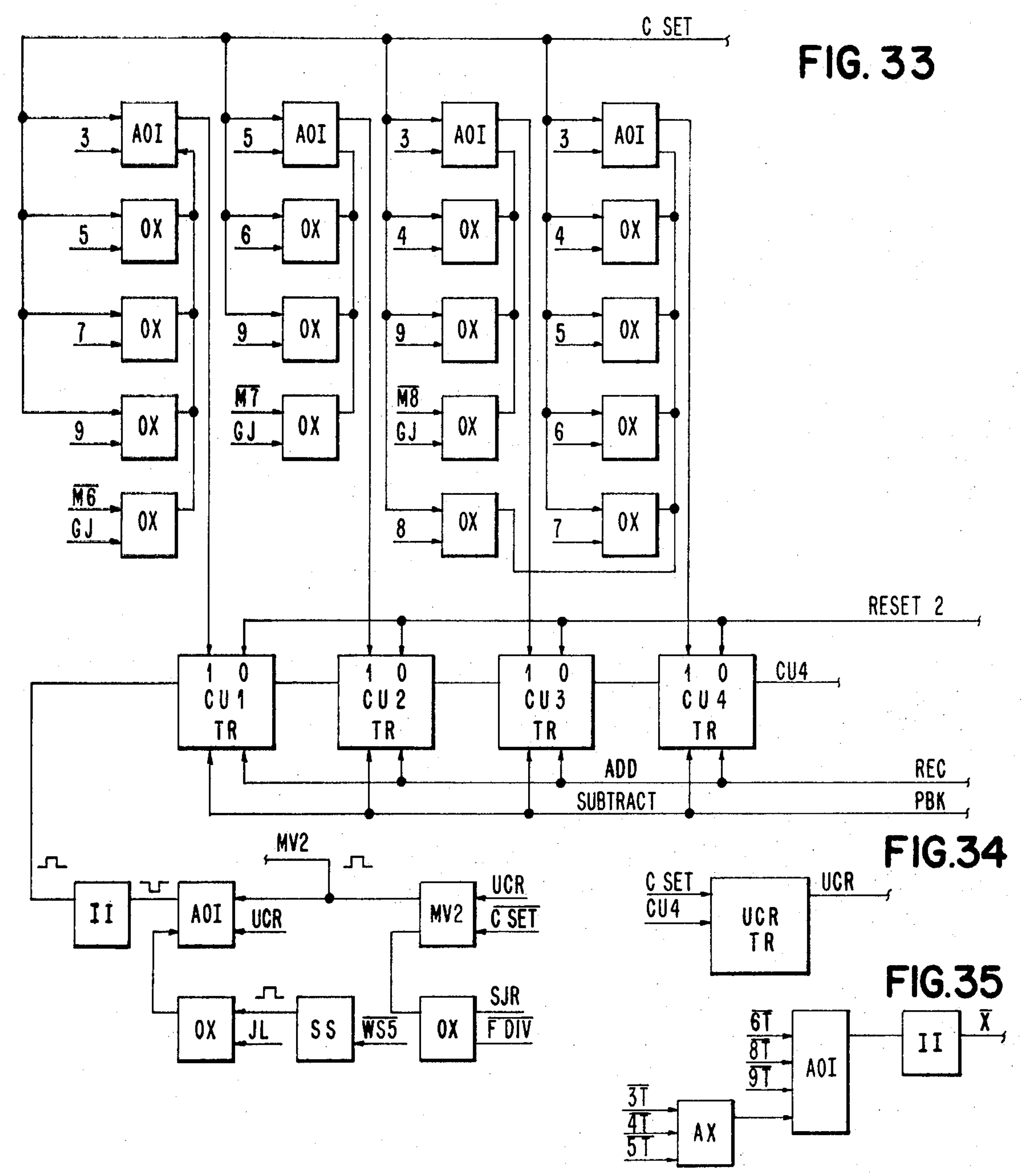
FIG. 33 shows a four position register with triggers designated CU1–CU4 and associated circuits for storing escapement lengths of characters.
FIG. 34 shows a Unit Count (UCR) trigger.
FIG. 35 is a circuit for deriving a Not X signal.

| | | |
|---|---|---|
| JR-62 | Card Switch transfers | FIGS. 11*d*, 42*b* |
| JR-63 | Now return to where put card in | FIGS. 11*d*, 42*b* |
| JR-64 | Set J | FIG. 13*a* |
| JR-65 | Operate DLY SS | FIG. 13*a* |
| JR-66 | EOC Start Clutch | FIGS. 11*d*, 13*a* |
| JR-67 | Start Clock MV2 | FIG. 33 |
| JR-68 | Main Register has a Justify Character in it 1 4 4 2 | FIGS. 13*b*, 15*a* |
| JR-69 | 1 1111 1111 11 of TR1-TR8 on card | FIGS 13*a*, 13*b* |
| JR-70 | Operate Step SS to next track after EOC. Inherently, an empty space is provided at beginning of next line. | FIG. 23 |
| JR-71 | Operate Type Line (TL) next line. | FIG. 23 |

Turn On and Split Mode, Steps JR-1 and JR-2

When the On-Off switch is moved to On position, the apparatus assumes a Split mode as described in connection with previous operations.

Initial Conditions for Justify Record Operation, Steps JR-3 through JR-7

Figures 13A, 14:
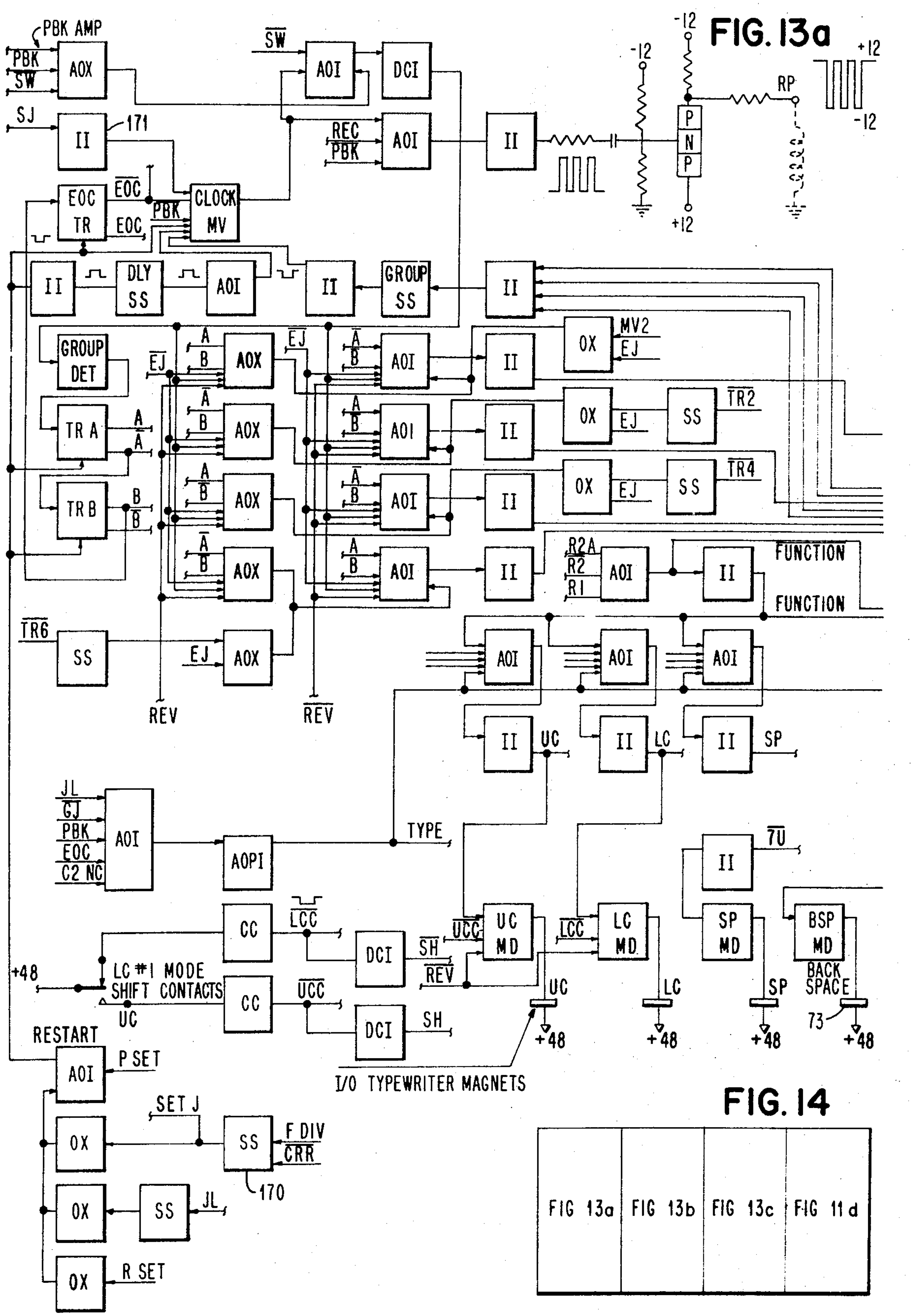
FIGS. 13*a*, 13*b* and 13*c*, together with FIG. 11*d*, when arranged as shown in FIG. 14, illustrate additional circuitry involved in Justify Record and Justify Playback modes of operation of the system of FIG. 1.
Figure 13B:
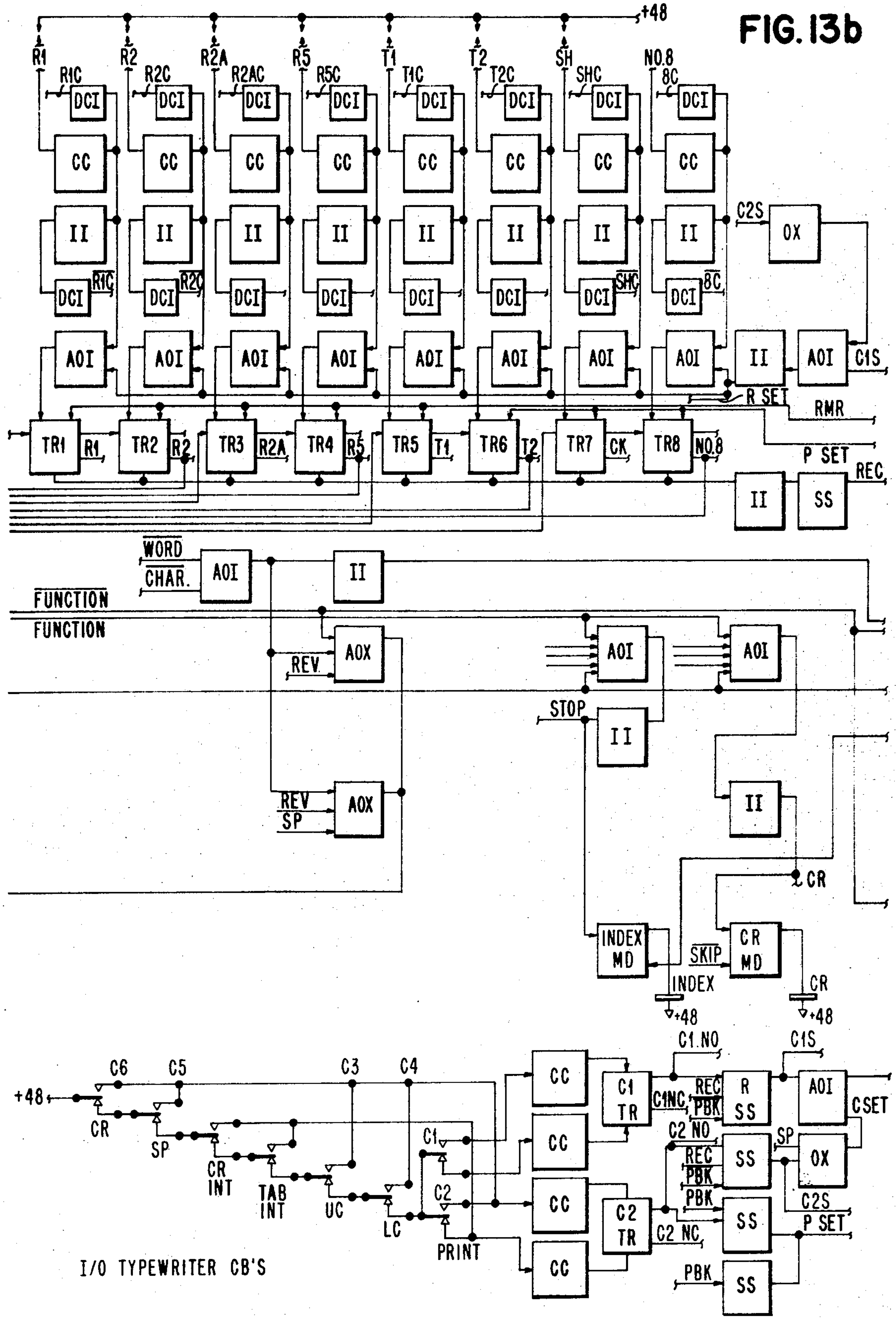
Figure 13C:
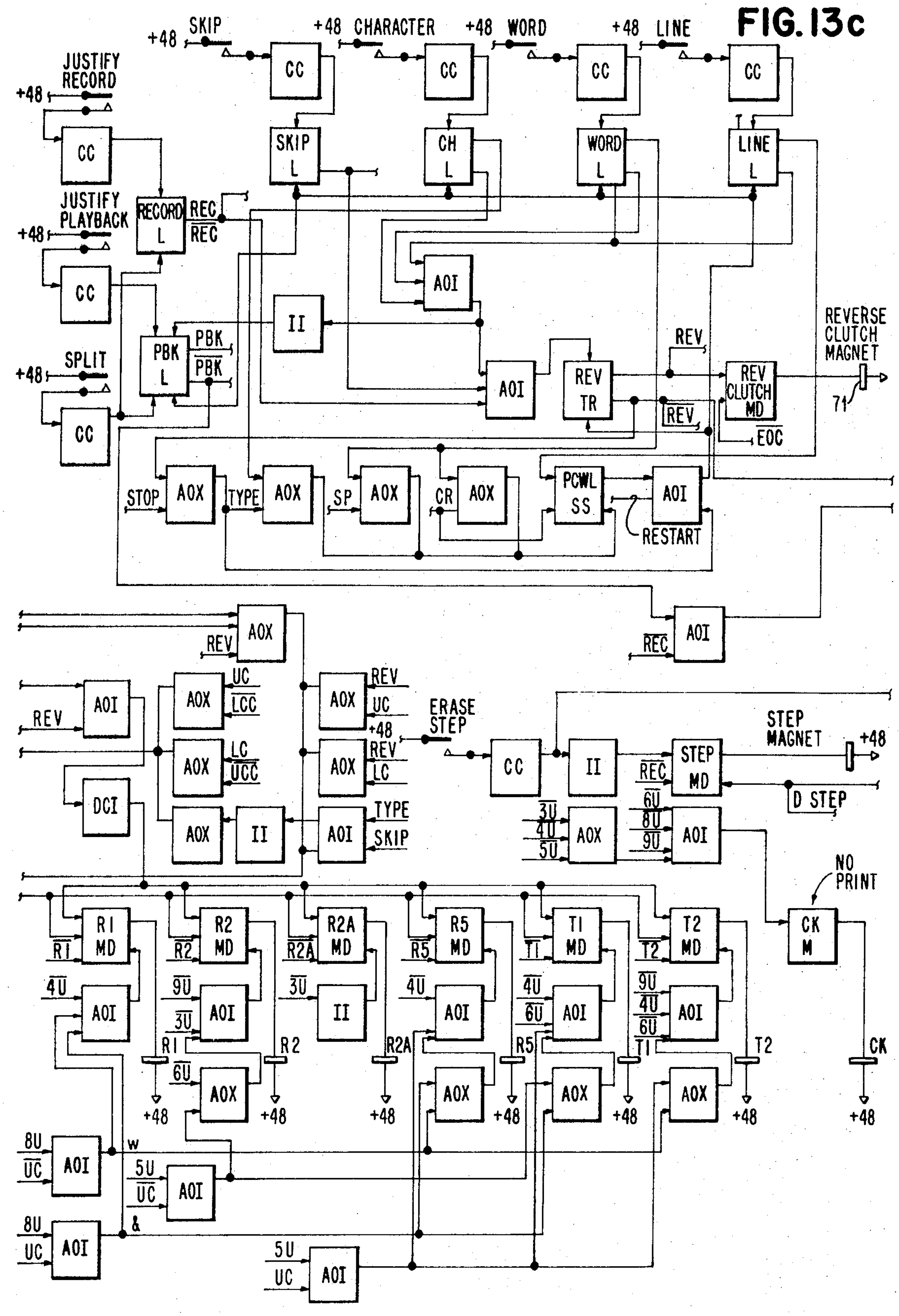

When justification facilities are provided in the apparatus, the circuit diagrams of FIGS. 13*a*, 13*b*, and 13*c* combine with the circuitry shown in FIG. 11*d* to control the various justification procedures. Reference is also made to FIGS. 15*a*–42*b*.

Depression of the Justify Record button 30, FIG. 2*b*, closes contacts shown in FIG. 13*c* to set the Justify Record latch. Also, a lamp is energized under button 30. Following this, the Forward clutch is activated as in the basic Record Operation, the various registers are reset and an EOC condition exists in FIG. 11*a*.

Card Insertion, Feeding, and Establishment of Justify Character Position in Data Track, Steps JR-8 through JR-19

The operator now inserts card 10 in slot 78, FIG. 4, the card is fed until card switch 100 transfers and corresponding contacts are operated in FIG. 11*d*.

A Finish Divide signal from FIG. 24 produces a Set J signal from Single Shot 170, FIG. 13*a*. This is applied to an II block 171, FIG. 13*a*, and, in connection with operation of the Delay Single Shot and Not EOC, FIG. 13*a*, starts the Clock Multivibrator. The various sequences just discussed are indicated by circuit wave forms in FIG. 39 designated as the Start Record sequence.

With the Clock Multivibrator operating, FIG. 13*a*, the apparatus functions as if it were recording a character of maximum length, that is, a character comprising 16 bits arranged in four groups of four bits each. However, transducer 75 is degated at this time so that no recording of digital data actually takes place in the data track. The net effect of the foregoing operation is to operate the Forward clutch a sufficient amount of time to leave space for a Justification character at the beginning of the data track.

Figure 39:
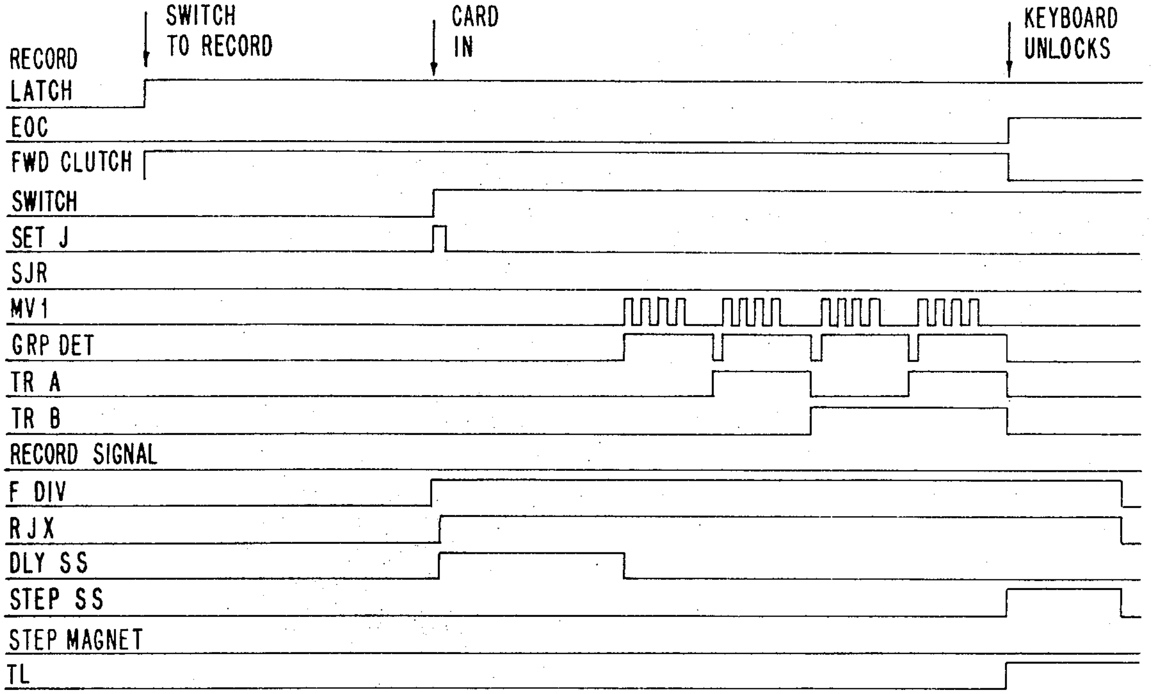
FIG. 39 is a wave form chart that illustrates the conditions and signals established at the beginning of a Justify Record operation.

Upon termination of the dummy recording sequence, the Step Single Shot, FIG. 23, provides an output. It is inhibited at this time so that the Step magnet is not actually operated. Thereafter, the Type Line trigger, FIG. 23, is set and remains set until a Carrier Return operation occurs at the end of the line. The setting of the Type Line trigger is shown in FIG. 39. Also, in FIG. 27, the Keyboard Unlock magnet is energized to enable entry of characters through keyboard, FIG. 1.

Printing and Recording of Character *a*, Steps JR-20 through JR 26

Informational characters and space operations have escapement values that are predetermined according to the following escapement value table.

ESCAPEMENT VALUE TABLE

| Unit Count | Character |
|---|---|
| 3 | Space *i j l* . , ' '- |
| 4 | *I f r s t* ( ) [ ] / : ; ! |
| 5 | *J a c e g o v z* ? † |
| 6 | PSbdhknpquxy1-0$*+=(All numbers) |
| 7 | A B C E F L T Z |
| 8 | D G H K N O Q R U V X Y *w* & % L̲ |
| 9 | M W *m* 0 ¼½¾ |

Reference is made to FIG. 40*a* where it is assumed that the first character entered by keyboard 3 is the character *a*. According to the Escapement Value Table given above, the character *a* has an escapement value of 5. Entry of the character initiates a recording operation with Not EOC and the character is recorded on magnetic card 10 as described in the basic Record Sequence above.

Figure 37A:
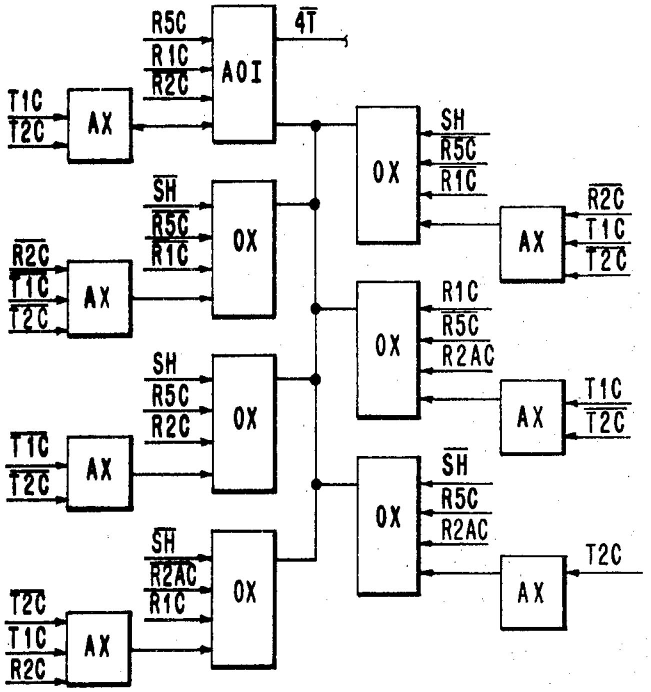
Figure 37B:
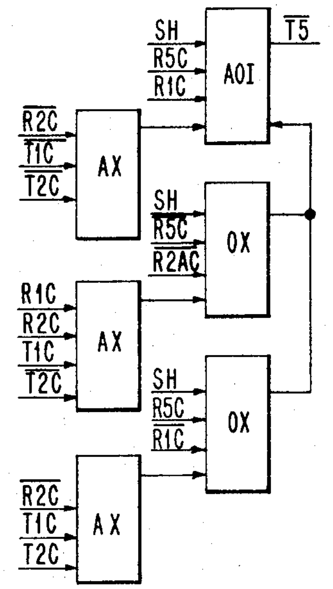
Figures 38A, 38B, 38C, 38D:
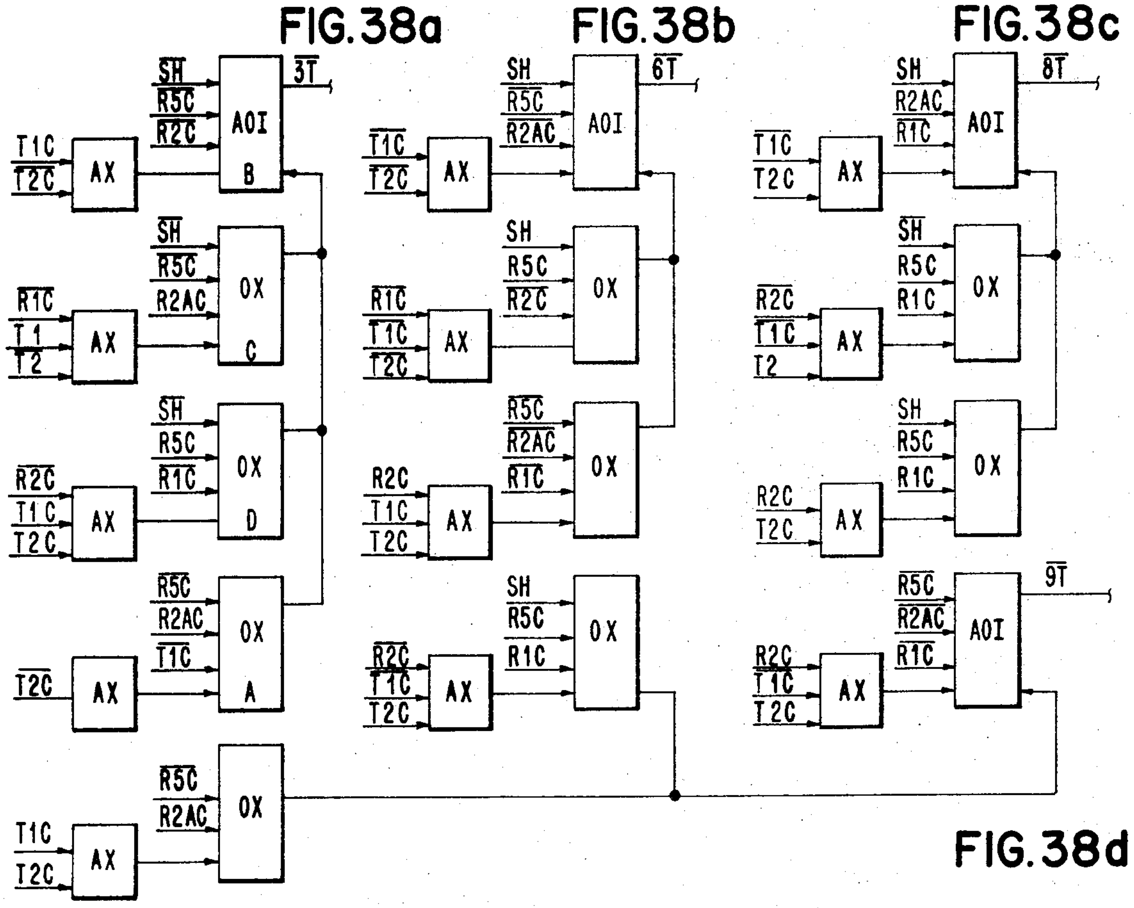

Meanwhile, the transfer of the various transmitting contacts in the printer 1 is recognized particularly in FIGS. 37*a* and *b*, 38*a*, *b*, and *c*, and FIG. 36, to decode the escapement of the character involved. An electrical indication of the length of escapement is obtained by using the contacts representative of rotation and tilting of print head 8, the Shift (SH) contacts and the No. 8 contacts, FIG. 13*b*. The No. 8 contacts normally serve as an indication of parity.

There are 88 printed characters normally. Forty of the characters have an escapement value of 6 units in lower case and 8 units in upper case or an escapement value of 5 units in lower case and 7 units in upper case. The remaining 48 characters are determined by the use of the circuits shown in FIGS. 37*a*–38*c*. If a character is not recognized by one of the circuits in FIGS. 37*a*–38*c*, it is assumed to belong in either the "6 to 8" unit escapement group of the "5 to 7" unit escapement group. These two groups are recognizable since the 5 to 7 unit escapement group is accompanied by a parity bit (No. 8 contact). Also, they are further recognizable since the shift contacts indicate whether they are upper or lower case. The circuits shown in FIG. 36 combine the outputs from FIGS. 37*a* through 38*c*, together with the shift and parity or check bit outputs to supply an indication of the incremental value for any of the characters entered from the composer.

Figures 17, 18:
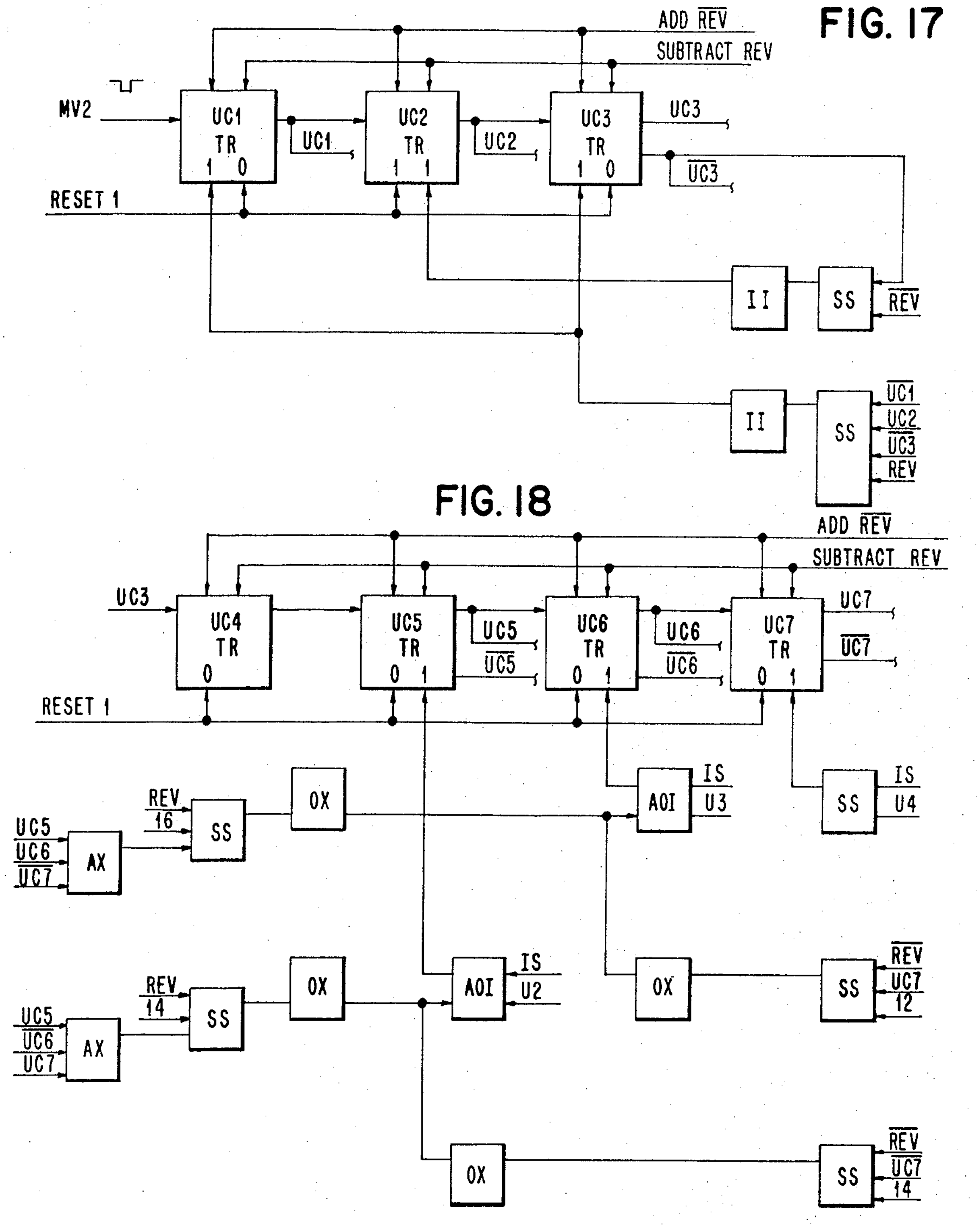
FIGS. 17, 18, and 19 show a 12-position counter that is useful in justification procedures, with the respective positions designated UC1–UC12.
Figure 19:
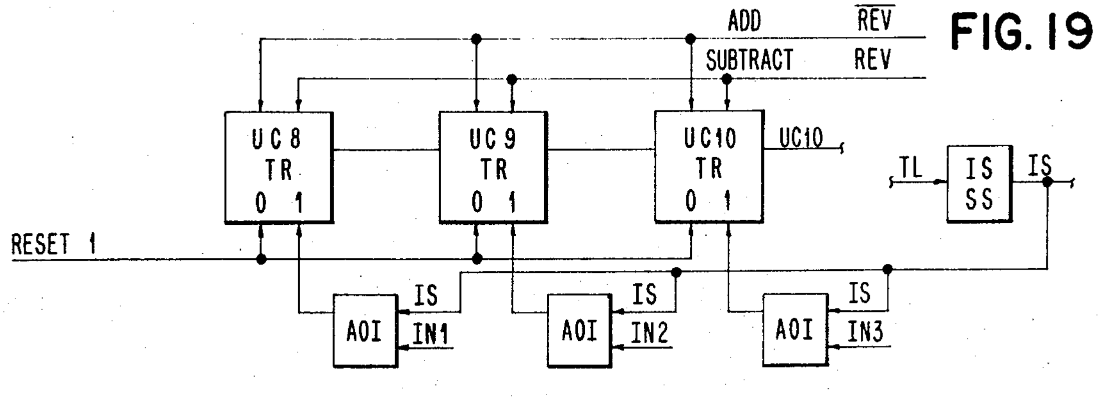
Figure 20:
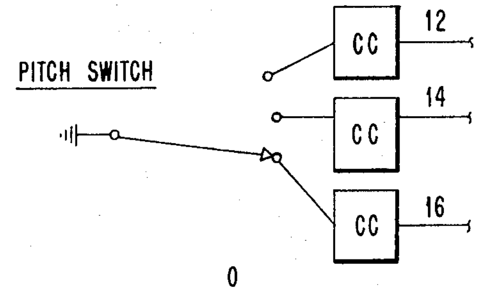
FIG. 20 illustrates a Pitch switch and associated circuits for establishing Pitch selections of 12, 14, and 16. The settings 12 and 14 are the settings of primary interest. The Pitch switch is also shown in FIG. 2*b*.

When the C1 contacts in unit 1, FIG. 13*b*, transfer, the C1 trigger is set to provide a "C Set" signal. This is applied in FIG. 34 to set the UCR trigger. With the decoding circuitry of FIGS. 37*a* through 38*c* and FIG. 36 gated according to the character configuration of the character *a*, the triggers CU1–CU4, FIG. 33, are now set with the complement of the escapement value of the character *a*. Subsequently, multivibrator MV2 starts operation and operates trigger positions CU1–CU3 toward a "0" condition. After the fifth pulse from MV2, CU4 receives an impulse which sets it to the "1" state. Concurrently with this, the Scale of 6 counter, comprising triggers UC1–UC3, FIGS. 15*b* and 17, is impulsed and will now store the character value for *a*.

In FIG. 34, the UCR trigger is set when six impulses have been entered into UC1–UC3. In the present instance, another impulse from the succeeding character is required for UC1–UC3 to have a total count of six.

Entry and Recording of Character *t*, Steps JR-27 through JR-33

With reference to FIGS. 1 and 40*b*, it is now assumed that the next character entered is the character *t*. Referring to the escapement value table previously given, this character has an escapement value of 4.

In FIG. 13*b*, the transmitting contacts of the composer unit 1 transfer and initiate recording of the digital configuration of the character on magnetic card 10. Concurrently, the contact closures are applied in the circuitry of FIGS. 37*a* through 38*c* and 36, to derive the escapement value of the character.

Transfer of the C1 circuit breaker in the composer unit sets trigger UCR, FIG. 34, if it was previously reset. The complement of the escapement value is entered in triggers CU1–CU4, FIG. 33, as before. Multivibrator MV2 is again started in order to count triggers CU1–CU4 toward a "0" status. As multivibrator MV2 operates, trigger positions UC1–UC3, FIGS.

15*b* and 17 go from a count of 5 to a "0" state that results in impulsing trigger UC4, FIGS. 15*b* and 18. This also resets trigger UC2 to a "1" state. The counting action of triggers UC1–UC4 is as shown in Step JR-33 and following the pulse sequence, the triggers will contain a total count of 9 comprising the escapement values of 5 and 4 for characters *a* and *t*.

Handling of Space Codes, Steps JR-34 through JR-41

In FIG. 40*b*, it is next assumed that a Space operation occurs effecting a space movement of composer unit 1 and a recording of a Space code on magnetic card 10. The space contacts C5, FIG. 13*b*, transfer. Through the decoding networks of FIGS. 37*a* through 38*c* and FIG. 36, the basic space value of 3 units is provided for counting in the same manner as the previous printed characters. The C Set impulse from FIG. 13*b* initiates recording of the Space code on card 10.

In FIG. 34, the UCR trigger is set and the complement of the space value is transferred into trigger positions CU1–CU4. Multivibrator MV2 is again started and an additional count of 3 is added to trigger positions UC1–UC3 in FIGS. 17. These combine with trigger position UC4 to store a total count of 12.

Figure 30:
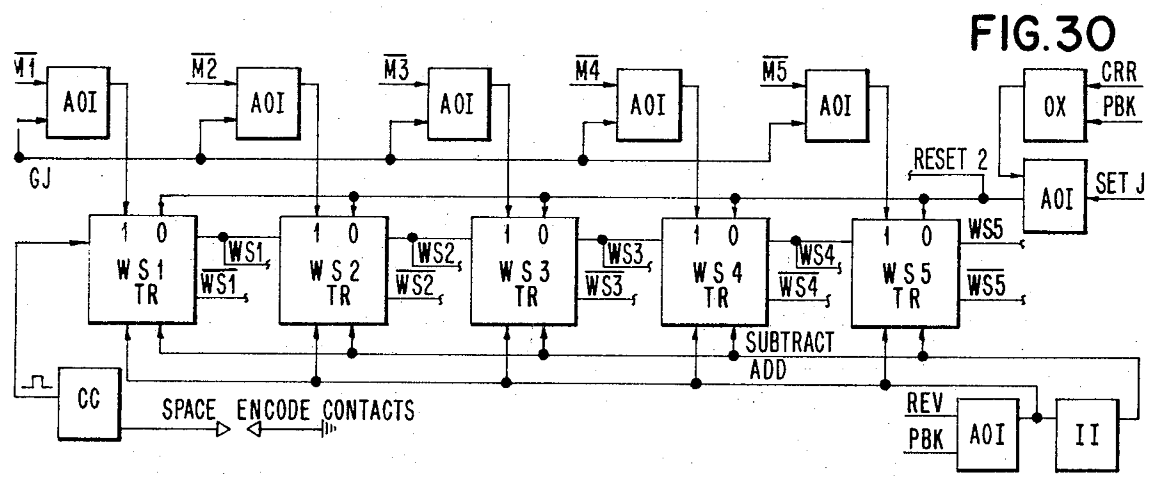
FIG. 30 illustrates a five-position interword space counter, with positions designated WS1–WS5.

Concurrently with the foregoing operation, an input from the space contacts is supplied to the Word Space 1 (WS1) trigger, FIG. 30, to count the Space operation. Triggers WS1–WS5 are capable of counting up to a total of 32 spaces for each individual line during printing.

End Zone and Justify Zone Conditions

Eventually, as printing and spacing progresses, a point is reached in the line that is called the End Zone, which indicates a particular number of unit increments remaining in the line as discussed briefly in the Summary section above. The End Zone Lamp (or Can Justify) is lighted under control of a J Register 173, FIG. 15*a*, when a compare circuit 175 indicates that the line remainder stored in the Scale of 16 counter, triggers UC4–UC7, FIGS. 15*b* and 18 can conveniently be distributed over the number of Word Spaces existing in the line for producing justified copy. The operator may continue to type and space in the line until a minimum remainder exists which is determined by a J Register input and a line remainder input from trigger positions UC6–UC10 to AOI 176 which effect energization of the Justify lamp, FIGS. 15*b* and 32. FIG. 32 includes a Can Justify latch to indicate reaching the End Zone area.

Recognition of Carrier Return, Determination of Justification Data and Recording of Justification Data, Steps JR-42 Through JR-71

Figure 42A:
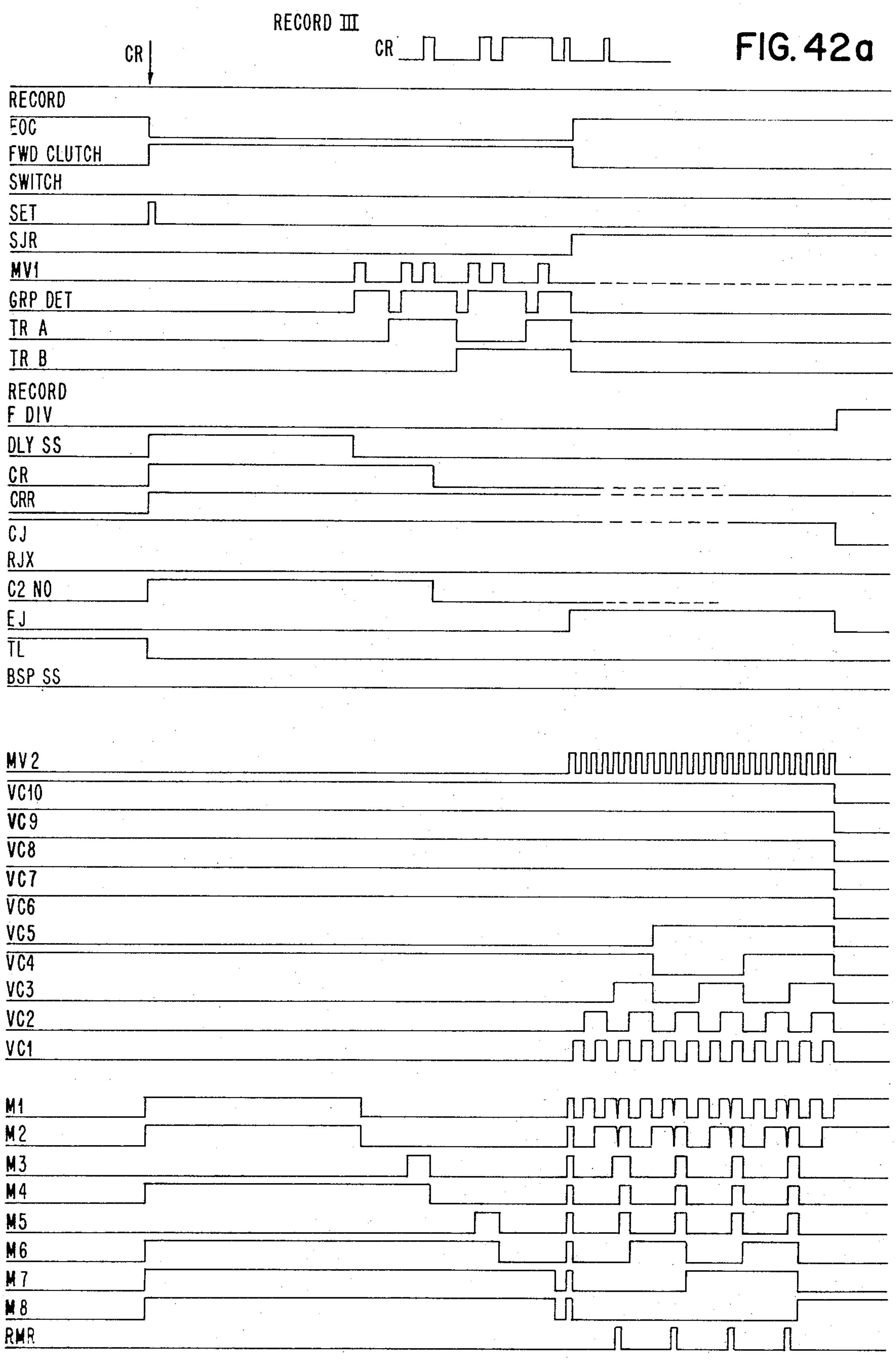

FIG. 42*a* assumes that a Carrier Return operation occurs at the end of line in progress. The usual sequence is followed to record a Carrier Return code in the data track on magnetic card 10. In addition, the Carrier Return (CRR) trigger is set, FIG. 11*d*. This supplies a CRR output which drops the Type Line trigger, FIG. 23. An EOC condition at the end of the character recording in combination with the TL input sets the Start Justify Register (SJR) latch, FIG. 23. This in turn gates circuits shown in FIG. 26 to provide an End Justify signal.

The End Justify (EJL) signal is applied in FIGS. 13*a* and 13*b* to rearrange the Main Register comprising triggers TR1–TR8. These trigger positions are split into two counters. More specifically, positions TR1–TR5 serve as a counter, the scale of which depends on the number of Word Spaces encountered in the line. If it is assumed that 5 Word Spaces were involved in the line, these triggers will serve as Scale of 5 5-counter. It may be assumed that the Carrier Return operation occurred when the print head was 24 units from the right margin on document 5.

Figure 31:
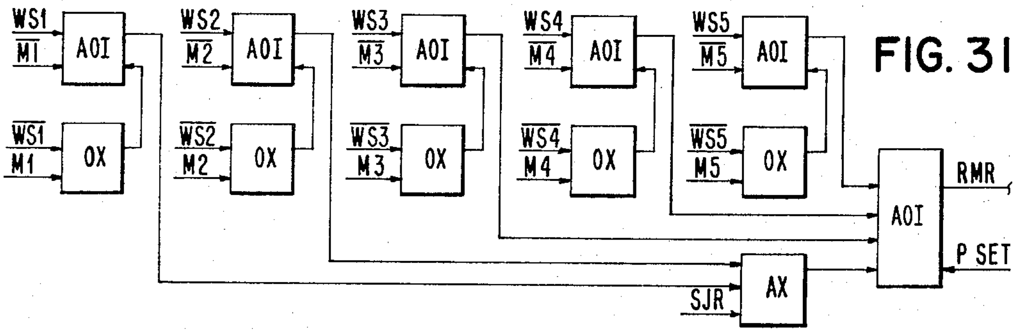
FIG. 31 shows circuitry for deriving a reset signal (RMR) for a main register comprising triggers M1–M8, FIG. 15*a*.

The next operation in the present sequence is to start Multivibrator MV2, FIG. 33. This impulses the registers comprising triggers UC1, etc. 24 times in dependence upon the line remainder. At the same time, trigger positions TR1–TR5 are impulsed in FIG. 13*b*. If it is assumed that triggers TR1–TR5 are serving as a Scale of 5 counter, then five impulses will set these triggers to the "1" state. It will be recalled in order to make the system more generalized, the trigger positions TR1–TR8 are also designated M1–M8. In FIG. 31, the M1–M5 inputs are provided in conjunction with the WS1–WS5 inputs to provide a RMR output which signifies Reset Main Register. Accordingly, the sixth impulse in the train of 24 impulses will establish an all "0's" in triggers TR1–TR5 and at the same time will set trigger position TR6 (M6) to the "1" state. If the remaining impulses in the train of 24 impulses are considered, the all "0's" condition will again occur at a count level of 11, 16, and 21.

If it is assumed that there were 5 interword spaces, a line remainder of 24 units indicates that the last space should be increased by a value of 4 over the basic space unit value of 3 for a total of 7, and that each of the first 4 spaces should be increased by a value of 5 for a total of 8. Reference is made to Step JR-55 in the table where it is seen that pulses 22, 23, and 24 establish "1" conditions in register positions TR1 and TR2 and that 4 units are stored in trigger position TR8.

When all 24 counts in the line remainder have been counted, trigger position UC10 goes to the "0" state. At this time, trigger positions TR1–TR5 will store the number of long spaces required and trigger positions TR6–TR8 will store the Coded Value of the Unit Count of the Long Space. When trigger UC10 changes state, the Finish Division latch FIG. 24, is set.

Considering the mechanical actions involved it will be recalled that the magnetic card 10 was in the process of a High Speed Reverse movement to the beginning of the line. When the card switch contacts transfer, the High Speed Reverse clutch is dropped, the Forward clutch is again energized, the card switch 100 again transfers, and magnetic card 10 is now in a position for the recording of the justify character in the space previously alotted at the beginning of the data track.

With the Finish Division latch, FIG. 24, set, a "Set J" impulse is provided through II block 171, FIG. 13*a*. The Delay Single Shot operates, Not EOC starts the clutch forward and in FIG. 33 Multivibrator MV2 is started. The impulses from Multivibrator MV2 are applied to the Main Register trigger positions TR1–TR8 in a manner comparable to that used during the recording of characters and the following Justification character is recorded:

1 1111 1111 11

Accordingly, the contents of the Main Register are recorded in the Justification character position.

Following this, the Step Single Shot circuit in FIG. 23 becomes active to energize Step magnet 73, FIG. 13*a*, in order to step transducer 75 to the next data track on magnetic card 10. Since the stepping action occurs at the end of the Justify character position of the preceding line, a standard space is thereby automatically allotted at the beginning of the succeeding line to store the Justify character for that line.

In FIG. 23, the Type Line latch is again set on in readiness for the entry and recording of data for the succeeding line. All of the sequences just described are shown in FIG. 42*b*.

In the foregoing manner, individual lines of printed information are printed on document 5 and related data signals are recorded in associated data tracks on magnetic card 10, each having an associated justification character for later use during the Justify Playback operation.

JUSTIFY PLAYBACK

Summary

In order to print justified lines of copy automatically, the Justify Playback button 31, FIG. 2*b*, is depressed. This activates the Forward clutch and when magnetic card 10 is inserted in slot 78, FIG. 4, it is fed toward the beginning of the data track which is assumed to be the first track on card 10 corresponding to the first printed line of information. The justification character associated with the first data track is read into the Main Register positions M1–M8 (TR1–TR8). The contents of the first five trigger positions is thereafter transferred to the WS1–WS5 register to indicate the number of spaces required. The information in the last three Main Register positions is transferred into the escapement length (increment) register positions CU1–CU3. The latter register determines the length of escapement for each Word Space.

Actually, the complement of the remainder is now registered in trigger positions WS1–WS5, and each time a Word Space is read in the data track, the remainder is reduced by one. In this way, the number of long spaces is counted as they are read. When the last long space is encountered, the Increment register receives an impulse that causes the complement of the quotient to be increased by one count and causing the quotient itself to be reduced by one. This effects a reduction in the length of the remaining Word Spaces by 1, resulting in a justified line.

Detailed Sequence of the Justify Playback Operation

A detailed sequence of the Justify Playback operation is present in the following tabulation with the individual steps designated JP-1 through JP-47.

JUSTIFY PLAYBACK

| Step | Action | | Reference |
|---|---|---|---|
| JP-1 | On-Off switch | | FIG. 1 |
| JP-2 | Split mode | | FIG. 13*c* |
| JP-3 | Justify Playback button | | FIG. 2*b*, 44*a* |
| JP-4 | Justify Playback lamp | | FIG. 2*b* |
| JP-5 | Forward clutch starts | | FIG. 2*b* |
| JP-6 | Reset Registers TR1 - TR8 1111 1111 | | FIGS. 13*b*, 44*a* |
| JP-7 | EOC condition | | FIG. 13*a* |
| JP-8 | Insert card | | |
| JP-9 | Card feeds | | FIG. 3 |
| JP-10 | Card Switch transfers, clutch stays up- | | FIGS. 4, 11*d* |
| JP-11 | Read first char- Justify Character which is 1-4-4-2 | | FIG. 13*b* |
| JP-12 | $\overline{EOC}$ to EOC, Drop clutch | | FIGS. 13*a*, 11*d* |
| JP-13 | Pulse $\overline{GJ}$ SS, gates complements. TR1-TR5-TR6-TR8 ↓↓↓↓↓ ↓↓↓ WS1-WS5 CU1-CU3 (FIG. 30, Subtract AOI Rev. or PBK) | (Subtract "1" every Space Operation) | FIGS. 28, 30. |
| JR-14 | Operate Justify Line (JL) | | FIG. 28 |
| JR-15 | EOC to $\overline{EOC}$ | | FIG. 13*a* |
| JP-16 | Start reading Character | | FIG. 11*d* |
| JP-17 | Playback "*a*" | | FIG 44*a* |
| JP-18 | Playback "*t*" Not Shown | | Not Shown |
| JP-19 | First Long Space (Operate 8 unit decode, 3+5) Subtract "1" | WS1-3 {11000 {01000 | FIGS. 30, 15*a* Decode: 29*f* FIG. 13*c* |
| JP-20 | 2nd Long Space Subtract "1" | 10000 | FIGS. 30, 15*a* |
| JP-21 | 3rd Long Space Subtract "1" | WS1-2-3-4-5 00000 CU1-2-3 001 | FIGS. 30, 33 15*a* |
| JP-22 | Playback last Long Space 4th one | | FIG. 44*b* |
| JP-23 | Serve as one binary counter with Subtract mode. | WS1-2-3-4-5 00000 CU1-2-3- 001 | FIGS. 30, 33 |
| JP-24 | Operate I/O and close Space Contacts | | FIG 13*b* |
| JP-25 | Operate 8U Decode - (also operated 8 Units for all previous 3 +5 spaces) | | FIG. 13*c* |
| JP-26 | Mechanical Action: R1 MD, R5 MD, T2 MD, No Print; Operate I/O as for lower case "3". Rotate ball, but not print. Have incremented in "8" units. | Are encoding a lower case "w" When recorded it was "3" units. When Playback and if used Space Magnet, would be "7" units. so will select but no print the character "3" that is "8" units long. | FIG. 13*c* (FIG. 13*c*, energize Check Magnet) |
| JP-27 | Last long space CB's Cycle. WS1 WS5 00000, CU1 0, CU3 0 1. At end of C2 cycle, Subtract "1": 11111 / 1 1 0 (won't change) ↓ ↓ ↓ 1 1 1 (won't change). | | FIGS. 30, 33 |
| JP-28 | FIG. 29*e*-get 7 units out for next space. There are no "7" unit characters, so when have value "7" operate space magnet, FIG. 13*a*. | | FIGS. 29*e*, 13*a* |
| JP-29 | Read First Short Word Space from card | WS1-WS5 CU1-CU2-CU3 11 111 1 1 0 | FIGS. 30, 33 46*a* |
| JP-30 | $\overline{EOC}$ Subtract 1 01 111 1 1 0 | | FIG. 13*a* |
| JP-31 | Usual Playback | | FIGS. —*a*, 13*b* |
| JP-32 | EOC | | FIG. 13*a* |
| JP-33 | Decode as a Space | | FIG. 29*e* |
| JP-34 | $\overline{7U}$ to 7U | | |
| JP-35 | Operate Space MD for 7 units. | | FIG. 13*a* |
| JP-36 | Will continue to rest of line. | | FIG. 13*a* |
| JP-37 | $\overline{EOC}$ | | FIG. 13*a* |
| JP-38 | Recognize CR | | FIG. 13*b*, 46*a* |
| JP-39 | I/O performs Carrier Return | | FIG. 13*b* |
| JP-40 | I/O I/) CR Contacts transfer | | FIG. 11*d* |
| JP-41 | CRR Set | | FIG. 11*d* |
| JP-42 | Resets WS1-WS5 } CU1-CU3 } | All zeros | FIGS. 30, 33 |
| JP-43 | Drops JL | | FIG. 28 |
| JP-44 | High Speed Reverse clutch & Step Magnet | | FIGS. 3, 11*d* 13*a* |
| JP-45 | Card Switch | | FIGS. 4, 11*d* |
| JP-46 | Come back to Card Switch | | FIG. 46*a* |
| JP-47 | Read Justify Char. in 2nd line. | | FIG. 46*b* |

Turn On and Split Mode

Moving the On-Off switch to the On position establishes a split mode in FIG. 13*c*, as in the other modes of operation.

Initial Justify Playback Conditions, Steps JP-3 through JP-7

Figure 44A:
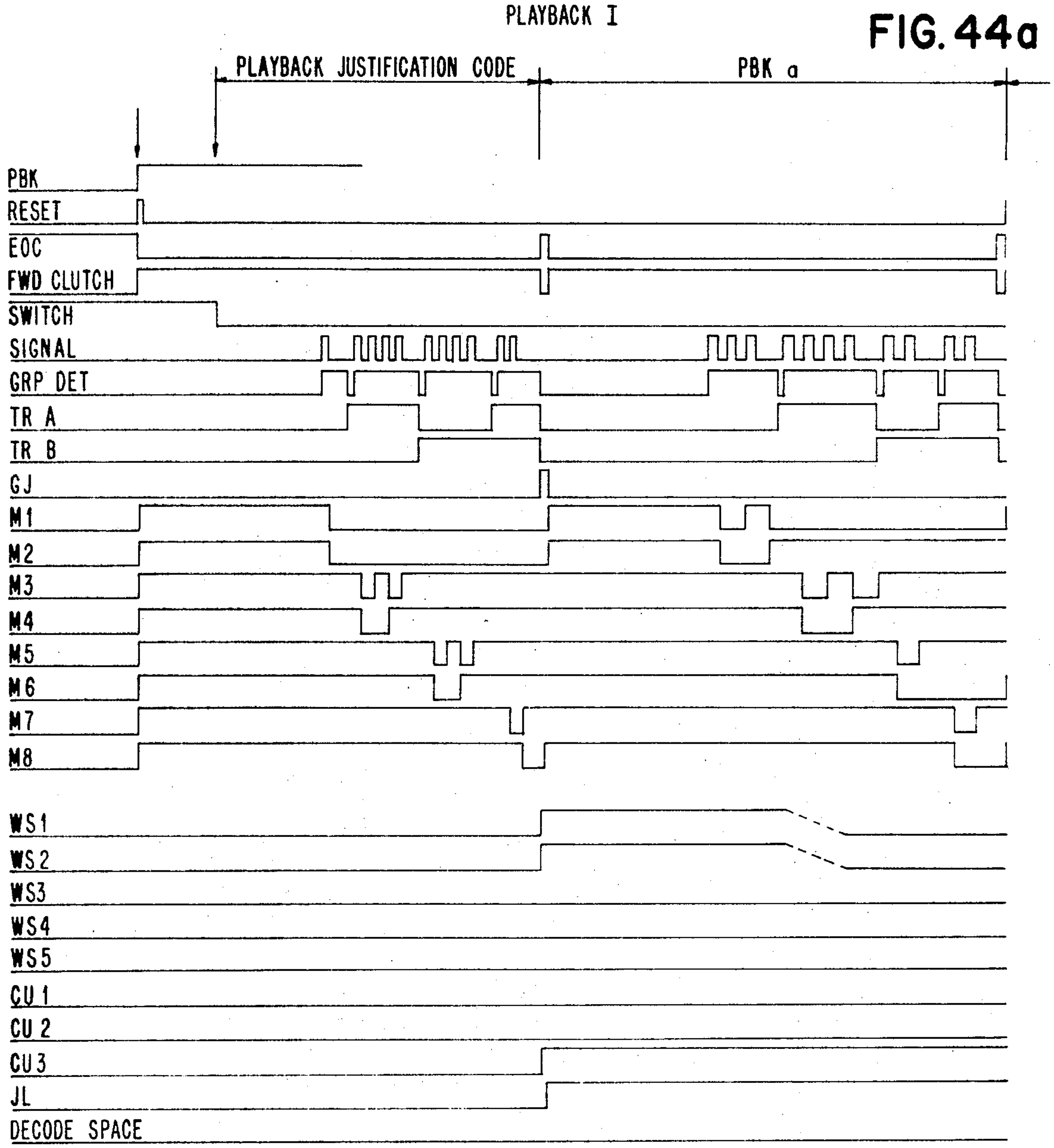
FIGS. 44a and 44b, when arranged as shown in FIG. 45, show wave forms and circuit conditions during the recognition of the Justification code, a Character code a, and the last long space in a Justify Playback operation.
Figure 45:
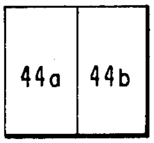
Figure 44B:
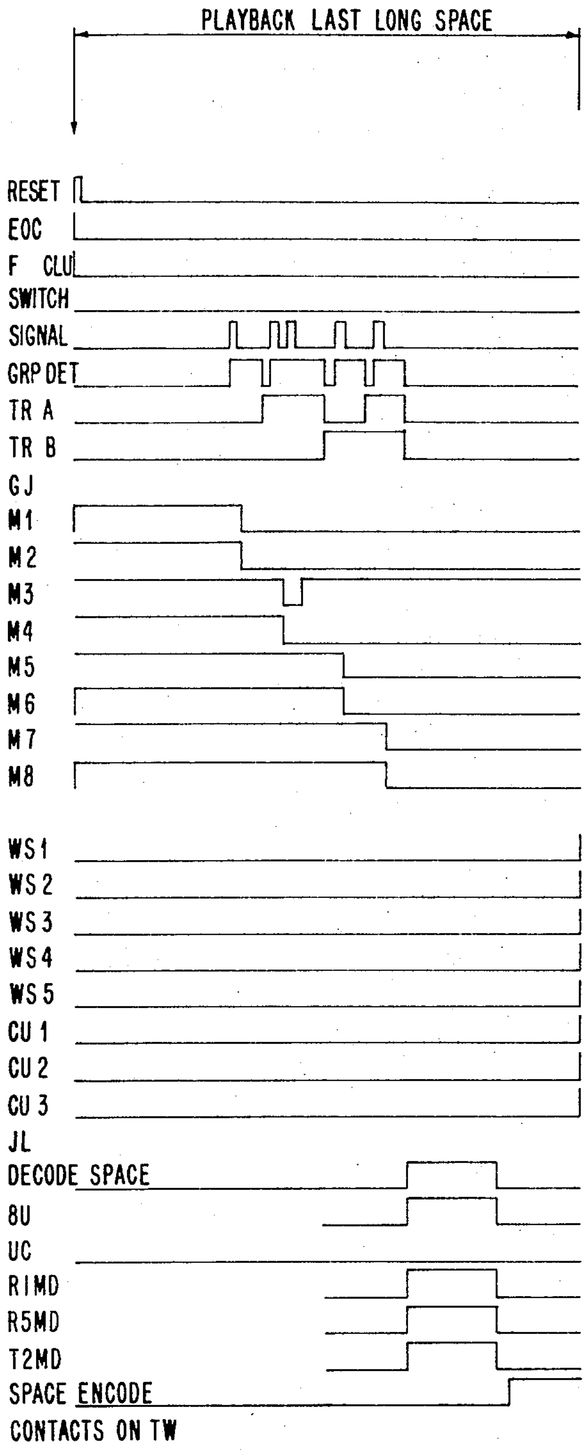
Figure 46A:
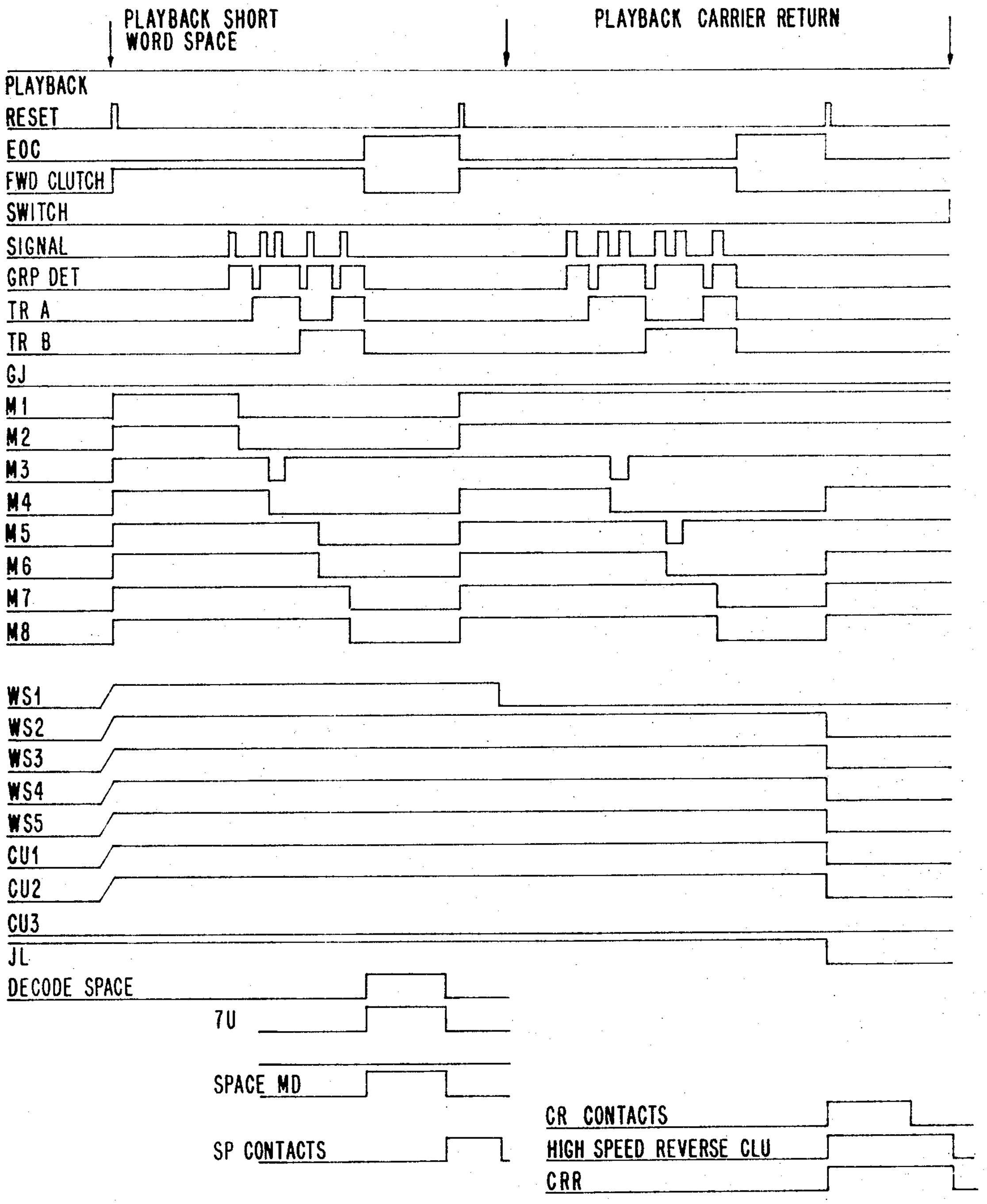
FIGS. 46a and 46b, when arranged as shown in FIG. 47, illustrate wave forms and circuit conditions encountered during establishment of a short word space and recognition of a Carrier Return code, and the recognition of the justification character associated with the next line of information, during a Justify Playback operation.
Figure 47:
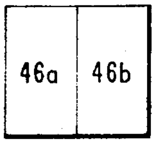
Figure 46B:
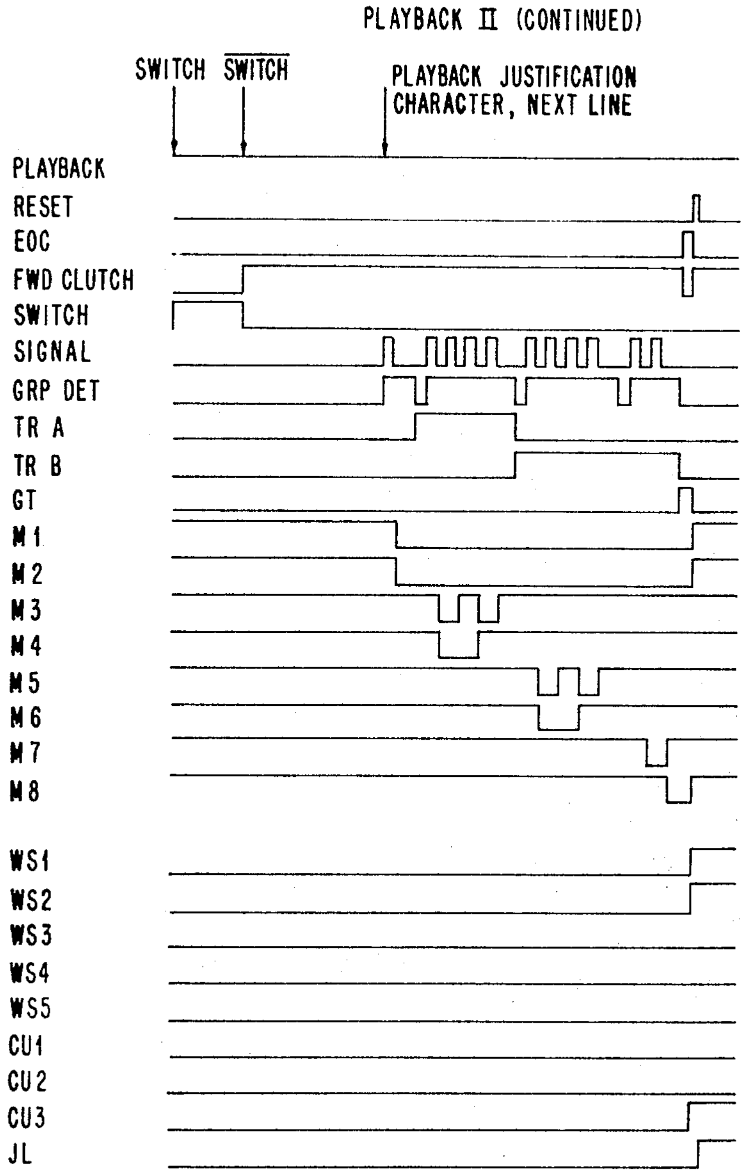

Reference is made to FIG. 44*a* which illustrates the wave form and circuit conditions initially encountered in the Justify Playback mode. The mode is established by depression of the Justify Playback button 31, FIG. **2*b*. This also energizes a lamp under the button. In FIG. 11*d*, the Forward clutch magnet 70 is energized to engage the Forward clutch with a Not EOC condition. Also, the Main Register positions TR1–TR8, are reset to an all "one's" condition as indicated in FIGS. 13*b* and 44*a*. An End of Character condition occurs when the EOC trigger changes state, FIG. 11*a***.

Insertion of Card and Recognition of Justification Character, Steps JP-8 through JP-16

The operator inserts card 10 through slot 78, FIG. 4, and card 10 feeds to the point where card switch 100 transfers. However, the Forward clutch remains energized and the first character in the data track is sensed. The character has a 1-4-4-2 configuration. This configuration is entered in the Main Register triggers TR1–TR8 in the usual manner, FIG. **13*b*. Not EOC changes to EOC, and the Forward Clutch drops, FIG. 11*d***.

Figure 28:
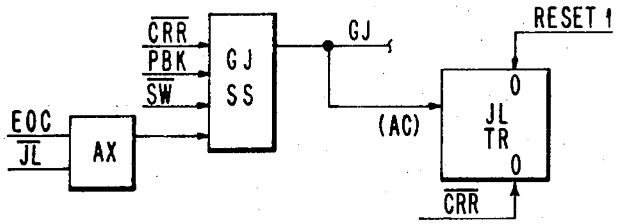
FIG. 28 shows a Gate Justification (GJ) single shot and a Justify Line (JL) trigger.

In FIG. 28, the EOC condition conditions the Gate Justify (GJ) Single Shot that sets the Justify Line (JL) trigger and that also gates the contents of the Main Register into other registers for establishment of a justified line. As shown in Step JP-13, the contents of trigger positions TR1–TR5 are transferred to Word Space register positions WS1–WS5 and the contents of trigger positions TR6–TR8 are transferred to the register positions CU1–CU3. As will later become apparent, each time a Space operation occurs a "1" is subtracted from the register WS1–WS5.

With the setting of the Justify Line trigger, FIG. 28, EOC changes to Not EOC, FIG. 13, the Forward clutch is energized and the characters in the data track are sensed in sequence until the end of the line. FIG. **44*a*** illustrates the playback of the character *a*. The playback of the character *t* is not shown in the timing sequence.

Long Space Characters and Operations, Steps JP-19 through JP-28

As each Space character is recognized, a Space operation occurs in composer unit 1, FIG. 1, and the character is decoded in FIG. **29*f* as an eight-unit character. The selector magnets for rotating and tilting print head 8, FIG. 13*c*, are actuated as if an eight-unit character were to be printed. However, the No Print mode of operation described in the Slaughter, et al., application and in the Castle, et al., application, are made use of to prevent printing of a character but to escape print head 8** the required number of increments of space, which in the present instance is eight units. This occurs each time that a "long space" character is encountered.

Figure 29A:
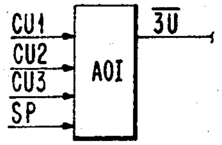
FIGS. 29*a*–29*g* show decoding circuitry for deriving space escapement values of three to nine units.
Figure 29B:
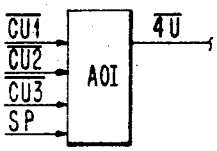
Figure 29C:
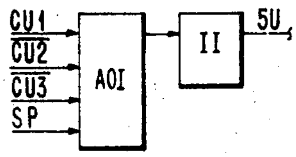
Figure 29D:
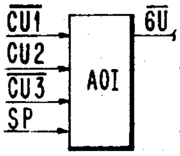
Figure 29E:
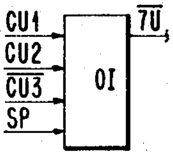
Figure 29F:
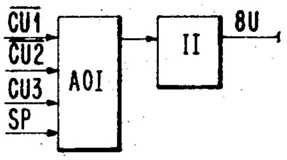
Figure 29G:
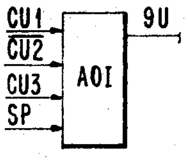

The playback of the last long space, that is, the fourth space character, is shown in FIG. **44*b*. Composer unit 1 is operated in the usual manner closing the space contacts. The eight-unit encode circuit of FIG. 29*f* is again effective to effect an eight-unit incremental movement of print head 8**, as shown by the selection indicated in Step JP-26.

In effect, the encoding networks produce a selection of print head 8 that corresponds to a lower case *w* to derive eight units of relative displacement of print head 8 in relation to document 5.

The transfer of the circuit breakers in printer 1 at the end of the cycle again subtract a "1" from the Word Space register WS1–WS5, which, in turn, subtracts 1 from Registers CU1–CU3. Thereafter, register CU1–CU3 will not change from the state shown in JP-27.

In FIG. **29*e*, the next and last Space character will energize the space magnet which effectively gives an escapement of print head 8** of a total of seven units, as described in the next section.

Recognition and Handling of Short Space, Steps JP-29 through JP-36

With reference to FIGS. 30, 33, and **46*a*, it is now assumed that the next space character, that is the first short space character is recognized. The Not EOC condition effects the usual playback of the character changing to EOC, FIG. 13*a*. The character is decoded as a space and by means of the decoding circuits, the space magnet driver, FIG. 13*a*, is operated which effectively gives a seven-unit escapement of print head 8 in relation to document 5. The Space Magnet Driver is used directly whenever seven units of spacing is required. Otherwise, the Character selection and No Print operation are used to effect a required incremental spacing of pring head 8 in relation to document 5**.

Recognition of Carrier Return Code and Playback of Next Line, Steps JP-37 through JP-47

The sequencing continues with the recognition of the various characters for printing and the Space codes, when encountered, until the recognition of a Carrier Return code as illustrated in FIG. **46*a*. The Carrier Return contacts, FIG. 13*b*, transfer to set the Carrier Return (CRR) trigger, FIG. 11*d*. This provides a CRR signal which resets the Word Space register WS1–WS5 and the Increment register CU1–CU3, FIGS. 30 and 33 to the "all zero's" condition. It also drops the Justify Line (JL) trigger, FIG. 28**.

Thereafter, the High Speed Reverse magnet 72 is energized to engage the High Speed Reverse clutch and also, the Step magnet 73, FIG. **13*a*, is energized to step transducer 75 over one track position in relation to record card 10**.

The high speed movement of card 10 in the Reverse direction continues until card switch 100 transfers, whereupon the High Speed Reverse magnet 72 is de-energized. The Forward magnet 70 is energized in order to bring card 10 back into engagement with card switch 100, whereupon the justification character stored in the next line is sensed, entered into the Main register positions in FIG. **13*b*** and the justification of the next line of information proceeds in a manner that is comparable to that for the data track that was just completed.

While the apparatus has been described primarily in connection with a normal justification routine, it is readily adaptable to handle other composition functions, such as centering and flush right, or flush left-flush right combinations. Suitable switching is provided to establish the desired composing operation. The individual registers are thereupon set and reset into conditions appropriate to the function desired. As an example, in centering a line of text having a line remainder of 24, the arithmetic circuits are operated to divide the 24 by a factor of 2 to initiate Space operations prior to printing and establish balanced white space on the left and right ends of the line in question.

MODIFICATIONS

The editing capabilities of the system were previously alluded to in ction with the Record mode of operation. Reference is made to the 1965 Kolpek application and to the Locklar, et al., and Sims patents for a consideration of a number of techniques enabling a selection of categories of information for editing purposes. Both the Kolpek and the Locklar and Sims apparatus have provision for selecting desired categories of information, such as characters, words, and lines with or without skipping, and also have provision for the recognition of Stop codes when placed at convenient intervals in the recorded data. All of the editing capabilities of the Kolpek and Locklar and Sims systems are readily adaptable to the present system in order to produce error-free copy and to enable the intermixing of data printing from the record media and by manual entry through the keyboard 3 on composer unit 1. The latter procedure, of course, is usually preferred only during a normal Playback operation, rather than a Justify Playback operation.

The Locklar, et al., patent also describes a line revision arrangement for use with an elongated magnetic record media. Upon the recognition of a Carrier Return code during original entry and recording of information on the media, an extra Feed code is recorded along with the Carrier Return code and is thereafter available to permit expansion of an individual line by one character. Additional Feed codes may be recorded if desired. In the present case, since each line of a document has an associated track on the record media that is chosen to accommodate the maximum number of characters that may be expected for individual binds on the document, additional space for line revision is inherently provided in the system. As an example, if each track on the card media is capable of accommodating 200 characters and the average line is only 150 characters in length, an additional 50 character positions is available, on the average, to expand each individual line. Naturally, each line will vary considerably from the average. Accordingly, the arrangement disclosed herein provides a considerable advantage in recording, processing, and revision of data in a system of this nature.

LINE READJUST

The Sims patent teaches a Line Readjust technique that is also useful in connection with the systems described herein. The Line Readjust capabilities contemplate the recording of data on the media according to a first predetermined format established by left and right margin settings with Space codes and Carrier Return codes recorded as they occur during typing. Subsequently, if the margin limits are set to the same settings as when the data was originally recorded, the lines printed during Playback will correspond in length and the data read from the media is interpreted as recorded.

Under some circumstances, however, it may be desirable to change the data format by shortening or lengthening the lines on the document while still making use of the data originally recorded on the media. In a Line Readjust mode of operation, the interpretation of characters stored on the media during Playback is dependent upon whether they occur in a first portion of each line or in a line ending portion termed the "Zone" or "Region". Carrier Return codes occurring in the Region effect a Carrier Return operation while Carrier Return codes occurring in the early part of a line are converted to Space operations. Conversely, Space codes occurring in the line ending Region area are converted to Carrier Return codes, but are interpreted normally outside the Region. Specific reference is made to the Sims Pat. No. 3,297,124 for the various modes of operation, including the Line Readjust mode.

TRANSFER AND TRANSFER ADJUST MODES

Other types of operations described in the Sims patent that are of interest in connection with the systems described herein are the Transfer Type operation and the Transfer Adjust operation. In either of these operations, the system herein is provided with an additional recording unit.

At times it becomes desirable to transfer information from one unit to the other. In a Transfer Type mode, the information on one of the processing units is transferred to the other processing unit with concurrent printing of a document and no line readjustment. In a Transfer adjust mode of operation, the information on one of the processing units is transferred to the other unit exactly in the same manner as encountered but the printing of a document takes place under the Line Readjustment requirements that were previously discussed.

In some cases it is desirable that printing of a document take place under control of either of the units with some information being derived from one unit and other information from the other unit. The provision of a Switch code in the recorded data and appropriate circuits as described in the Sims case enable the switching back and forth between the units during the playback of information.

COMMUNICATIONS

The communication aspects of the system have not been emphasized but it is apparent that the communication facilities taught in the Kolpek application as well as the Jones et al. applications are readily adaptable for use in the present system in order to communicate ordinary data from a record card to a utilization device at the other end of a communication line or in order to transmit rough copy data along with an associated justification character or justification signals that may used to produce justified copy directly through the telecommunication facilities.

OTHER MODIFICATIONS

Various modifications may also be made to the mechanical configurations of the composer unit, card processing unit, or tele-communication facilities.

In connection with the card processing unit, it may be appropriate under some circumstances to make use of only a single track on record media 10 and to degate the stepping of the transducer 75 to the next track. In this case, a single line of rough copy is recorded in the track selected with or without justification data depending upon the mode of operation. Upon termination of a Playback mode wherein the previously recorded data is derived and supplied to the printer, the same data track may now be used for the entry of rough copy associated with another line printed on the document in the composer unit. Reference is made to the Jones et al., application Serial No. (LE 9-67-031) for additional discussion of this kind of technique.

With respect to the card processing unit also, it is the general purpose of the unit to produce relative movement between record card 10 and transducer 75 in order to conveniently effect recording and reproduction of signals in the various data tracks as well as an incremental displacement of the transducer in a step-by-step fashion to access the individual tracks of data.

It is evident that such relative movement and relative displacement may be performed by structures other than the ones described herein. As an example, magnetic media 10 may be retained in a stationary location throughout the Recording and Playback operations while transducer 75 is moved linearly along individual tracks on media 10 to record and reproduce information as well as being incremented from track-to-track to scan the individual tracks. As another possibility, media 10 may be retained in a generally stationary condition while scanning of individual lines is effected by movement of transducer 75 adjacent media 10 to record and reproduce data in the individual data tracks and thereafter, media 10 may be incremented in a step-by-step manner in relation to transducer 75 to effect a relative displacement of transducer 75 and media 10 in order to access the next succeeding track on media 10. As still another possibility, it may be desirable under some circumstances to establish an alternate scanning of transducer 75 with respect to media 10. That is, transducer 75 is relatively moved in relation to media 10 so that one track of data is scanned in one direction, the next track is scanned in the opposite direction, and so on. A suitable transducer driving arrangement of this nature is disclosed in the Dollenmayer application noted in the reference section.

It may be desirable to provide mechanisms and circuits for Document Return Control in order to relatively position a card media to the beginning of the first track for recording or reproducing purposes. Thus, considering the Record, Playback, Justify Record, and Justify Playback operations previously discussed, such Return Control means is operative immediately upon depression of the associated mode control button to establish a first track position on the card prior to energizing the mode lamp under the button.

While the invention has been particularly shown and described with reference to a number of embodiments, it will be understood by those skilled in the art that various changes in form and detail other than those indicated may be made without departing from the spirit and scope of the invention.

What is claimed is:

1. Apparatus for recording coded character data signals in conjunction with a magnetic record card media having a revisable magnetic recording surface, comprising:

a source of coded character data signals, said data signals being representative in coded combination of informational and functional characters arranged in successive data categories, such as lines on a printed document, said data categories each generally comprising random numbers of coded character data signals, but not exceeding a predetermined number of coded character data signals;

means for positioning a magnetic record card media for processing, said record card media having a plurality of individual linear storage areas for storing coded character representations of said individual data categories, each of said linear storage areas extending in a first direction on said media from a home position, each of said linear storage areas accommodating at least said predetermined number of coded characters signals, and individual categories being storable in each of said linear storage areas;

recording means in said apparatus activatable for recording coded character representations of individual categories from said source on a record card media in said positioning means by selective establishment of signal flux patterns in said recording surface;

relative moving means for relatively moving said record card media and said recording means rectilinearly in said first direction and from said home position;

means for activating said recording means during said relative movement and in accordance with data signals from said source to record coded character data signal flux patterns up to said predetermined number in a selected linear storage area on said record card media;

restoring means operative following termination of recording of the random number of coded character data signals of an individual category in an individual one of said linear storage areas for relatively restoring said record card media and said recording means to said home position in a direction opposite to said first direction;

displacement means further operative following recording of a said individual category of coded character data signal flux patterns to relatively displace said record card media and said recording means transversely with respect to said first and said opposite directions to another linear storage area;

means to thereafter condition said activating means to activate said recording means and said relative moving means in order to record another successive category of data signal flux patterns up to said predetermined number in said another linear storage area on said card media;

arithmetic means selectively activatable to perform arithmetic operations useful during justification procedures, such as Add, Subtract, Multiply, and Divide;

mode control means in said apparatus for establishing a Record mode of operation during which character signals from said data source are recorded in individual tracks on a magnetic card media, and a Justify Record mode during which data signals are recorded along with justification signals, said mode control means providing status signals respectively indicative of the mode established by said mode control means;

and gating means controlled by a signal from said mode control means indicative of a Justify Record mode for activating said arithmetic means to produce said justification signals for recording along with said data signals.

2. Apparatus for recording coded character data signals in conjunction with a magnetic record card media having a revisable magnetic recording surface, comprising:

a source of coded character data signals, said data signals being representative in coded combination of informational and functional characters arranged in successive data categories, such as lines on a printed document, said data categories each generally comprising random numbers of coded character data signals, but not exceeding a predetermined maximum number of coded character data signals;

means for positioning a magnetic record card media for processing, said card media having a plurality of individual linear storage areas for storing coded character representations of said individual data categories, each of said linear storage areas extending in a preferred direction on said media from a home position, each of said linear storage areas accommodating at least said maximum number of coded character signals, and individual categories being storable in each of said linear storage areas;

recording means in said apparatus activatable for recording coded character representations of individual categories from said source on a record card media in said positioning means by selective establishment of signal flux patterns in said recording surface;

relative moving means for relatively moving said record card media and said recording means rectilinearly in said preferred direction and from said home position;

means for activating said recording means during said relative movement and in accordance with data signals from said source to record coded character data signal flux patterns up to said predetermined maximum number in a selected linear storage area on said record card media;

restoring means operative following termination of recording of the random number of coded character data signals of an individual category in an individual one of said linear storage areas for relatively restoring said record card media and said recording means to said home position in a direction opposite to said preferred direction;

displacement means further operative following recording of said individual category of coded character data signal flux patterns to relatively displace said record card media and said recording means transversely with respect to said preferred and said opposite directions to another linear storage area;

means to thereafter condition said activating means to activate said recording means and said relative moving means in order to record another successive category of data signal flux patterns up to said predetermined maximum number in said another linear storage area on said record card media;

reproducing means for reproducing previously recorded data signal flux patterns from a record card media;

means operative during reproduction of said flux patterns for relatively moving and transversely displacing said record card media and said reproducing means as during recording of said flux patterns;

a combined keyboard-printer unit;

means at said data source for supplying data signals in response to depression of informational and functional keys on said keyboard for recording on said record card media;

means operative during reproducing operations to supply data signals to said printer to operate the same in order to produce printed copy;

arithmetic circuitry for computing justification data with respect to individual lines of information;

means at said data source responsive to operation of said keyboard to supply data signals representative of rough copy for recording on said media;

justification means responsive to data signals derived during a reproducing operation and to signals from said arithmetic means to produce justified printed copy on said printer;

means operative at the beginning of an individual linear storage area to relatively move said recording means and said media a sufficient distance to establish a predetermined allotted area for a justification character; and Justify Record means operable following termination of a data category including means for operating said restoring means to return said record card to said home position, means for operating said relative moving means, said recording means and said arithmetic means to record a justification character in said allotted space, and means for subsequently operating said displacement means in order to position a new linear storage area for recording operations.

3. Apparatus for recording coded character data signals in conjunction with a magnetic record card media having a revisable magnetic recording surface, comprising:

a source of coded character data signals, said data signals being representative in coded combination of informational and functional characters arranged in successive data categories, such as lines on a printed document, said data categories each generally comprising random numbers of coded character data signals, but not exceeding a predetermined number of coded character data signals;

means for positioning a magnetic record card for processing, said record card media having a plurality of individual linear storage areas for storing coded character representations of said individual data categories, each of said linear storage areas extending in a first direction on said media from a home position, each of said linear storage areas accommodating at least said predetermined number of coded character signals, and individual categories being storable in each of said linear storage areas;

recording means in said apparatus activatable for recording coded character representations of individual categories from said source on a record card media in said positioning means by selective establishment of signal flux patterns in said recording surface;

relative moving means for relatively moving said record card media and said recording means rectilinearly in said first direction and from said home position;

means for activating said recording means during said relative movement and in accordance with data signals from said source to record coded character data signal flux patterns up to said predetermined number in a selected linear storage area on said record card media;

restoring means operative following termination of recording of the random number of coded character data signals of an individual category in an individual one of said linear storage areas for relatively restoring said record card media and said recording means to said home position in a direction opposite to said first direction;

displacement means further operative following recording of a said individual category of coded character data signal flux patterns to relatively displace said record card media and said recording means transversely with respect to said first and said opposite directions to another linear storage area;

means to thereafter condition said activating means to activate said recording means and said relative moving means in order to record another successive category of data signal flux patterns up to said predetermined number in said another linear storage area on said record card media;

reproducing means for reproducing previously recorded data signal flux patterns from a magnetic card media;

means operative during reproduction of said flux patterns for relatively moving and transversely displacing said record card media and said reproducing means as during recording of said flux patterns;

a combined keyboard-printer unit;

means at said data source for supplying data signals in response to depression of informational and functional keys on said keyboard for recording on said magnetic card media;

means operative during reproducing operations to supply data signals to said printer to operate the same in order to produce printed copy;

arithmetic circuitry for computing justification data with respect to individual lines of information;

mode control means in said apparatus for establishing a Record mode of operation during which character signals from said keyboard are recorded in individual tracks on a magnetic card media, a Playback mode during which previously recorded signals are reproduced and supplied in a conventional manner to said printer to produce printed copy, a Justify Record mode during which data signals are recorded along with justification data produced by said arithmetic means, and a Justify Playback mode during which data signals recorded in a Justify Record mode are reproduced and supplied to said printer for producing justified printed copy said mode control means providing status signals respectively indicative of the modes established by said mode control means;

and gating means controlled by a signal from said mode control means indicative of a Justify Record mode for activating said arithmetic means to produce said justification signals for recording along with said data signals, and said gating means being controlled by a signal from said mode control means indicative of a Justify Playback mode for activating said arithmetic means to process said justification signals for producing justified printed copy.

4. Apparatus for recording data signals in conjunction with a magnetic record card media, comprising:

a source of data signals representative of informational and functional characters arranged in categories, such as lines;

means for positioning a magnetic record card media for processing, said record card media having a plurality of linear storage areas for storing individual data categories;

means associated with said positioning means for recording signals from said source on a record card media in said processing means;

means normally operative for relatively moving said record card media and said recording means rectilinearly from a home position to record data signals in a selected area on said card media;

means operative following termination of recording of an individual category for relatively restoring said record card media and said recording means to said home position said card media being driven by said restoring means at a high rate of speed with a consequent over-run beyond said home position occurring due to inertia of said card media;

means operative to relatively displace said record card media and said recording means to a new linear position in order that a new category of data signals occupies a different linear storage area on said media;

means associated with said card processing means for reproducing previously recorded data signals from a record card media;

means operative during a reproducing operation for relatively moving and displacing said record card media as in a record operation;

means for sensing the positioning of a record card media for proper scanning during recording and reproducing operations;

drive control means controlled by said sensing means for controlling operation of said relative restoring means and said displacement means; and over-run means in said sensing means for recognizing over-run of said card media during restoration by said restoring means; and means in said drive control means controlled by said over-run means for operating said relative moving means to accurately return a said record card media to said home position prior to commencement of normal relative movement operations.

5. Apparatus for recording data signals in conjunction with a magnetic card record media, comprising;

a combined keyboard-printer unit;

a source of data signals supplied in response to depression of informational and functional keys on said keyboard-printer unit representative of rough copy and arranged in categories, such as lines;

means for positioning a magnetic record card for processing, said card having a plurality of linear storage areas for storing individual data categories;

means associated with said positioning means for recording signals from said source on a magnetic card media in said positioning means;

means for relatively moving said record card and recording means rectilinearly from a home position to record data signals in a selected area on said card;

means operative following termination of recording of an individual category for relatively restoring said record card and said recording means to said home position;

means operative to relatively displace said record card and said recording means to a new linear position in order that a new category of data signals occupies a different linear storage area on said media;

means associated with said card positioning means for reproducing previously recorded data signals from a magnetic card media and supplying said data signals to said keyboard-printer unit to operate the same in order to produce printed copy;

means operative during a reproducing operation for relatively moving and displacing said record as in a record operation;

arithmetic means for computing justification data with respect to individual lines of information;

pitch means settable by an operator to establish a desired print pitch of characters;

line length means settable by an operator to establish a desired line length of individual lines of information;

means in said arithmetic means responsive to the settings of pitch and line length means to indicate and control justification progress; and justification means responsive to data signals derived during a reproducing operation and to signals from said arithmetic means to produce justified printed copy on said printer.

6. The apparatus of claim 5, further comprising:

an Inches and a Fractions of Inches selector means incorporated in said line length means for operator selection of desired line length.

7. Apparatus for recording data signals in conjunction with a magnetic card record media, comprising:

a combined keyboard-printer unit;

a data source for supplying signals in response to depression of information and functional keys on said keyboard said signals being representative of rough copy characters arranged in categories, such as lines;

means for positioning a magnetic record card for processing, said card having a plurality of linear storage areas for storing individual data categories;

means associated with said processing means for recording signals from said source on a magnetic card media in said processing means;

means for relatively moving said record card and said recording means rectilinearly from a home position to record data signals in a selected area on said card;

means operative following termination of recording of an individual category for relatively restoring said record card and said recording means to said home position;

means operative to relatively displace said record card and said recording means to a new linear position in order that a new category of data signals occupies a different linear storage area on said media;

means associated with said card processing means for reproducing previously recorded data signals from a magnetic card media to operate said printer in order to produce printed copy;

means operative during a reproducing operations for relatively moving and displacing said record as in a record operation;

arithmetic circuitry for computing justification data with respect to individual lines of information, said arithmetic means including register means for accumulating escapement values of informational and functional characters, and register means for accumulating the number of interword spaces encountered during the printing of rough copy for later use in determining justification factors;

manually settable means for establishing the pitch of type and the desired length of lines to be justified;

means associated with said arithmetic means for comparing said escapement value registrations and said interword space registrations in order to produce End Zone and Can Justify Zone signals;

indicating means operated by said last named signals for advising an operator of the occurrence of said conditions;

and justification means responsive to data signals derived during a reproducing operation and to signals from said arithmetic means to produce justified printed copy on said printer.

8. Apparatus for recording data signals in conjunction with a magnetic card record media, comprising:

a combined keyboard-printer unit;

a data source for supplying signals in response to depression of informational and functional keys on said keyboard, said signals being representative of rough copy characters arranged in categories, such as lines;

means for positioning a magnetic record card for processing, said card having a plurality of linear storage areas for storing individual data categories;

means associated with said processing means for recording signals from said source on a magnetic card media in said processing means;

means for relatively moving said record card and said recording means rectilinearly from a home position to record data signals in a selected area on said card;

means operative following termination of recording of an individual category for relatively restoring said record card and said recording means to said home position;

means operative to relatively displace said record card and said recording means to a new linear position in order that a new category of data signals occupies a different linear storage area on said media;

means associated with said card processing means for reproducing previously recorded data signals from a magnetic card media to operate said printer in order to produce printed copy;

means operative during a reproducing operation for relatively moving and displacing said record as in a record operation;

arithmetic circuitry for computing justification data with respect to individual lines of information, said arithmetic means including register means for accumulating escapement values of information and functional characters, and register means for accumulating the number of interword spaces encountered during the printing of rough copy for later use in determining justification factors;

a Main register for accommodating character signals during recording and reproducing operations;

means associated with said arithmetic means for rearranging said Main register into a plurality of registers for the development of a justification character, said rearrangement being dependent upon the number of interword spaces accumulated in said interword space register;

and justification means responsive to data signals derived during a reproducing operation and to signals from said arithmetic means to produce justified printed copy on said printer.

9. Apparatus for recording data signals in conjunction with a magnetic card record media, comprising:

a combined keyboard-printer unit;

a data source for supplying signals in response to depression of informational and functional keys on said keyboard, said signals being representative of rough copy characters arranged in categories, such as lines;

means for positioning a magnetic record card for processing, said card having a plurality of linear storage areas for storing individual data categories;
means associated with said processing means for recording signals from said source on a magnetic card media in said processing means;
means for relatively moving said record card and recording means rectilinearly from a home position to record data signals in a selected area on said card;
means operative following termination of recording of an individual category for relatively restoring said record card and said recording means to said home position;
means operative to relatively displace said record card and said recording means to a new linear position in order that a new category of data signals occupies a different linear storage area on said media;
means associated with said card processing means for reproducing previously recorded data signals from a magnetic card media to operate said printer in order to produce printed copy;
means operative during a reproducing operation for relatively moving and displacing said record as in a record operation;
arithmetic circuitry for computing justification data with respect to individual lines of information;
means operative at the beginning of an individual linear storage area to relatively move said recording means and said media a sufficient distance to establish a predetermined allotted area for a justification character;
Justify Record means for establishing a sequence of operations following termination of a data category comprising: operation of said restoring means to return said record card to said home position, operation of said relative moving means, said recording means and said arithmetic means to record a justification character in said allotted space, and subsequent operation of said displacement means in order to position a new linear storage area for recording operations;
and justification means responsive to data signals derived during a reproducing operation and to signals from said arithmetic means to produce justified printed copy on said printer.

10. The apparatus of claim 9, further comprising:
a Main register for accommodating character data signals during recording and reproducing operations;
means associated with said arithmetic means for developing a justification character configuration in said Main register for recording in said allotted space; and
means operative during a reproducing operation to gate said previously recorded Justify Character into said Main register for establishing space values and quantities required during subsequent reproduction of the associated character data signals.

11. The apparatus of claim 9, wherein said linear data storage areas are arranged in parallel on said media with predetermined track-to-track spacing; and further comprising:
means for operating said displacement means immediately following recording of said justification character, thereby automatically allotting sufficient room in the storage area next selected for the subsequent recording of a justify character upon termination of the associated data signal category.

12. The apparatus of claim 9, further comprising:
means associated with said Justify Record means for operating said apparatus through a dummy recording sequence while maintaining said recording means inactive to establish the allotted area for a justification character.

13. The apparatus of claim 12, further comprising:
stepping control means operative during scanning of said allotted area for effecting operation of said relative displacement means to position a new storage track for scanning; and
gating control means for maintaining said stepping control means inactive at the end of a dummy record cycle to thereby maintain scanning in the line presently in progress, and operable following recording of a justify character in said allotted area to gate said stepping means in order to establish scanning of a succeeding track and to automatically establish an allotted area in said succeeding track.

14. Apparatus for recording data signals in conjunction with a magnetic card record media, comprising:
a combined keyboard-printer unit;
a data source for supplying signals in response to depression of informational and functional keys on said keyboard said signals being representative of rough copy characters arranged in categories, such as lines;
means for positioning a magnetic record card for processing, said card having a plurality of linear storage areas for storing individual data categories;
means associated with said processing means for recording signals from said source on a magnetic card media in said processing means;
means for relatively moving said record card and said recording means rectilinearly from a home position to record data signals in a selected area on said card;
means operative following termination of recording of an individual category for relatively restoring said record card and said recording means to said home position;
means operative to relatively displace said record card and said recording means to a new linear position in order that a new category of data signals occupies a different linear storage area on said media;
means associated with said card processing means for reproducing previously recorded data signals from a magnetic card media to operate said printer in order to produce printed copy;
means operative during a reproducing operation for relatively moving and displacing said record card as in a record operation;
arithmetic circuitry for computing justification data with respect to individual lines of information;
justification means responsive to data signals derived during a reproducing operation and to signals from said arithmetic means to produce justified printed copy on said printer;
mode control means in said apparatus for establishing a Record mode of operation during which character signals from said keyboard are recorded in individual tracks on a magnetic card media, a Playback mode during which previously recorded signals are reproduced and supplied in a conventional manner to said printer to produce printed copy, a Justify Record mode during which data signals are recorded along with justification data produced by said arithmetic means, and a Justify Playback mode during which data signals recorded in a Justify Record mode are reproduced and supplied to said printer for producing justified printed copy; and
means for operating said relative moving means in a Record mode to move said card to an initial position in readiness for the recording of character data signals supplied from said keyboard; and for operating said relative moving means in a Justify Record mode to move said media beyond said initial position in order to establish a sufficient space for the recording of a justification character at a later time.

15. The apparatus of claim 14, further comprising:
means in said relative moving means operable in a substantially continuous manner during a Playback mode to scan previously recorded character data signals and in a Justify Playback mode to scan previously recorded justification and character data signals, in that order.

16. Apparatus for reproducing data signals in conjunction with a magnetic cord record media having a revisable magnetic recording surface, comprising:
means for positioning a magnetic record card media, said card media having a plurality of individual linear storage areas for storing individual data categories;

reproducing means in said apparatus for reproducing signals on a magnetic card media in said processing means;

means for relatively moving said record card media and said reproducing means rectilinearly in a first direction from a home position to reproduce data signals in a selected area on said card;

means operative following termination of reproducing of an individual category in an individual one of said areas for relatively restoring said record card media and said reproducing means to said home position in a direction opposite to said first direction;

means further operative during said restoring operation to relatively displace said record card media and said reproducing means transversely across said areas to a new linear position in order to access another category of data signals in a different linear storage area on said media;

arithmetic circuitry selectively activatable for computing justification data with respect to individual lines of information, justification means responsive to data signals derived during a reproducing operation and to signals from said arithmetic means to produce justified data;

printing means controlled by said justification means to produce justified printed copy;

mode control means in said apparatus for establishing a Playback mode during which previously recorded signals are reproduced and supplied to said printer to produce printed copy, and a Justify Playback mode during which data signals and justification signals are reproduced for producing justified printed copy, said mode control means providing status signals respectively indicative of the modes established by said mode control means;

and gating means controlled by a signal from said mode control means indicative of a Justify Playback mode for activating said arithmetic means to process said justification signals for producing justified printed copy.

* * * * *